(12) United States Patent
Prasad et al.

(10) Patent No.: US 12,483,953 B2
(45) Date of Patent: Nov. 25, 2025

(54) TIMING ADVANCE FOR MOBILITY

(71) Applicant: Ofinno, LLC, Reston, VA (US)

(72) Inventors: Gautham Prasad, Herndon, VA (US); Ali Cagatay Cirik, Chantilly, VA (US); Esmael Hejazi Dinan, McLean, VA (US); Hyoungsuk Jeon, Centreville, VA (US); Hua Zhou, Vienna, VA (US); Taehun Kim, Fairfax, VA (US); Mohammad Ghadir Khoshkholgh Dashtaki, Reston, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/098,187

(22) Filed: Apr. 2, 2025

(65) Prior Publication Data

US 2025/0234257 A1    Jul. 17, 2025

Related U.S. Application Data

(63) Continuation of application No. PCT/US2024/023237, filed on Apr. 5, 2024.

(60) Provisional application No. 63/457,376, filed on Apr. 5, 2023.

(51) Int. Cl.
| | |
|---|---|
| *H04W 36/04* | (2009.01) |
| *H04W 36/00* | (2009.01) |
| *H04W 36/08* | (2009.01) |
| *H04W 56/00* | (2009.01) |
| *H04W 76/20* | (2018.01) |

(52) U.S. Cl.
CPC ....... *H04W 36/04* (2013.01); *H04W 36/0072* (2013.01); *H04W 36/08* (2013.01); *H04W 56/0045* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 2014/0056243 A1 | 2/2014 | Pelletier et al. | |
| 2024/0314652 A1* | 9/2024 | Kim | H04W 36/0072 |
| 2024/0323777 A1* | 9/2024 | Agiwal | H04W 36/08 |
| 2024/0334281 A1* | 10/2024 | Khoshkholgh Dashtaki | H04W 36/083 |
| 2025/0081052 A1* | 3/2025 | Chandrashekar | H04W 36/08 |

(Continued)

OTHER PUBLICATIONS

3GPP TS 38.300 V17.4.0 (Mar. 2023); Technical Specification; 3rd Generation Partnership Project; Technical Specification Group Radio Access Network; NR; NR and NG-RAN Overall Description; Stage 2; (Release 17).

(Continued)

*Primary Examiner* — Jutai Kao
(74) *Attorney, Agent, or Firm* — Jacob L. Mangan; Kavon Nasabzadeh; Brett K. Gardner

(57) ABSTRACT

A wireless device receives a layer 1 or layer 2 triggered mobility (LTM) cell switch command. The LTM cell switch command comprises a configuration index indicating a cell for an LTM procedure and does not comprise a timing adjustment value for a primary timing advance group (PTAG) of the cell. In response to receiving the LTM cell switch command with no timing adjustment value, the wireless device starts a time alignment timer associated with the PTAG after measuring a timing advance of the cell.

20 Claims, 29 Drawing Sheets

(56) References Cited

U.S. PATENT DOCUMENTS

2025/0106713 A1\* 3/2025 Jin .................. H04W 36/00725
2025/0261064 A1\* 8/2025 Kim .................. H04W 36/0055

OTHER PUBLICATIONS

3GPP TS 38.321 V17.4.0 (Mar. 2023); Technical Specification; 3rd Generation Partnership Project; Technical Specification Group Radio Access Network; NR; Medium Access Control (MAC) protocol specification; (Release 17).
3GPP TS 38.331 V17.4.0 (Mar. 2023); Technical Specification; 3rd Generation Partnership Project; Technical Specification Group Radio Access Network; NR; Radio Resource Control (RRC) protocol specification; (Release 17).
R1-2208510; 3GPP TSG RAN WG1 Meeting #110bis-e; e-Meeting, Oct. 10-19, 2022; Source: ZTE; Title: Enhancements on TA management to reduce latency; Agenda Item: 9.12.2; Document for: Discussion and Decision.
R1-2210943; 3GPP TSG RAN WG1 Meeting #111; Toulouse, France, Nov. 14-18, 2022; Source: ZTE; Title: Enhancements on TA management to reduce latency; Agenda Item: 9.12.2; Document for: Discussion and Decision.
R1-2211307; 3GPP TSG RAN WG1 #111; Toulouse, France, Nov. 14-18, 2022; Agenda item: 9.12.2; Source: Nokia, Nokia Shanghai Bell; Title: Discussion on timing advance management for L1/L2-triggered mobility; Document for: Discussion and Decision.
R1-2300057; 3GPP TSG RAN WG1 Meeting #112; Athens, Greece, Feb. 27-Mar. 3, 2023; Agenda Item: 9.12.2; Source: Futurewei; Title: Discussion of the merits of UE based RACH-less TA acquisition for LTM; Document for: Discussion and decision.
R1-2300475; 3GPP TSG RAN WG1 #112; Athens, Greece, Feb. 27-Mar. 3, 2023; Source: vivo; Title: Discussion on TA management for L1/L2 Mobility; Agenda Item: 9.12.2; Document for: Discussion and Decision.
R1-2300663; 3GPP TSG RAN WG1 #112; Athens, Greece. Feb. 27-Mar. 3, 2023; Source: CATT; Title: Discussion on timing advance management to reduce latency; Agenda Item: 9.12.2; Document for: Discussion and Decision.
R1-2301437; 3GPP TSG RAN WG1 Meeting #112; Feb. 27-Mar. 3, 2023; Athens, Greece; Agenda item: 9.12.2; Source: Qualcomm Incorporated; Title: TA management to reduce latency for L1/L2 based mobility; Document for: Discussion/Decision.
R2-2208510; 3GPP TSG-RAN WG2 Meeting #119electronic; Online, Aug. 17-29, 2022; Agenda Item: 6.24.1; Source: Huawei, HiSilicon; Title: Discussion on FR2 new bandwidth classes; Document for: Discussion and decision.
R2-2211204; 3GPP TSG-RAN WG2 Meeting #120; Toulouse, France, Nov. 14-Nov. 18, 2022; Source: CATT; Title: Discussion on Dynamic Switch Mechanism; Agenda Item: 8.4.2.3; Document for: Discussion and Decision.
R2-2211467; 3GPP TSG-RAN2#120; Toulouse, Nov. 14-18, 2022; Agenda item: 8.4.2.1.2; Source: Lenovo; Title: Early TA work in R1 R2 R3 and R4; Document for: Discussion and Decision.
R2-2212436; 3GPP TSG-RAN WG2 #120; Toulouse, France, Nov. 14-18, 2022; Agenda Item: 8.4.2.3; Source: Ericsson; Title: Discussion on the execution of LTM cell switch; Document for: Discussion, Decision.
R2-2212815; 3GPP TSG-RAN WG2 Meeting #120; Toulouse, France, Nov. 14-18, 2022; Agenda item: 8.4.2.1.1 (Characteristics and scenarios); Source: Samsung; Title: Discussion on potential aspects for enhancement on LTM; Document for: Discussion & Decision.
R2-2300057; 3GPP TSG RAN WG2#121; Athens, Greece, Feb. 27-Mar. 3, 2023; R4-2220741; 3GPP TSG-RAN WG4 Meeting #105-e; Toulouse, France, Nov. 14-18, 2022; Title: Reply LS on enhanced cell reselection requirements; Response to: R2-2210866; Release: Release 17; Work Item: NR_NTN_solutions-Core.
R2-2300220; 3GPP TSG-RAN2#121; Athens, Greece, Feb.-Mar. 2023; Agenda item: 8.4.2.1; Source: Lenovo; Title: LTM stage-2 design models; Document for: Discussion and Decision.
R2-2300375; 3GPP TSG-RAN WG2 Meeting #121; Athens, Greece, Feb. 27-Mar. 3, 2023; Change Request; 38.300; CR Draft CR; rev -; Current version: 17.3.0.
R2-2300473; 3GPP TSG-RAN WG2 Meeting #121; Athens, Greece, Feb. 27-Mar. 3, 2023; Agenda item: 8.4.2.1; Source: Nokia, Nokia Shanghai Bell; Title: On Early TA Acquisition in LTM; WID/SID: NR_Mob_enh2-Core—Release 18; Document for: Discussion and Decision.
R2-2300767; 3GPP TSG RAN WG2#121; Athens, Greece, Feb. 27-Mar. 3, 2023; Agenda item: 8.4.2.3; Source: Apple Inc ; Title: MAC TA RAN2 aspects for LTM; Document for: Discussion and Decision; Work Item Code: NR_Mob_enh2-Core.
R2-2301115; 3GPP TSG-RAN WG2 Meeting #121; Athens, Greece, Feb. 27-Mar. 3, 2023; Source: Xiaomi; Title: L2 handling at cell switch; Agenda Item: 8.4.2.3; Document for: Discussion and Decision.
R2-2301261; 3GPP TSG-RAN WG2 Meeting #121; Athens, Greece, Feb. 27-Mar. 3, 2023; Agenda item: 8.4.2.3; Source: CMCC; Title: Considerations on cell switch; Document for: Discussion, Decision.
R2-2301289; 3GPP TSG-RAN WG2 Meeting #121; Athens, Greece, Feb. 27-Mar. 3, 2023; Agenda item: 8.4.2.3; Source: Nokia, Nokia Shanghai Bell; Title: On resetting the UP entities; WID/SID: NR_Mob_enh2-Core—Release 18; Document for: Discussion and Decision.
International Search Report and Written Opinion of the International Searching Authority mailed Aug. 14, 2024, in International Application No. PCT/US2024/023237.
R2-2300403; 3GPP TSG-RAN WG2 Meeting #121; Athens, Greece, Feb. 27-Mar. 3, 2023; Agenda item: 8.4.2.3; Source: Intel Corporation; Title: Discussion on L TM cell switch; Document for: Discussion and Decision.
R2-2300181; 3GPP TSG RAN2 Meeting #121; Feb. 27-Mar. 3, 2023, Athens, Greece; Agenda item: 8.4.2.3; Source: Samsung; Title: MAC/RLC Reset and BWP Handling for L TM; Document for: Discussion & Decision.

\* cited by examiner

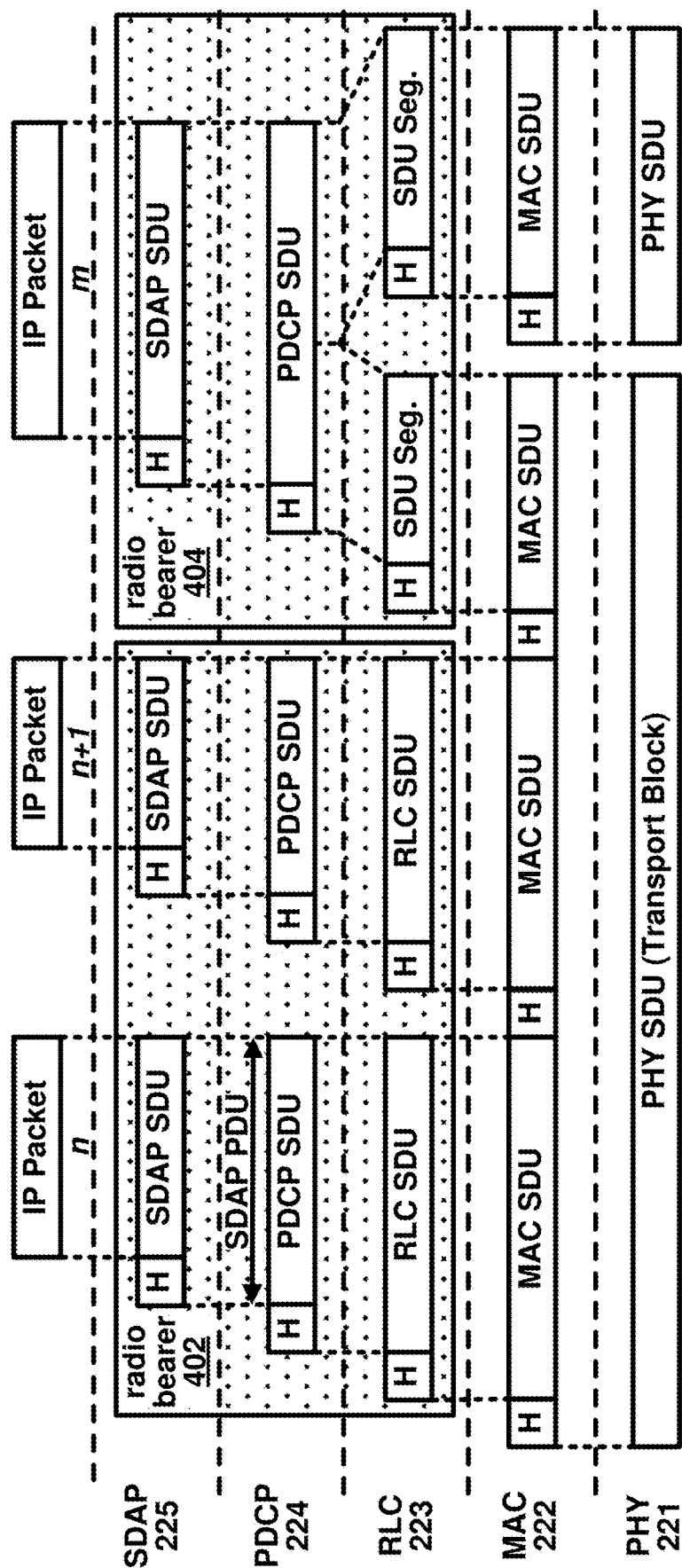
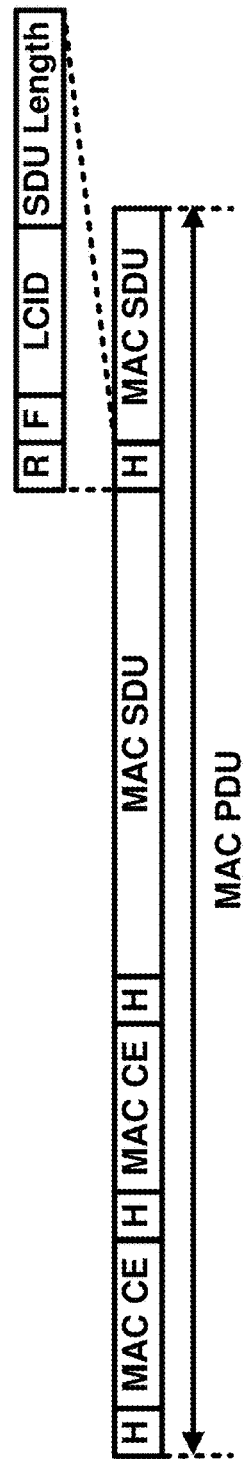
FIG. 4A
FIG. 4B

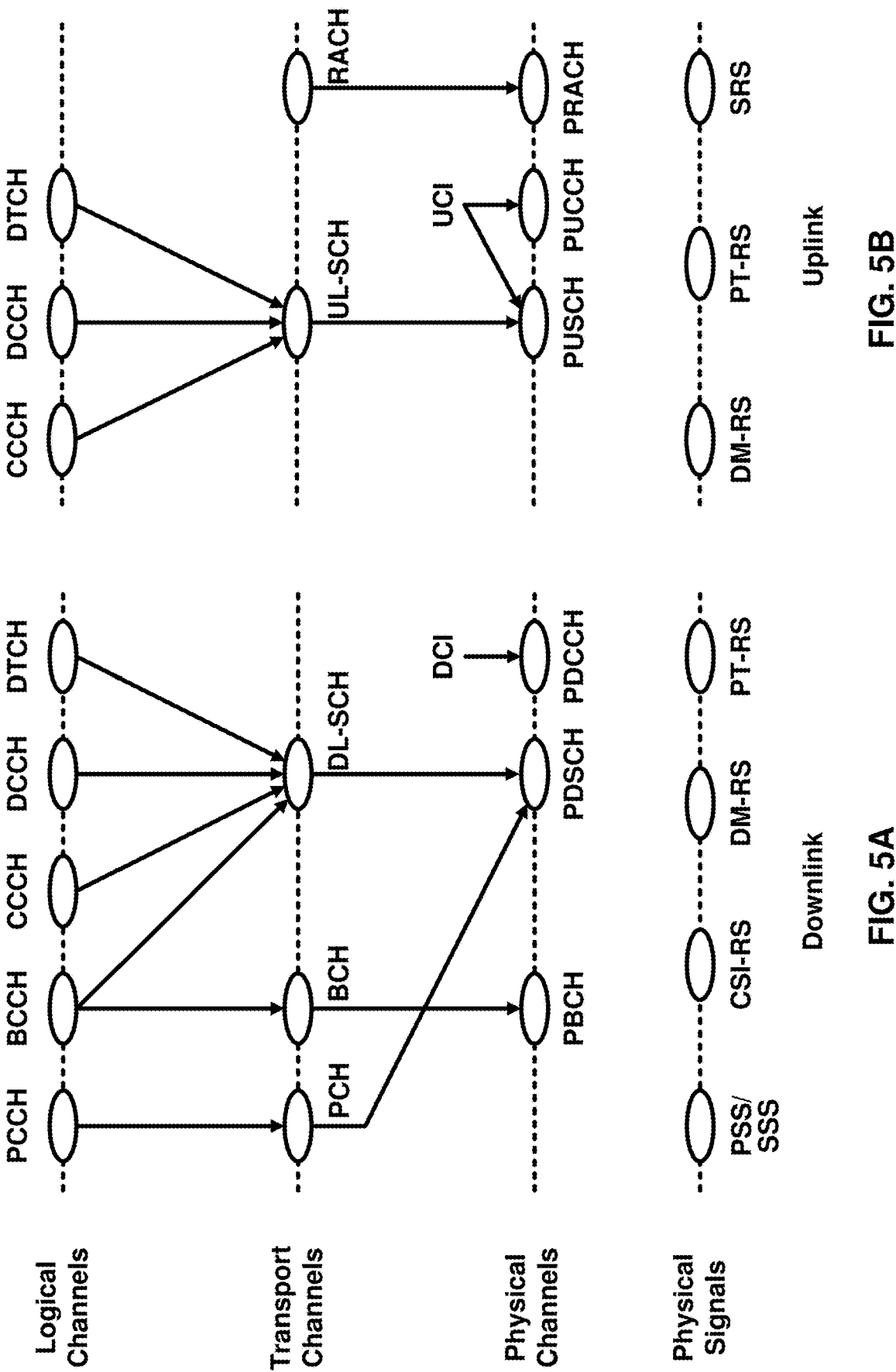

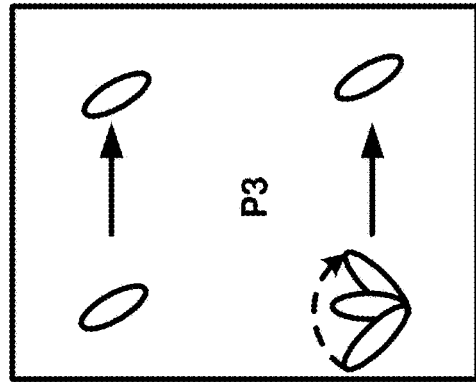
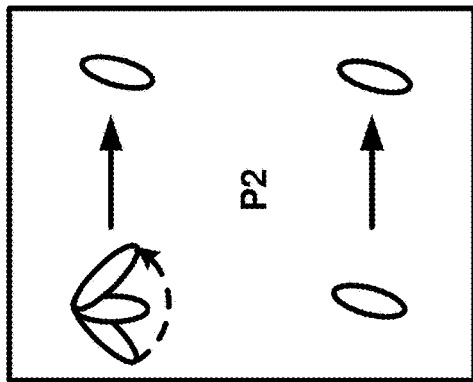
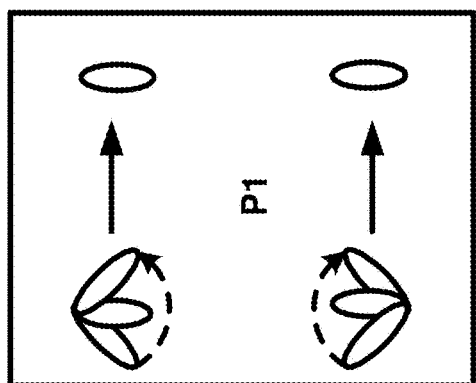
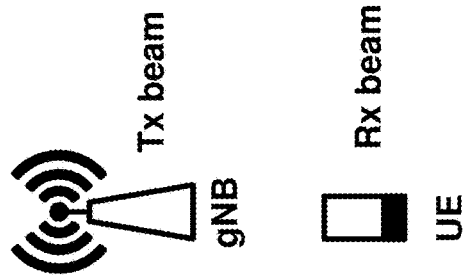
FIG. 12A
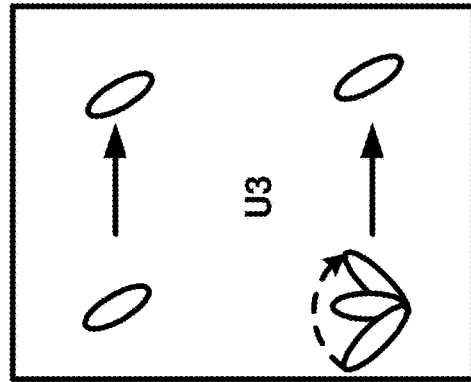
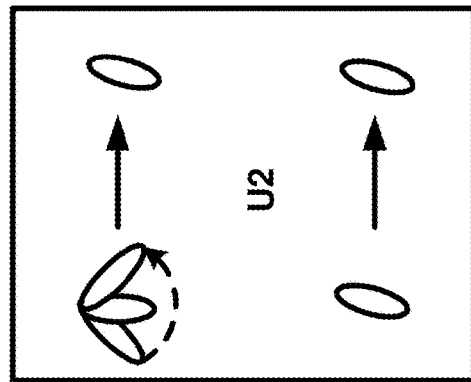
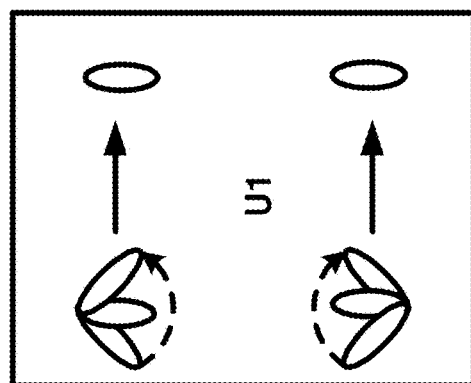
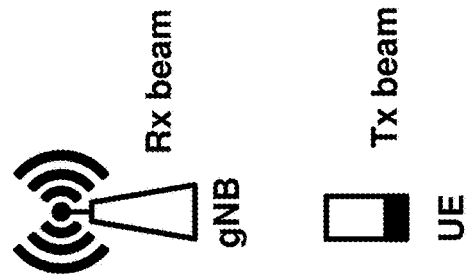
FIG. 12B

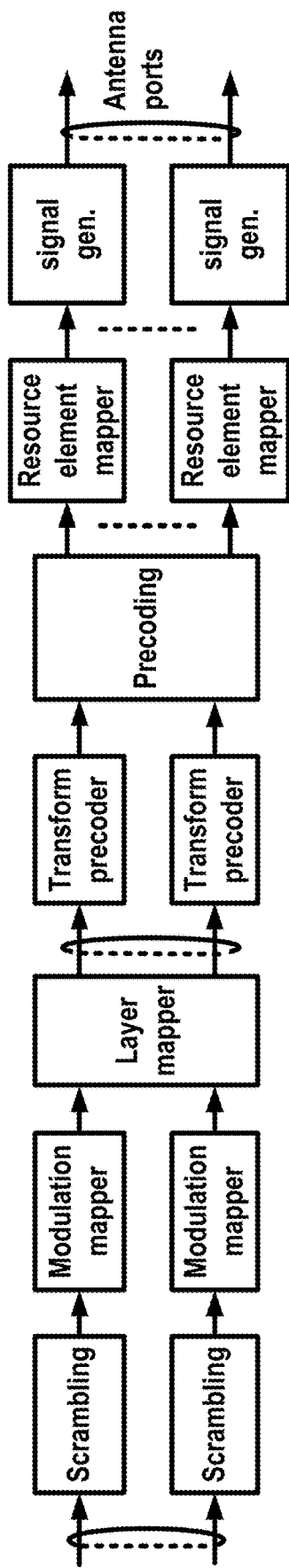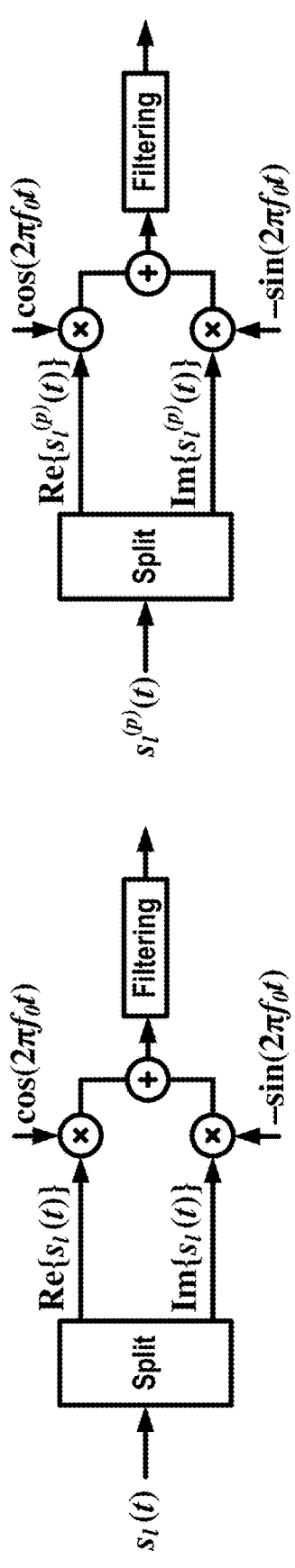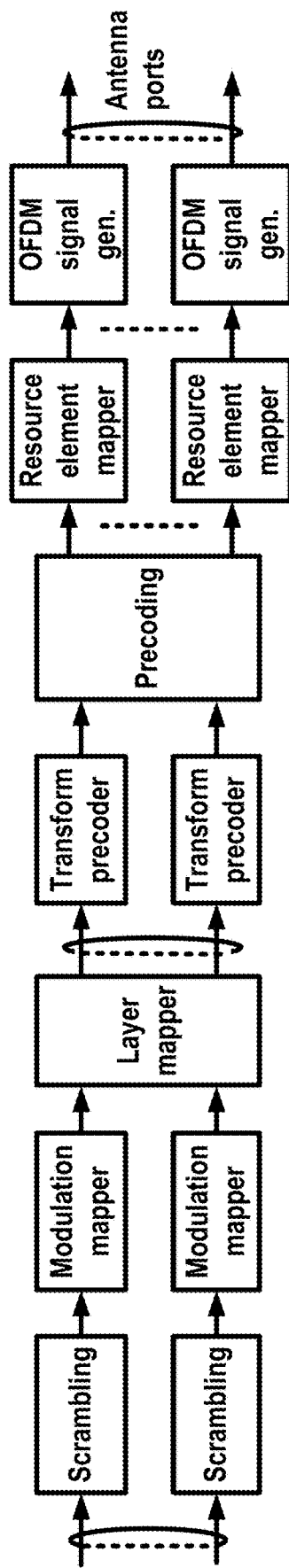
FIG. 16A
FIG. 16B
FIG. 16C
FIG. 16D

FIG. 27A

RACH-ConfigGeneric information element

```
-- ASN1START
-- TAG-RACH-CONFIGGENERIC-START

RACH-ConfigGeneric ::=            SEQUENCE {
    prach-ConfigurationIndex          INTEGER (0..255),
    msg1-FDM                          ENUMERATED {one, two, four, eight},
    msg1-FrequencyStart               INTEGER (0..maxNrofPhysicalResourceBlocks-1),
    zeroCorrelationZoneConfig         INTEGER(0..15),
    preambleReceivedTargetPower       INTEGER (-202..-60),
    preambleTransMax                  ENUMERATED {n3, n4, n5, n6, n7, n8, n10, n20, n50, n100, n200},
    powerRampingStep                  ENUMERATED {dB0, dB2, dB4, dB6},
    ra-ResponseWindow                 ENUMERATED {sl1, sl2, sl4, sl8, sl10, sl20, sl40, sl80},
    ra-ResponseWindowLTM              ENUMERATED {sl4, sl8, sl10, sl20, sl40, sl80, s260, s320},
    ...,
    [[
    prach-ConfigurationPeriodScaling-IAB-r16   ENUMERATED {scf1,scf2,scf4,scf8,scf16,scf32,scf64}
```

FIG. 27B

RACH-ConfigGeneric information element

```
-- ASN1START
-- TAG-RACH-CONFIGGENERIC-START

RACH-ConfigGeneric ::=            SEQUENCE {
    prach-ConfigurationIndex          INTEGER (0..255),
    msg1-FDM                          ENUMERATED {one, two, four, eight},
    msg1-FrequencyStart               INTEGER (0..maxNrofPhysicalResourceBlocks-1),
    zeroCorrelationZoneConfig         INTEGER(0..15),
    preambleReceivedTargetPower       INTEGER (-202..-60),
    preambleTransMax                  ENUMERATED {n3, n4, n5, n6, n7, n8, n10, n20, n50, n100, n200},
    powerRampingStep                  ENUMERATED {dB0, dB2, dB4, dB6},
    ra-ResponseWindow                 ENUMERATED {sl1, sl2, sl4, sl8, sl10, sl20, sl40, sl80},
    ra-ResponseWindow-offsetLTM       ENUMERATED {s2, s3, s4, s5, s6, s7, s8, s9, s10},
    ...,
    [[
    prach-ConfigurationPeriodScaling-IAB-r16   ENUMERATED {scf1,scf2,scf4,scf8,scf16,scf32,scf64}
```

TIMING ADVANCE FOR MOBILITY

CROSS-REFERENCE TO RELATED APPLICATIONS

This application is a continuation of International Application No. PCT/US2024/023237, filed Apr. 5, 2024, which claims the benefit of U.S. Provisional Application No. 63/457,376, filed Apr. 5, 2023, each of which are hereby incorporated by reference in their entireties.

BRIEF DESCRIPTION OF THE DRAWINGS

FIG. 4A illustrates an example downlink data flow through the NR user plane protocol stack of FIG. 2A.

FIG. 4B illustrates an example format of a MAC subheader in a MAC PDU.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 27A shows an example information element (IE) as per an aspect of an embodiment of the present disclosure.

FIG. 27B shows an example information element (IE) as per an aspect of an embodiment of the present disclosure.

DETAILED DESCRIPTION

Figure 1A:
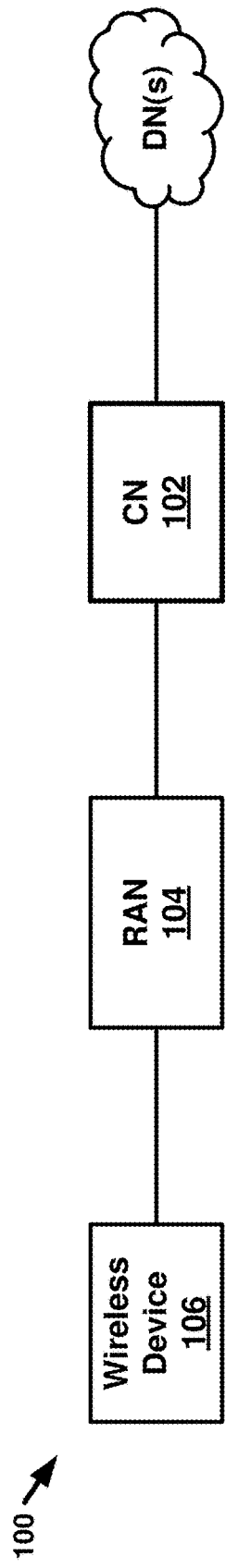
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
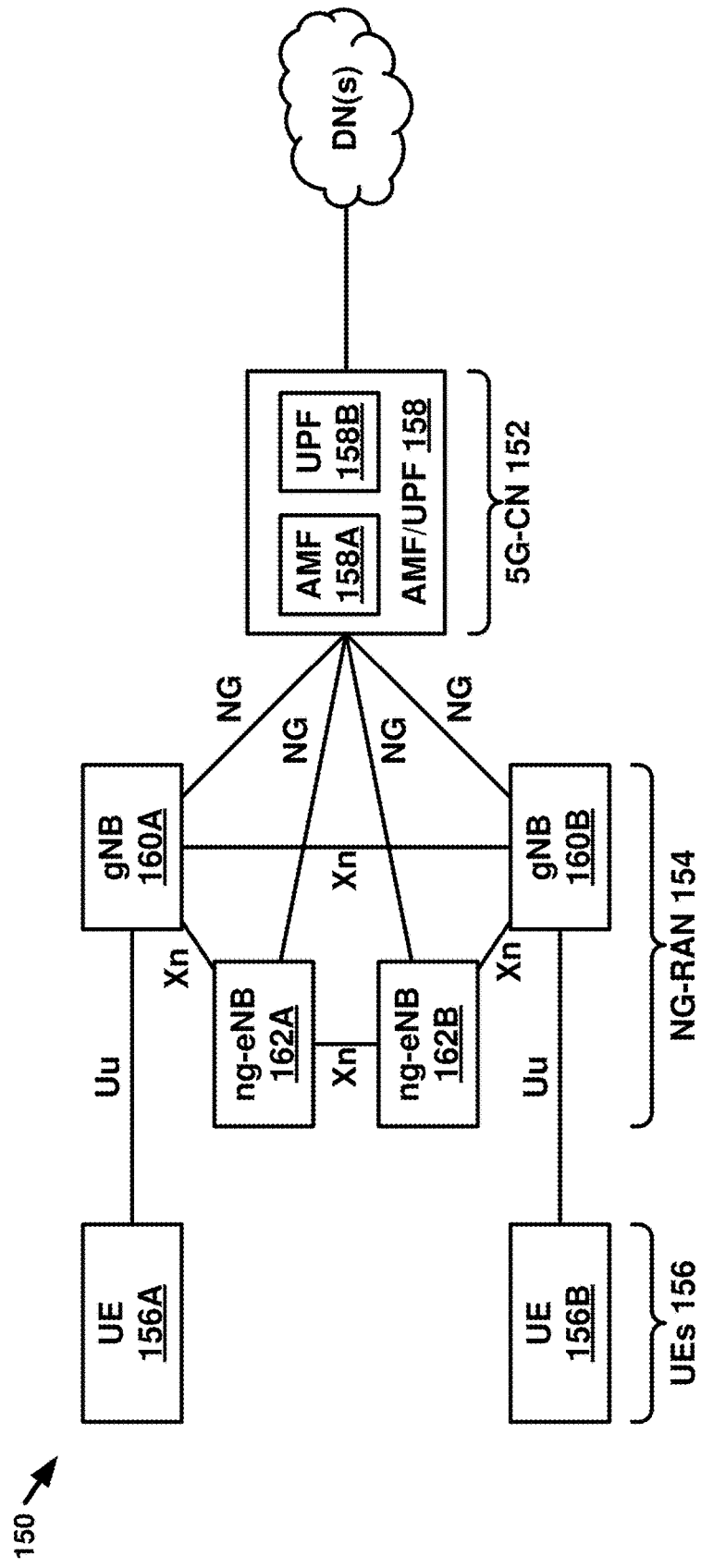

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
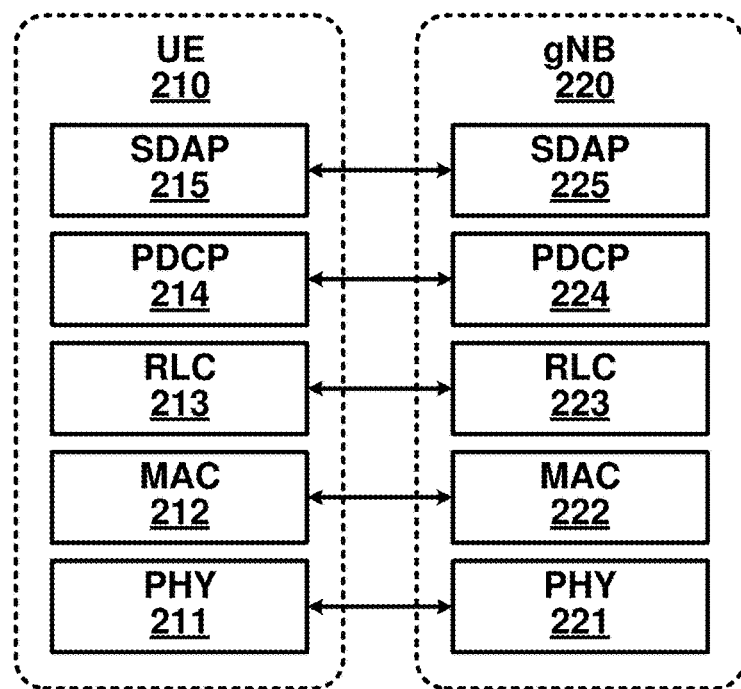
FIG. 2A and FIG. 2B respectively illustrate a New Radio (NR) user plane and control plane protocol stack.
Figure 2B:
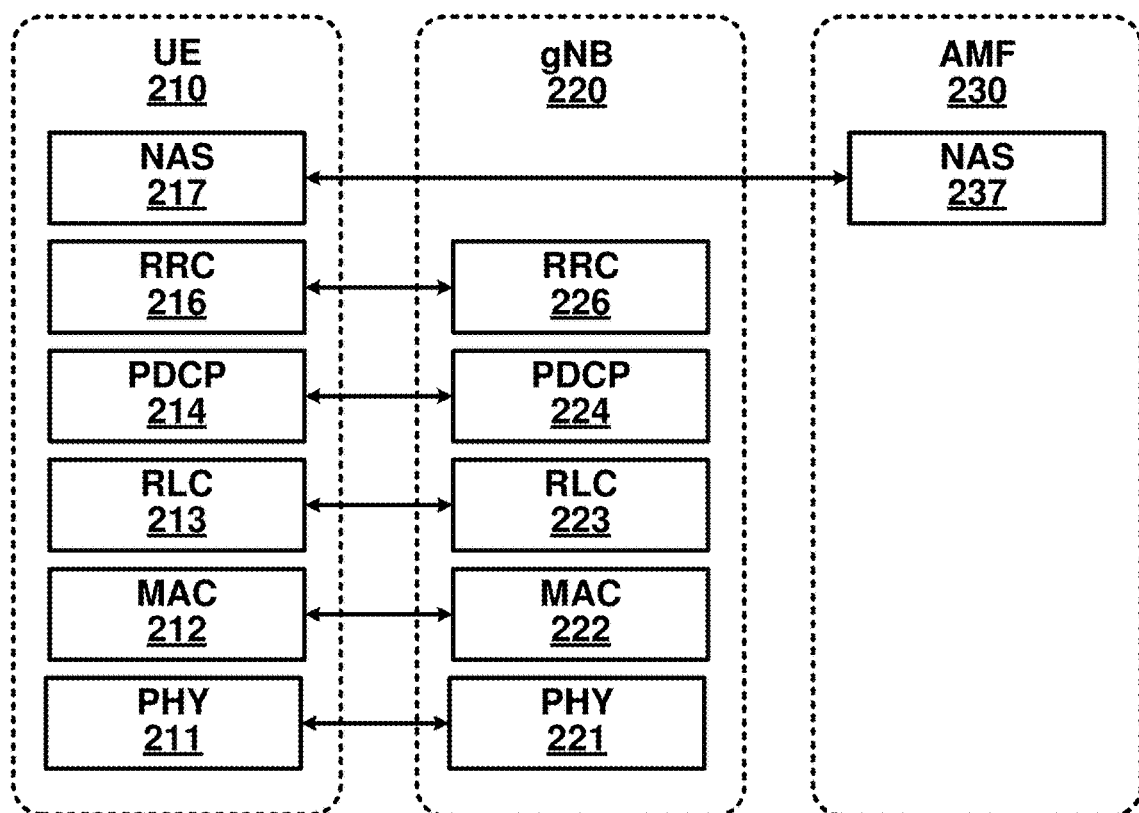

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
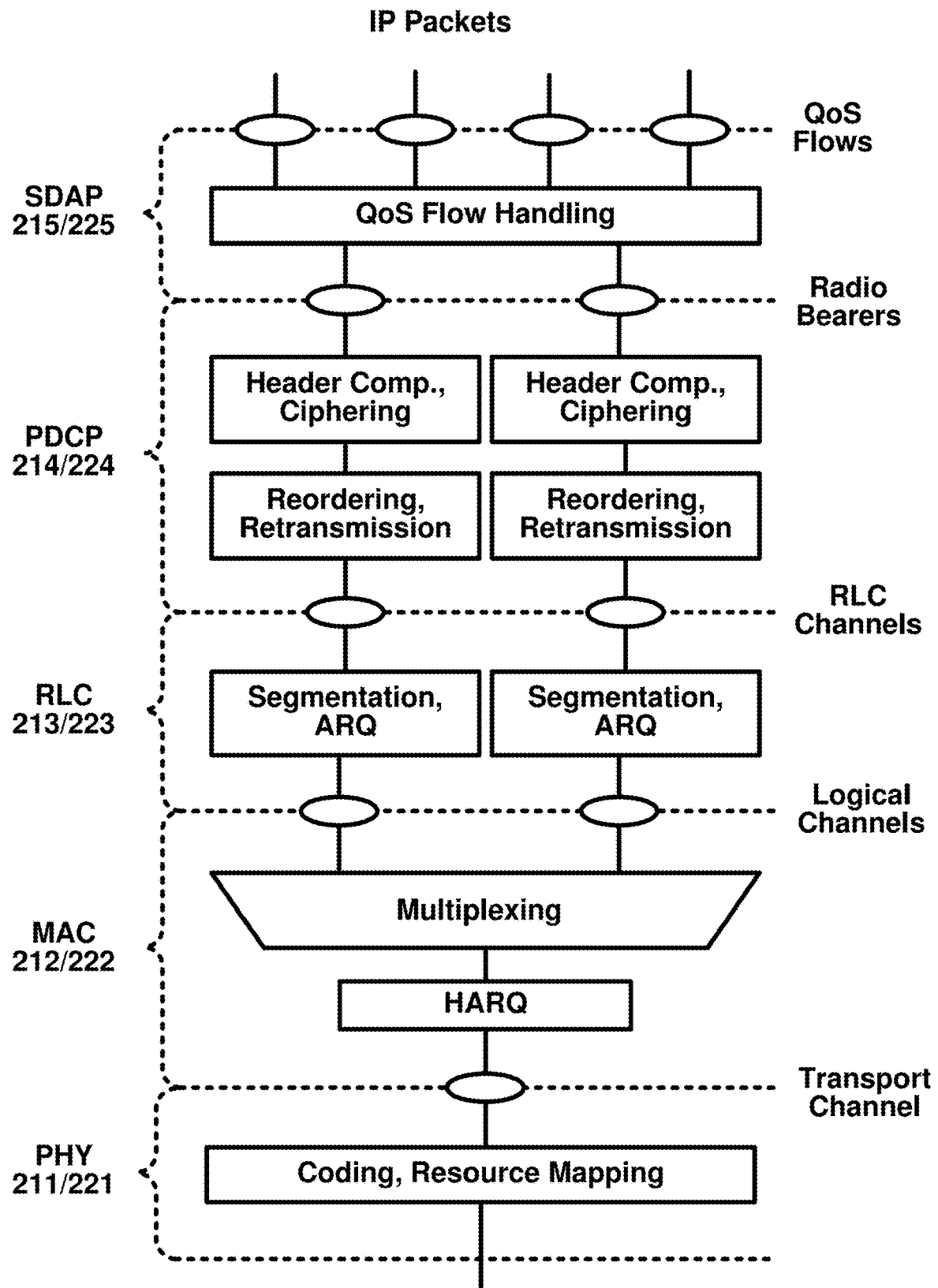
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A.

In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:
 a paging control channel (PCCH) for carrying paging messages used to page a UE whose location is not known to the network on a cell level;
 a broadcast control channel (BCCH) for carrying system information messages in the form of a master information block (MIB) and several system information blocks (SIBs), wherein the system information messages may be used by the UEs to obtain information about how a cell is configured and how to operate within the cell;
 a common control channel (CCCH) for carrying control messages together with random access;
 a dedicated control channel (DCCH) for carrying control messages to/from a specific the UE to configure the UE; and
 a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:
 a paging channel (PCH) for carrying paging messages that originated from the PCCH;
 a broadcast channel (BCH) for carrying the MIB from the BCCH;
 a downlink shared channel (DL-SCH) for carrying downlink data and signaling messages, including the SIBs from the BCCH;
 an uplink shared channel (UL-SCH) for carrying uplink data and signaling messages; and
 a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:
 a physical broadcast channel (PBCH) for carrying the MIB from the BCH;
 a physical downlink shared channel (PDSCH) for carrying downlink data and signaling messages from the DL-SCH, as well as paging messages from the PCH;
 a physical downlink control channel (PDCCH) for carrying downlink control information (DCI), which may include downlink scheduling commands, uplink scheduling grants, and uplink power control commands;
 a physical uplink shared channel (PUSCH) for carrying uplink data and signaling messages from the UL-SCH and in some instances uplink control information (UCI) as described below;
 a physical uplink control channel (PUCCH) for carrying UCI, which may include HARQ acknowledgments, channel quality indicators (CQI), pre-coding matrix indicators (PMI), rank indicators (RI), and scheduling requests (SR); and
 a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
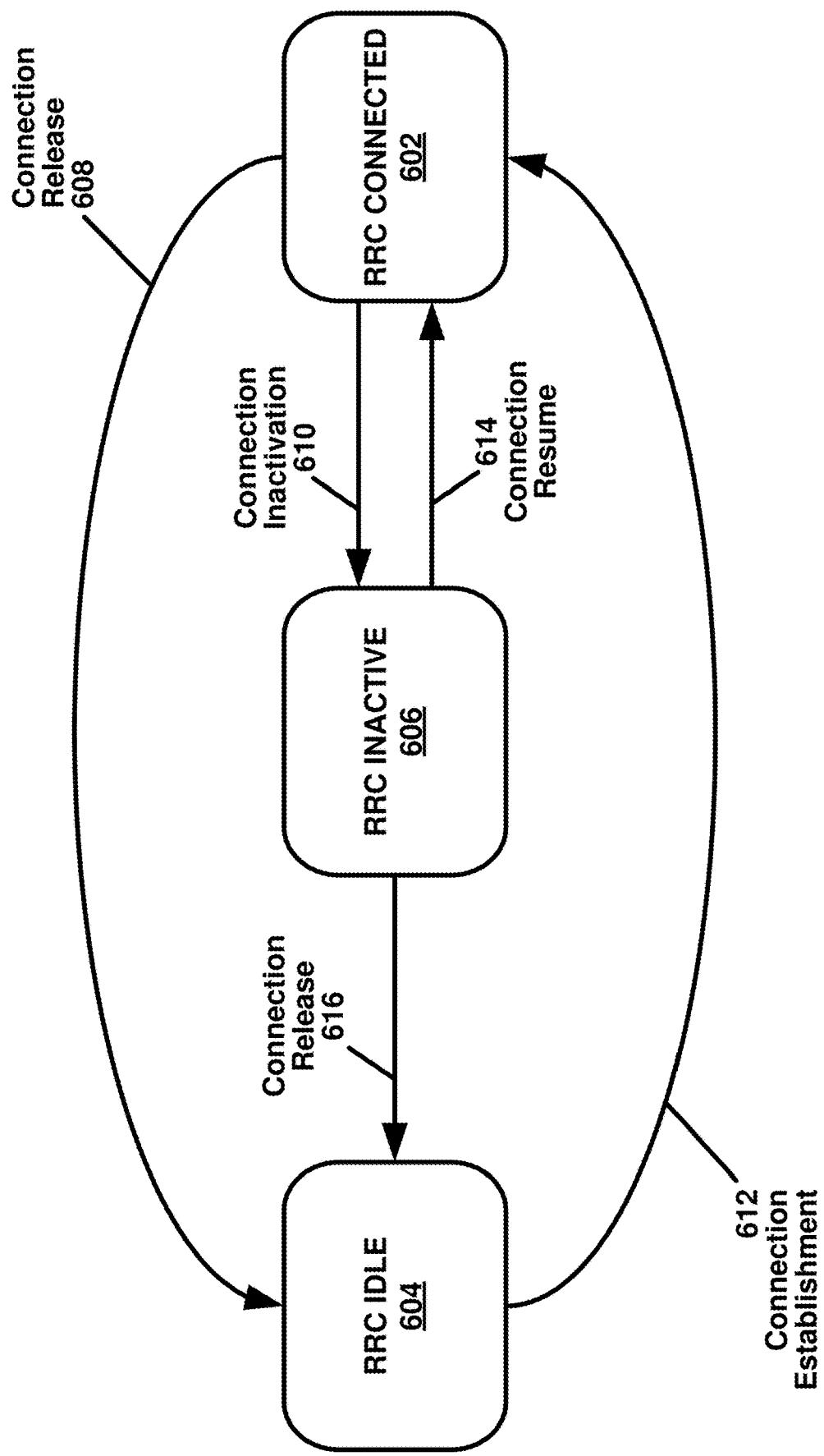
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
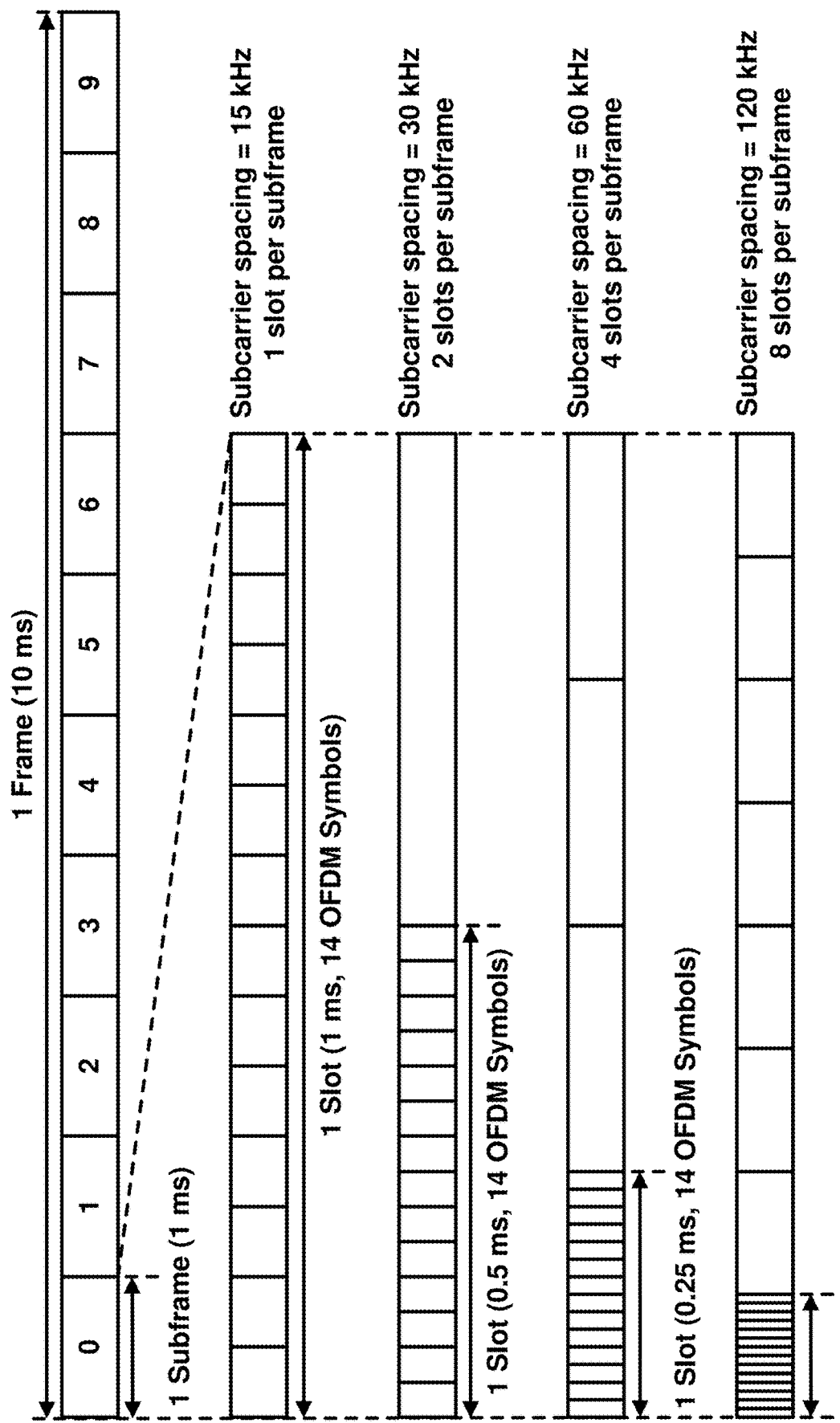
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHZ up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/ cyclic prefix duration combinations: 15 KHz/4.7 µs; 30 KHz/2.3 µs; 60 kHz/1.2 µs; 120 KHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
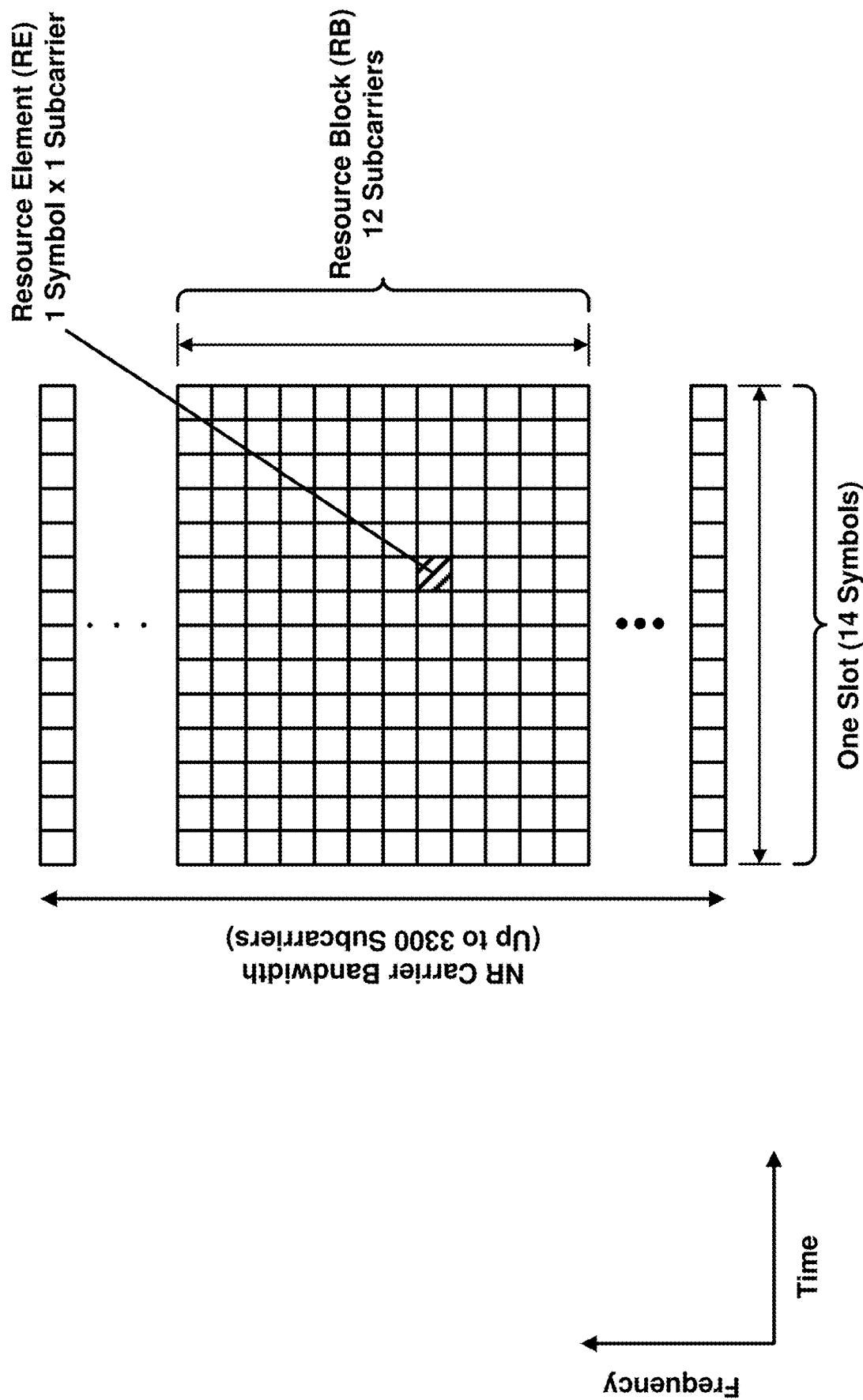
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
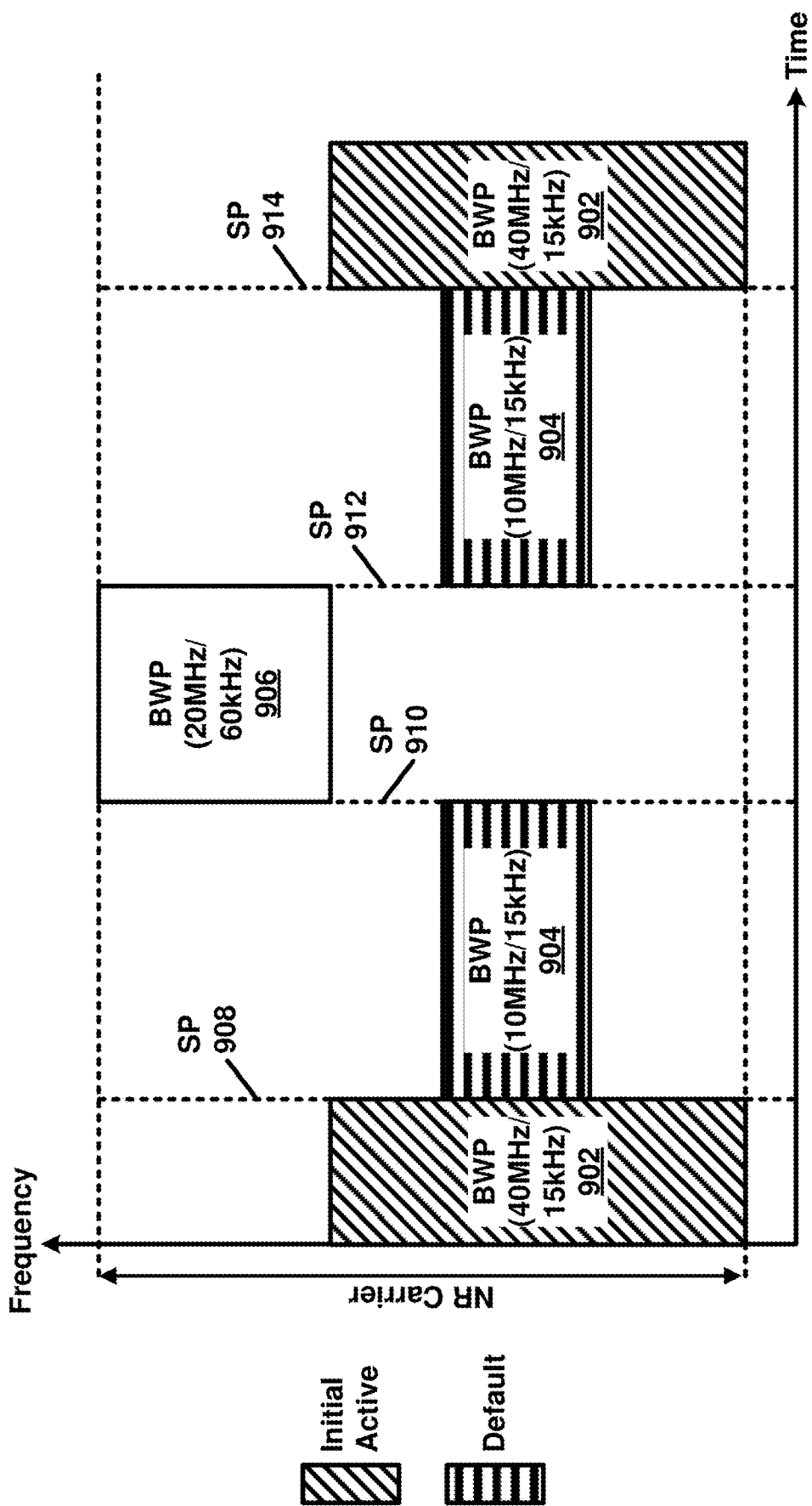
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
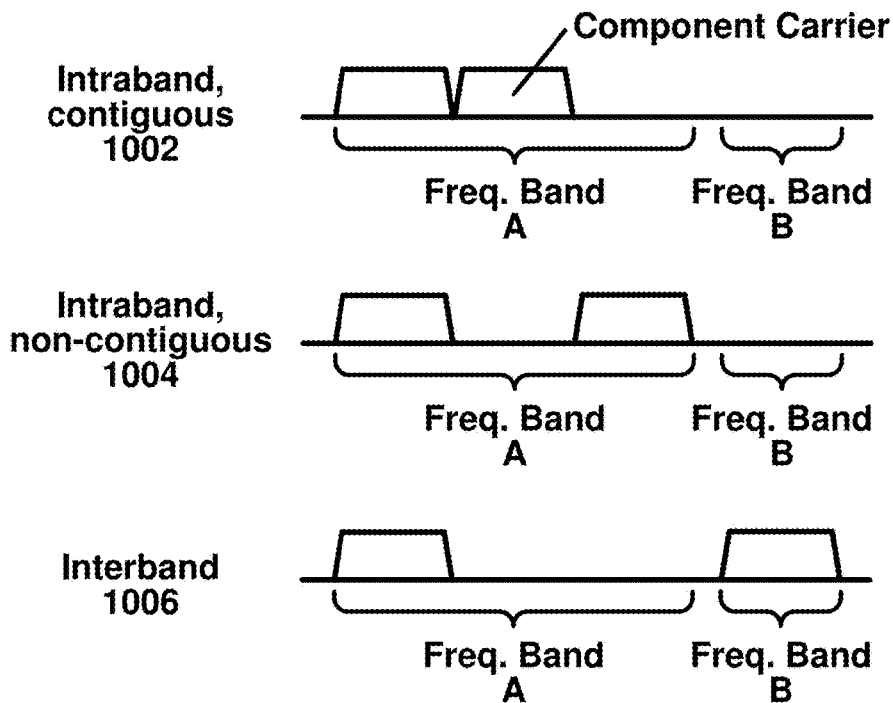
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
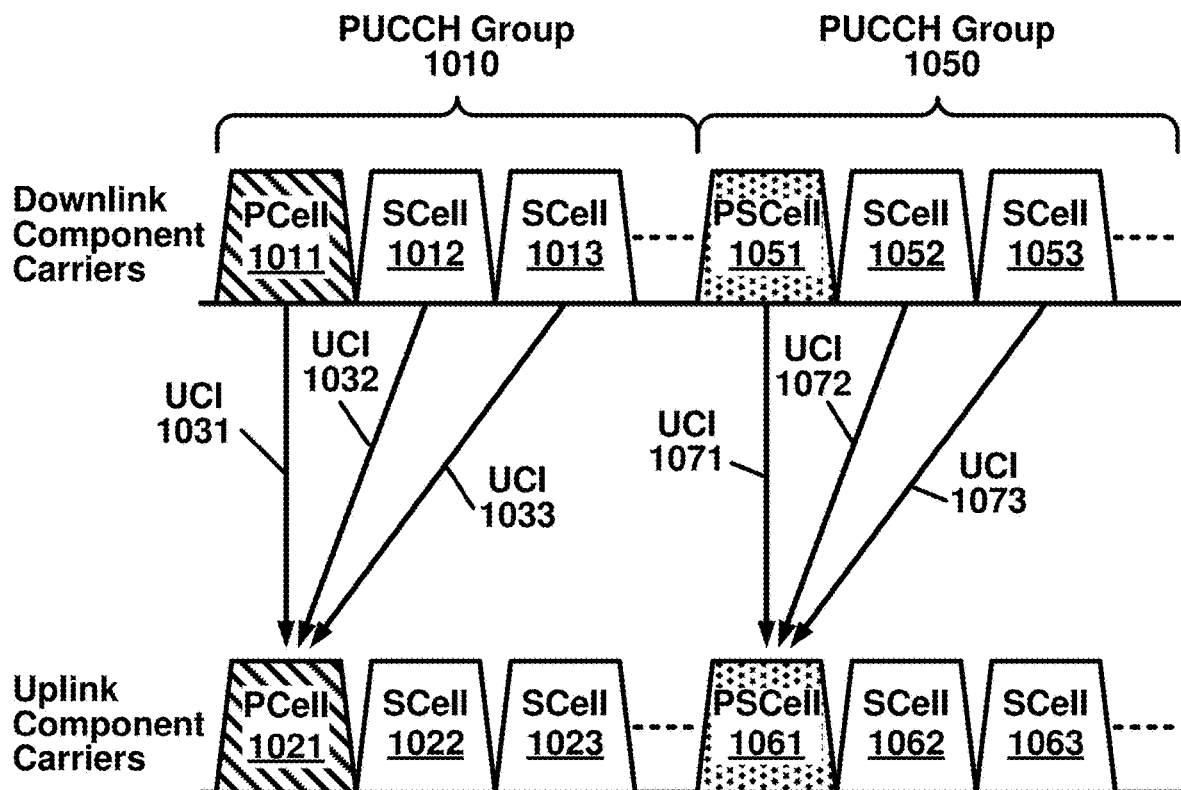
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
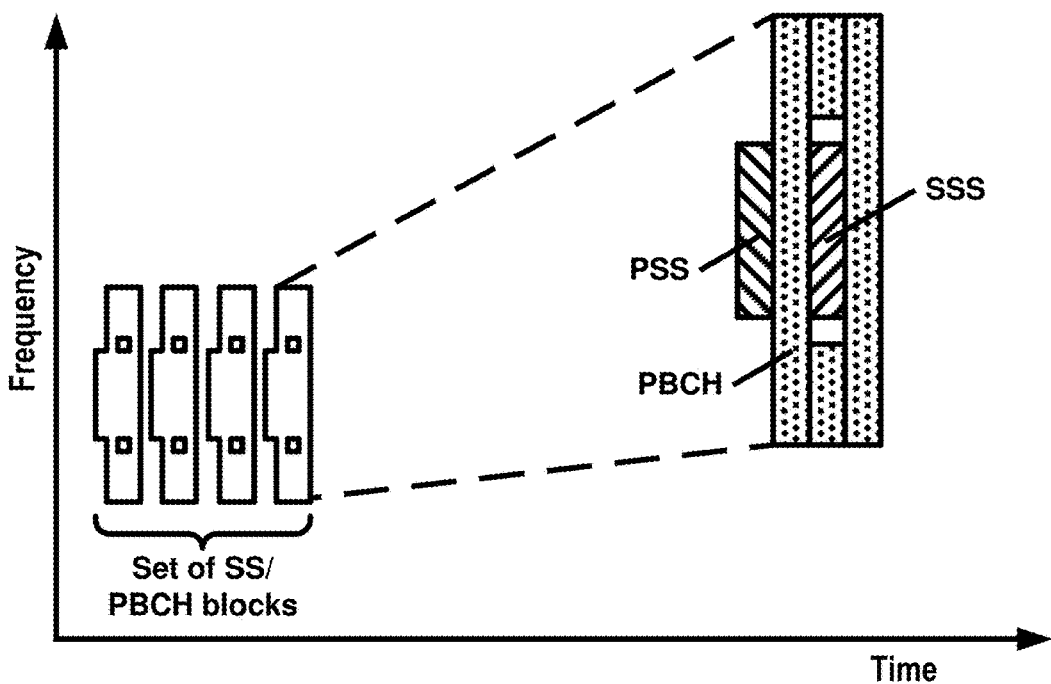
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
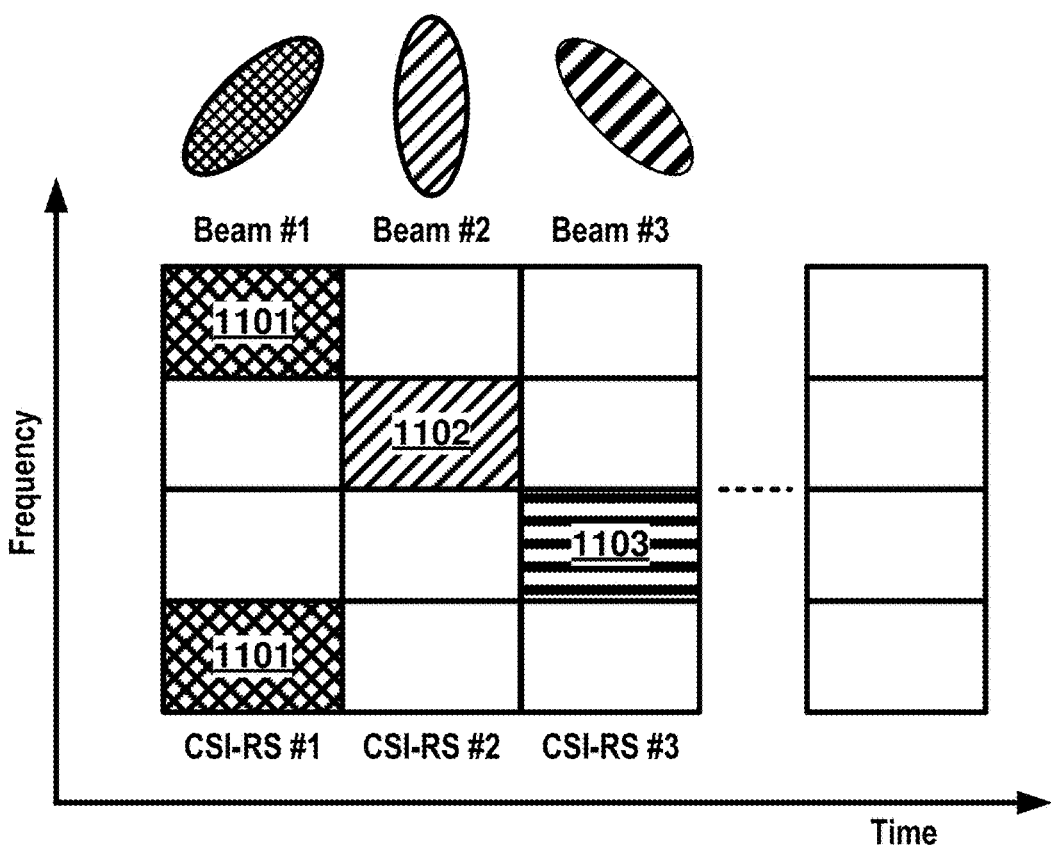
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
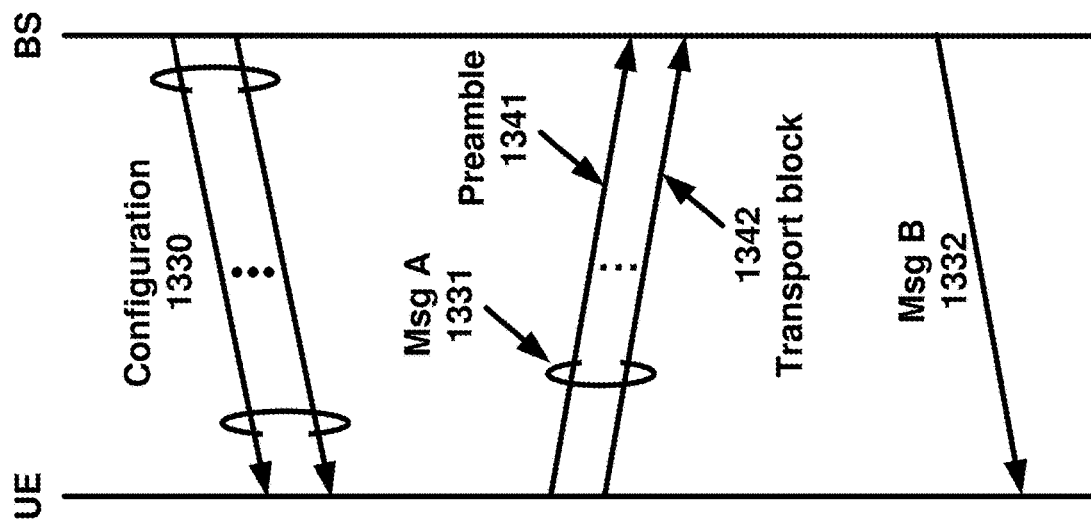
FIG. 13A, FIG. 13B, and FIG. 13C respectively illustrate a four-step contention-based random access procedure, a two-step contention-free random access procedure, and another two-step random access procedure.
Figure 13B:
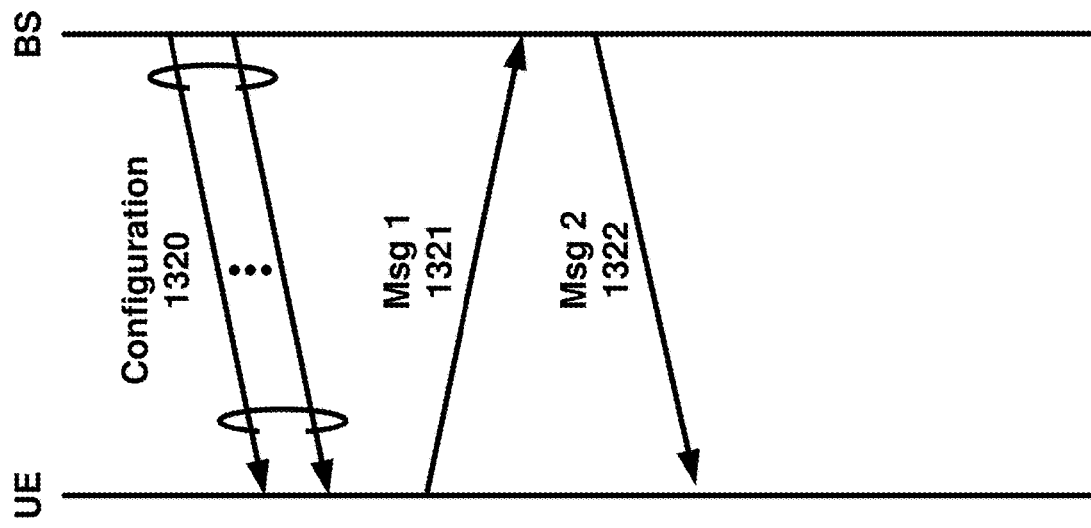
Figure 13A:
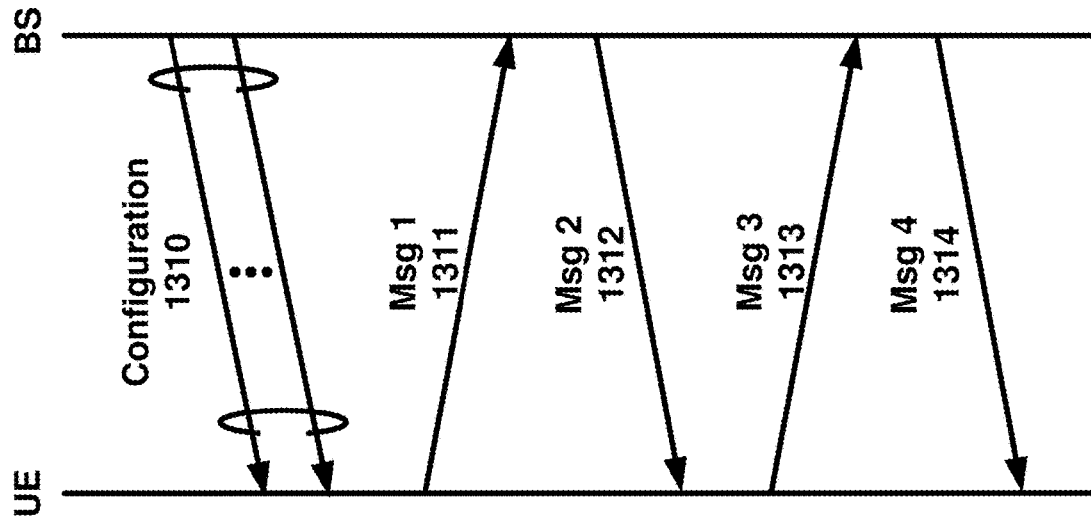

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC CONNECTED state and/or in an RRC INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preamble TransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id, where sid may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-Response Window) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
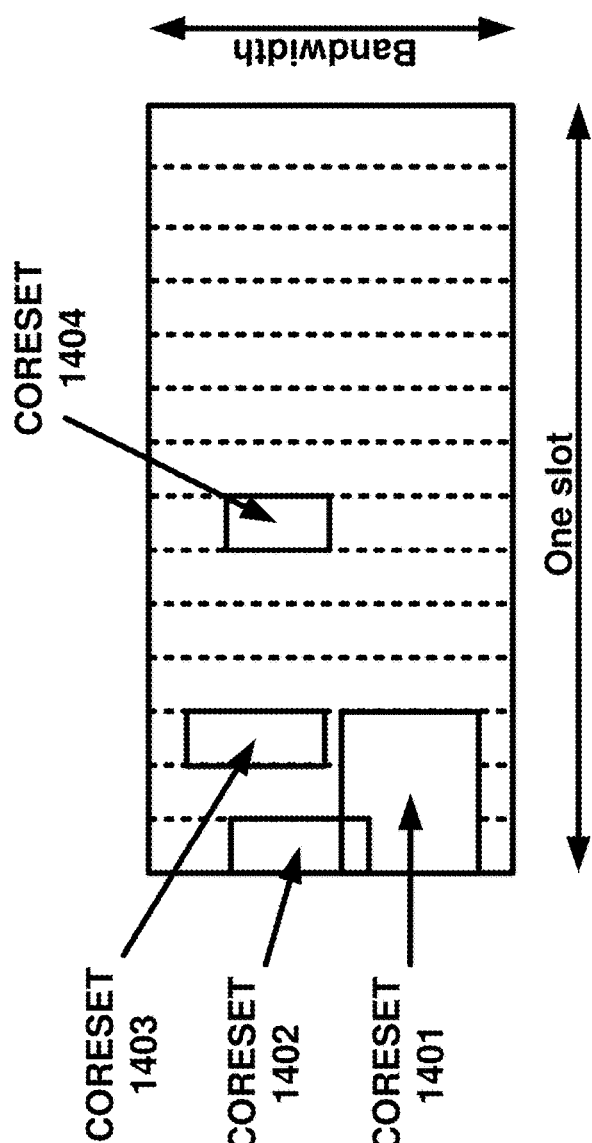
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
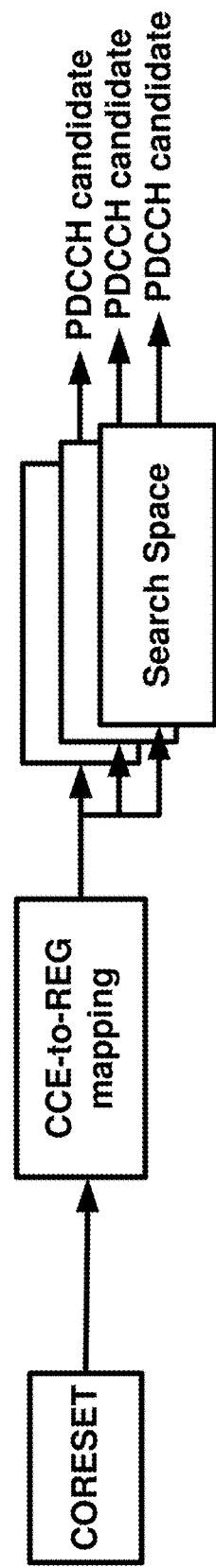
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
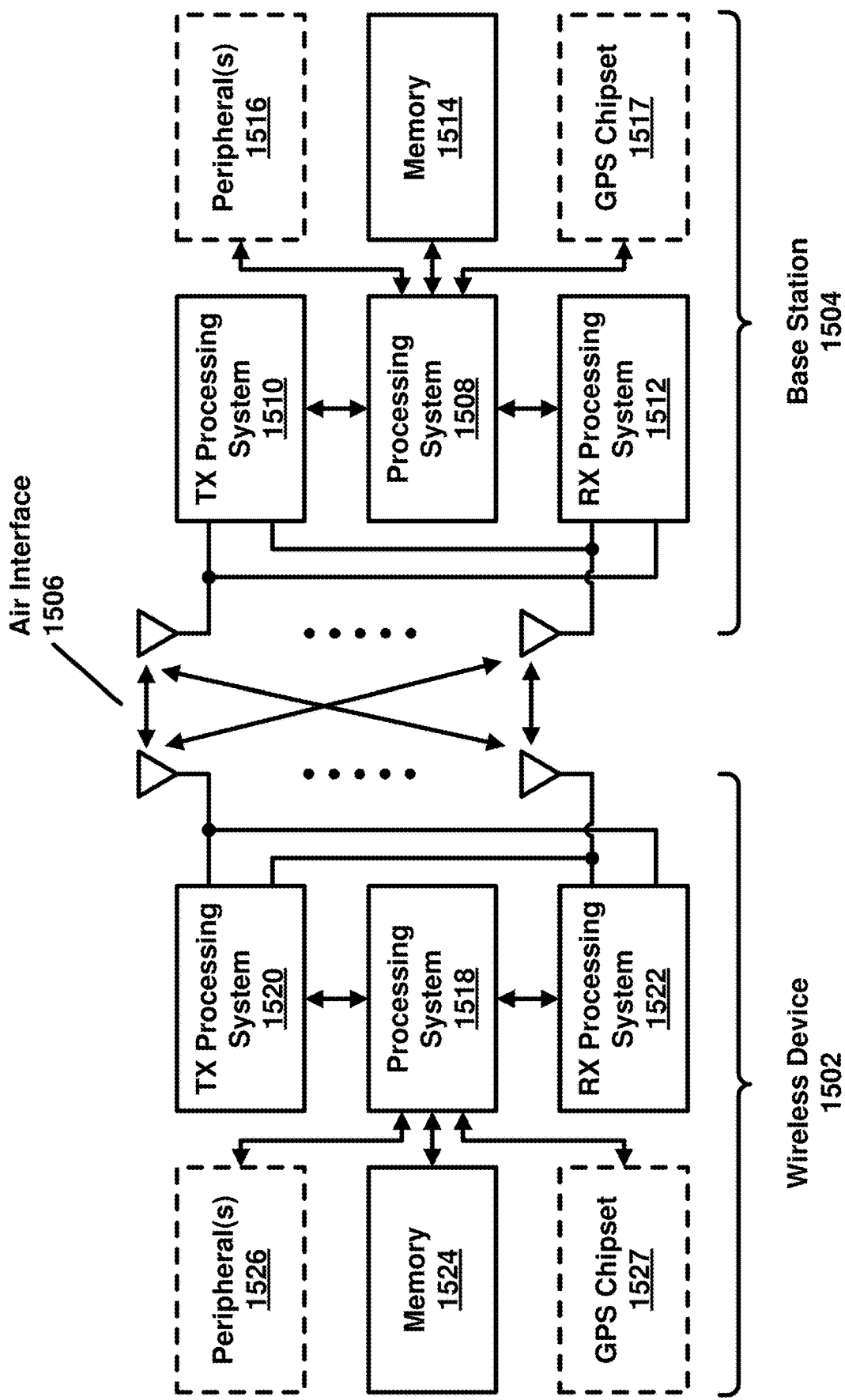
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Layer-1/2 triggered mobility (LTM) may be referred to as lower layer triggered mobility. LTM is a procedure in which a base station (e.g., gNB, cell, network, CU, DU, source DU, candidate/target DU, and the like) may receive one or more layer 1/2 (L-1/2), e.g., physical layer, medium access control (MAC) layer, lower layer, and the like, measurement reports from wireless devices. Based on (or on the basis of receiving) the one or more L-1/2 measurement reports (the one or more measurement reports may be referred to as one or more measurements), the base station may change/switch a wireless device's serving cell(s) through/via/using a control command (e.g., medium access control (MAC) control element (CE), L-1/2 control command, DCI, PDCCH, and the like). The base station may prepare one or more candidate/target cells, e.g., for LTM. The one or more candidate/target cells may comprise one or more serving cells. The one or more candidate/target cells may comprise one or more (candidate/target) non-serving cells. The one or more candidate/target cells may comprise one or more (candidate/target) SCells. The one or more candidate/target cells may comprise one or more (candidate/target) activated SCells. The one or more candidate/target cells may comprise one or more (candidate/target) deactivated SCells.

The base station may provide, e.g., for LTM (or an LTM procedure), one or more candidate (LTM) cell configurations to the wireless device through/via message(s) (e.g., RRC message(s). The message(s) may comprise configuration parameters (e.g., RRC configuration parameters). The messages(s) may indicate the one or more candidate/target cells. The one or more candidate/target (LTM) cell configurations may be for/associated with/of the one or more candidate/target cells. Each candidate/target (LTM) cell configuration may be for/associated with a respective candidate/target cell of the one or more candidate/target cells. Then (e.g., after the wireless device receives the message(s) an LTM cell switch may be triggered (e.g., by the base station/gNB), by selecting one candidate/target (LTM cell) configuration of the one or more candidate/target (LTM cell) configurations as a target (LTM cell) configuration for LTM by the base station. The one or more candidate/target (LTM cell) configurations may be added by the network/base station via RRC signaling. The one or more candidate/target (LTM cell) configurations may be modified by the network/base station via RRC signaling. The one or more candidate/target (LTM cell) configurations may be released by the network/base station via RRC signaling.

In an example, the one or more candidate/target (LTM cell) configurations may be one or more RRCReconfigurations (messages). Each RRCReconfiguration of the one or more RRCReconfigurations may be for/associated with a respective candidate/target cell of the one or more candidate/target cells. In an example, the one or more candidate/target (LTM cell) configurations may be one or more CellGroupConfig information elements (IEs). Each CellGroupConfig IE of the one or more CellGroupConfig IEs may be for/associated with a respective candidate/target cell of the one or more candidate/target cells.

In LTM, the one or more candidate/target (LTM cell) configurations may be provided (e.g., transmitted by the base station to the wireless device via second message(s)) as one or more delta configurations on top of one or more reference configurations. The one or more reference configurations may be managed separately, e.g., by the base station. The wireless device may store the one or more reference configurations as separate configuration(s), each.

In LTM, user plane may be continued whenever possible (e.g. intra-DU), without reset, with a target to avoid data loss and additional delay of data recovery. Security may not be updated in LTM. Subsequent LTM between candidate/target cell(s), of the one or more candidate/target cells, may be performed by the wireless device/base station without RRC reconfiguration. For example, the wireless device may not release candidate (LTM cell) configuration(s), of the one or more candidate/target (LTM cell) configurations, after LTM is triggered/completed.

LTM may support/comprise intra-gNB-distributed unit (DU) mobility. LTM may support/comprise intra-gNB-central/centralized unit (CU) mobility. LTM may support/comprise inter-gNB-DU mobility. LTM may support/comprise inter-frequency mobility, including mobility to inter-frequency cell that is not a current serving cell.

LTM may support/comprise PCell change in non-carrier aggregation (CA) scenario. For example, a source/serving cell may be a PCell. A candidate/target cell may not be a PCell. The wireless device may cell switch (e.g., cell switch via LTM) to a candidate/target cell. After the cell switch, the candidate/target cell may be the PCell. The source/serving cell may not be the PCell after the cell switch.

LTM may support/comprise PCell change without SCell change in CA scenario.

LTM may support/comprise PCell change with SCell changes(s) in CA scenario. For example, a target candidate/target cell (e.g., target PCell/target SCell(s) may not be a current serving cell (CA-to-CA scenario with PCell change). For example, the target PCell may be a current SCell. For example, the target SCell may be a current PCell.

LTM may support/comprise dual connectivity scenario, at least for the PSCell change without master node (MN) involvement case, e.g., intra-secondary node (SN).

Cell switch trigger information for LTM may be conveyed (e.g., by/from the base station to the wireless device) in a control command (e.g., MAC CE, activation command, cell switch command, cell switch MAC CE, cell switch command MAC CE, DCI, and the like). The MAC CE may comprise at least a candidate/target (LTM cell) configuration index. The candidate/target (LTM cell) configuration index may indicate/identify a candidate/target cell (and/or a candidate/target (LTM cell) configuration) from/among/of the one or more candidate/target cells (and/or one or more candidate/target (LTM cell) configurations). Cell-specific, radio bearer, and measurement configurations may be part of a/each candidate/target (LTM cell) configuration of the one or more candidate/target (LTM cell) configurations.

The control command may indicate TCI state(s) (or other beam information) to activate for the target/candidate Cell(s).

SCell activation/deactivation (amongst SCells associated with the candidate/target (cell) configuration) may be performed (e.g., by the wireless device and/or the base station) simultaneously with the control command (e.g., may be referred to as LTM triggering MAC CE, cell-switch MAC CE, cell switch command, cell switch command/indication, and the like).

The wireless device may perform contention based random access (CBRA) or contention free random access (CFRA) at/after cell switch (e.g., after receiving the control command, e.g., cell-switch MAC CE). The wireless device may skip random access (RA) procedure (e.g., the CBRA and/or the CFRA) if the wireless device does not need to acquire TA for the target/candidate cell during/after cell switch (e.g., in response to the wireless device determining TA of the target/candidate cell before/prior to receiving the control command). RACH resources for CFRA may be provided by the base station in one or more configuration parameters (or via the one or more candidate/target (LTM cell) configurations).

In an example, the control command may indicate/provide CFRA resources. The wireless device may perform CFRA in/via the candidate/target cell using the CFRA resources.

Figure 17:
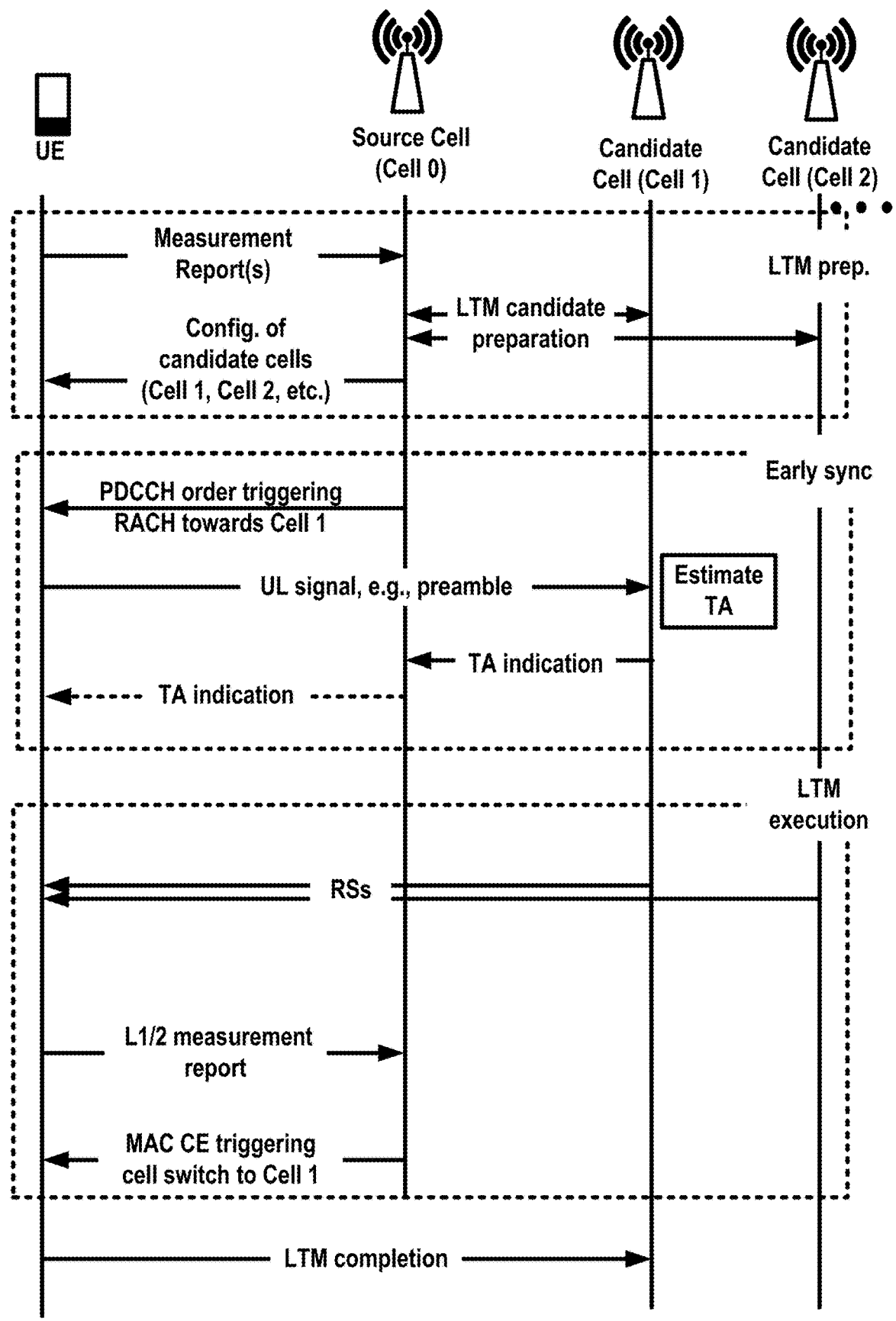
FIG. 17 shows procedure(s) for LTM.

FIG. 17 shows procedure(s) for LTM. Subsequent LTM may be done/performed (e.g., by the base station/wireless device) by repeating early synchronization, LTM execution, and/or LTM completion steps/procedures (as shown in FIG. 17) without releasing other candidates (e.g., the one or more candidate/target (LTM cell) configurations) after each LTM completion.

In the example of FIG. 17, the wireless device (e.g., UE in FIG. 17) may transmit one or more measurement reports. The one or more measurement reports may be, for example, one or more layer 3 (L3) measurement reports. The wireless device may transmit the one or more measurement reports to/via a base station/gNB (e.g., via Cell 0 in FIG. 17, a source/serving cell). The base station may determine to use/perform LTM, for example, based on the one or more measurement reports. The base station may initiate LTM candidate preparation (e.g., LTM prep. as shown in FIG. 17), for example, by coordinating with one or more candidate/target cells (e.g., one or more DUs, one or more source DUs, one or more candidate/target DUs, and the like).

The base station may transmit one or more messages (e.g., RRC messages) to the wireless device. The one or more messages may comprise one or more candidate/target (LTM) cell configurations, e.g., for LTM/LTM procedure(s). The one or more messages may comprise one or more configuration parameters indicating/comprising the one or more candidate/target (LTM) cell configurations. The one or more candidate/target (LTM) cell configurations may be one or more RRCReconfiguration (parameters/messages). The wireless device may receive, from/via the base station (e.g., via a source/serving cell), a respective candidate/target (LTM cell) configuration for each candidate/target cell of the one or more candidate/target cells. The wireless device may store the one or more candidate/target (LTM cell) configurations of the one or more candidate/target cells. The wireless device may transmit RRCReconfigurationComplete message(s) to/via the base station (e.g., via the source/serving cell, Cell 0 in FIG. 17), for example, based on receiving and/or storing the one or more candidate/target (LTM cell) configurations.

The wireless device may perform early synchronization (e.g., early sync as shown in FIG. 17). The early synchronization may comprise DL synchronization to/with/for/of candidate/target cell(s) of the one or more candidate/target cells (e.g., indicated in the one or more candidate/target (LTM cell) configurations). The wireless device may perform DL synchronization to/with/for/of candidate/target cell(s) before receiving the control command (e.g., cell switch MAC CE), for example, based on/using one or more reference signals (e.g., based on measuring the one or more reference signals (e.g., SSB, CSI-RS, CRS, and the like), wherein each reference signal (RS) of the one or more reference signals is associated/for/from/via a respective candidate/target cell of the one or more candidate/target cells).

The wireless device may perform timing advance (TA) acquisition (e.g., using an RA procedure as shown in FIG. 17 by transmitting an RA preamble, or without an RA procedure, e.g., based on wireless device/UE-based TA measurements, and the like). The wireless device may perform TA acquisition (e.g., acquire TA(s) for/of/associated with candidate/target cell(s) of the one or more candidate/target cells). The wireless device may perform the TA acquisition, for example, before receiving a (LTM) cell switch command (e.g., MAC CE).

The wireless device may acquire the TA(s) using an RA procedure (e.g., as shown in FIG. 17) based on receiving a PDCCH order (triggering RA channel (RACH) transmission) towards/for/of/to/via one or more candidate/target cells. The wireless device may receive the PDCCH order from/via the source cell.

The wireless device may perform L-1/2 measurements on each/any candidate/target cell of the one or more candidate/target cells. The wireless device may transmit the L-1/2 (lower-layer) measurement reports to the base station (e.g., via the source/serving cell). The wireless device may determine the L-1/2 measurement reports based on measuring one or more reference signals (RSs) from/associated with the one or more candidate/target cells, wherein at least one RS of the one or more RSs is from/associated with a respective candidate/target cell of the one or more candidate/target cells.

The base station/gNB may decide to execute LTM cell switch to a target/candidate cell, of the one or more candidate/target cells, for example, based on (receiving) the L-1/2 measurements. The base station may transmit (e.g., via the source cell) a control command (e.g., cell switch MAC CE) triggering LTM cell switch (e.g., cell switch, cell switch for LTM, and the like). The control command may comprise a candidate/target (LTM cell) configuration index. The candidate/target (LTM cell) configuration index may indicate/identify a candidate/target (LTM cell) configuration, of the one or more candidate/target (LTM cell) configurations, of/for/associated with the target/candidate cell. The wireless device may switch to/use the configuration of the (LTM) candidate/target cell indicated in the control command.

The wireless device may perform an RA procedure via/in the candidate/target cell (e.g., if a TA for/of the candidate/target cell is not available/valid at the wireless device).

The wireless device may indicate, for example, to/via the candidate/target cell/gNB/base station, of a successful completion of (LTM) cell switch towards the candidate/target cell. The wireless device may transmit one or more uplink (UL) messages to indicate LTM completion. LTM completion may comprise the successful completion of (LTM) cell switch towards the candidate/target cell.

Although the present disclosure may refer to an LTM (or LTM procedure), this procedure may alternatively be referred to as a cell switch procedure triggered by a control command/cell switch command (e.g., MAC CE, Layer 1/2 command/message, and the like) or as Layer 1/2 triggered mobility, MAC CE triggered cell switch procedure, non-handover, non-handover mobility, non-handover reconfiguration with sync, non-reconfiguration with sync mobility, and the like.

Downlink (DL), uplink (UL), and/or sidelink transmissions may be organized into frames with $T_f=(\Delta f_{max} N_f/100) T_c=10$ ms) duration, each consisting of ten subframes of $T_{sf}=(\Delta f_{max} N_f/1000) T_c=1$ ms) duration. The number of consecutive OFDM symbols per subframe may be $N_{symb}^{subframe,\mu}=N_{symb}^{slot} N_{symb}^{slot} N_{slot}^{subframe,\mu}$. Each frame may be divided into two equally-sized half-frames of five subframes each with half-frame 0 consisting of subframes 0-4 and half-frame 1 consisting of subframes 5-9.

There may be one set of frames in the uplink and one set of frames in the downlink on a carrier.

UL frame number i for transmission from a wireless device may start $T_{TA}=(N_{TA}+N_{TA,offset}+N_{TA,adj}^{common}+N_{TA,adj}^{UE})T_c$ before a start of a corresponding DL frame at the wireless device where $N_{TA}$ and $N_{TA,offset}$ may be provided by one or more configuration parameters and/or TA commands, except for msgA transmission on PUSCH where $N_{TA}=0$ may be used.

A wireless device may receive one or more messages comprising one or more configuration parameters (e.g., higher layer parameters, RRC parameters, and the like). The one or more configuration parameters (e.g., n-TimingAdvanceOffset) may indicate a value of a timing advance offset (e.g., N_(TA,offset) of/for a cell (e.g., serving cell, non-serving cell). In an example, the one or more configuration parameters may not indicate a value of a timing advance offset (e.g., N_(TA, offset) of/for a cell. The one or more configuration parameters may not comprise n-TimingAdvanceOffset. Based on the one or more configuration parameters not indicating a value of a timing advance offset (e.g., N_(TA, offset) of/for the cell, the wireless device may determine a default value for/of the timing advance offset (e.g., N_(TA,offset)) of/for the cell.

The one or more configuration parameters may indicate at least two uplink carriers for a cell. The at least two uplink carriers may comprise a first uplink carrier (e.g., NUL) and a second uplink carrier (e.g., SUL). The wireless device may apply a same value of the timing advance offset (e.g., N_(TA, offset) to the first uplink carrier and the second uplink carrier. The wireless device may determine/calculate, for transmission of a first uplink signal via the first uplink carrier, a first timing advance based on the value (or default value) of the timing advance offset. The wireless device may transmit, via the first uplink carrier, the first uplink signal based on the first timing advance. The wireless device may determine/calculate, for transmission of a second uplink signal via the second uplink carrier, a second timing advance based on the value (or default value) of the timing advance offset. The wireless device may transmit, via the second uplink carrier, the second uplink signal based on the second timing advance. In an example, the first timing advance of (or associated with or corresponding to) the first uplink carrier and the second timing advance of (or associated with or corresponding to) the second uplink carrier may be the same.

The one or more configuration parameters may indicate one or more timing advance groups (TAGs). The one or more TAGS may comprise (or be associated with) one or more cells. Each TAG of the one or more TAGS may comprise respective cell(s) of the one or more cells. The one or more configuration parameters may indicate, for each cell of the one or more cells, a respective TAG of the one or more TAGS.

The wireless device may receive a timing advance command (e.g., in a random access response or in an absolute timing advance command MAC CE or a timing advance command MAC CE) for a TAG of the one or more TAGs. The timing advance command may, for example, comprise a field (e.g., TAG ID) indicating/identifying the TAG. The wireless device may, for example, receive the timing advance command via a cell associated with the TAG. The TAG may comprise at least one cell that comprise the cell. The one or more cells may comprise the at least one cell that comprise the cell. The wireless device may adjust/determine an uplink timing for uplink transmissions (e.g., PUCCH/PUSCH/SRS transmissions) on/via each cell of the at least one cell in the TAG, for example, based on the timing advance command. The wireless device may adjust/determine the uplink timing for the uplink transmissions on/via each cell of the at least one cell in the TAG, for example, based on a value (or a default value) of a timing advance offset (e.g., N_(TA,offset). In an example, the value (or the default value) of the timing advance offset may be the same for each cell of the at least one cell in the TAG. In an example, the uplink timing may be the same for each cell of the at least one cell in the TAG. In an example, the uplink timing of the uplink transmissions (e.g., PUCCH/PUSCH/SRS transmission) may be the same for each cell of the at least one cell.

For a subcarrier spacing (SCS) of kHz, a timing advance command, received by the wireless device, for a TAG of the one or more TAGS may indicate a change of an uplink timing relative to the current uplink timing for the TAG in multiples of.

The wireless device may receive a timing advance command (e.g., T_A) for a TAG of the one or more TAGS.

In an example, a random-access response or in an absolute timing advance command MAC CE may indicate/comprise the timing advance command. The wireless device may receive the timing advance command in the random-access response or in the absolute timing advance command MAC CE. The timing advance command may indicate a timing advance value (e.g., N_"TA") by an index value (e.g., T_A=0, 1, 2, ..., 3846). The wireless device may determine/calculate/adjust an amount/quantity of the timing advance value (or the time alignment) for/of the TAG with SCS of $2^\mu \cdot 15$ kHz as N TA=T A·16·64/$2^\mu$. The timing advance value may be relative to a SCS of a starting/earliest/first uplink transmission from the wireless device after the reception of the random-access response or the absolute timing advance command MAC CE.

In an example, a timing advance command MAC CE may indicate/comprise the timing advance command. The wireless device may receive the timing advance command in the timing advance command MAC CE. The timing advance command may indicate adjustment of a current timing advance value, N_(TA_old), to a new timing advance value, N_(TA_new), by an index value (e.g., T_A=0, 1, 2 ..., 63). For a SCS of $2^\mu \cdot 15$ kHz, the wireless device may determine the new timing advance value as N_(TA_new)=N_(TA_old)+(T_A-31)·16·64/$2^\mu$.

Each cell of the at least one cell in the TAG may have/comprise (or be indicated/configured, by the one or more configuration parameters, with) respective uplink carrier(s) (e.g., NUL and/or SUL). For example, a first cell of the at least one cell may comprise a first uplink carrier (e.g., NUL). A second cell of the at least one cell may comprise a second uplink carrier (e.g., SUL). A third cell of the at least one cell may comprise the first uplink carrier (e.g., NUL) and the second uplink carrier (e.g., SUL). The wireless device may be active in (or may activate) a plurality of uplink BWPs for/of one or more uplink carriers of the at least one cell in the TAG. The wireless device may be active in (or may activate) a respective uplink BWP, of the plurality of uplink BWPs, of the one or more uplink carriers of each cell of the at least one cell. The TAG may comprise the plurality of uplink BWPs of the at least one cell. The timing advance command (or a value in (or indicated by) the timing advance command) may be relative to the largest SCS of/among the plurality of uplink BWPs. The new timing advance value (e.g., N_(TA_new) for an uplink BWP, of the plurality of uplink BWPs, with a lower SCS may be rounded, by the wireless device, to align with the timing advance granularity for the uplink BWP with the lower SCS.

Adjustment of the timing advance (TA) value (e.g., N_TA) by a positive or a negative amount may indicate advancing or delaying an uplink transmission timing for the TAG by a corresponding amount, respectively.

The wireless device may receive a timing advance command (TAC) for a TAG of the one or more TAGS. The TAG may comprise at least one cell of the one or more cells. The wireless device may receive, in/on/via an uplink time slot n, the timing advance command. The wireless device may adjust an uplink transmission timing based on the timing advance command. The wireless device may apply adjustment of the uplink transmission timing from beginning of a second uplink time slot. The wireless device may apply the adjustment of the uplink transmission timing for transmission of an uplink signal (e.g., PUSCH/PUSCH/SRS transmission). The wireless device may apply the adjustment of the uplink transmission timing for transmission of the uplink signal via a cell of the at least one cell (or via an uplink carrier of a cell of the at least one cell). The transmission of the uplink signal may not comprise, for example, a PUSCH transmission scheduled by a RAR uplink grant or a fallback RAR uplink grant. The transmission of the uplink signal may not comprise, for example, a PUCCH transmission with HARQ-ACK information in response to a success AR. The wireless device may apply the adjustment of the uplink transmission timing for uplink transmissions via the at least one cell. The wireless device may determine the second uplink time slot as the uplink time slot n+k+1 ⌊ +2⌋ $^\mu$·K_offset where k=⌈N_slot^(subframe,μ)·(N_(T,1)+N_(T,2)+N_(TA,max)+0.5))/T_sf⌉. For example, N_(T,1) may be a time duration in msec of N_1 symbols corresponding to a PDSCH processing time for UE processing capability 1 when additional PDSCH DM-RS is configured (or is indicated by the one or more configuration parameters). For example, N_(T,2) may be a time duration in msec of N_2 symbols corresponding to a PUSCH preparation time for UE processing capability 1. For example, N_(TA,max) may be a maximum timing advance value in msec that can be provided by a TA command field of 12 bits. For example, N_slot^(subframe,μ) may be a number of slots per subframe. For example, T_sf may be a subframe duration of 1 msec. For example, K_offset=K_(cell, offset)-K_(UE,offset). In an example, the one or more configuration parameters may indicate the K_(cell,offset) (e.g., provided by Koffset in ServingCellConfigCommon). In an example, the one or more configuration parameters may not indicate a value for K_(cell, offset) (e.g., Koffset is absent in ServingCellConfigCommon). The wireless device may determine a default value for K_(cell,offset)=0 based on the one or more configuration parameters not indicating a value for K_(cell, offset). For example, the wireless device may receive a MAC CE command indicating the K_(UE, offset). For example, the wireless device may not receive a MAC CE command indicating a value for K_(UE,offset). The wireless device may determine a default value for K_(UE, offset)=0 based on not receiving a MAC CE command indicating a value for K_(UE,offset). The wireless device may determine N_1 and N_2 with respect to the minimum SCS among the SCSs of all configured uplink BWPs for all uplink carriers of the at least one cell in the TAG and of all configured downlink BWPs for the corresponding downlink carriers (or for the at least one cell). For μ=0, the wireless device may determine/assume N_1,0=14. The wireless device may determine the uplink time slot n and N_slot^(subframe,μ) with respect to the minimum SCS among the SCSs of all configured uplink BWPs for all uplink carriers of the at least one cell in the TAG. The wireless device may determine N_(TA, max) with respect to the minimum SCS among the SCSs of all configured uplink BWPs for all uplink carriers of the at least one cell in the TAG and for all configured initial uplink BWPs indicated by the one or more configuration parameters (e.g., provided by initialUplinkBWP). The uplink time slot n may be the last slot among uplink slot(s) overlapping with the slot(s) of a PDSCH reception assuming T_TA=0, where the PDSCH reception indicates/comprises/provides the timing advance command.

The wireless device may change an active uplink BWP of a cell of the at least one cell in the TAG. The wireless device may activate (or switch to a new uplink BWP of the cell) based on the changing the active uplink BWP. The wireless device may change the active uplink BWP between a first time of a reception of the timing advance command and a second time of applying the adjustment of the uplink transmission timing. Based on the changing the active uplink BWP between the first time and the second time, the wireless device may determine a value of the timing advance command (or a timing advance value) based on a SCS of the new active UL BWP. The wireless device may change the active uplink BWP after the second time. The wireless device may determine/assume a same absolute value for the timing advance command (or the same absolute timing advance value) before and after the change of the active uplink BWP.

A received downlink timing may change. The change of the received downlink timing may not be compensated or may be partly compensated by the adjustment of the uplink transmission timing without a timing advance command. In this case, the wireless device may change a timing advance value (e.g., N_TA) accordingly.

Two adjacent slots may overlap, for example, based on a timing advance command. The latter slot of the two adjacent slots may be reduced in duration relative to the former slot of the two adjacent slots, for example, based on the two adjacent slots overlapping. The wireless device may not change a timing advance value (e.g., N_TA) during an actual transmission time window for an uplink transmission (e.g., PUSCH/PUCCH/SRS transmission).

A wireless device may receive, e.g., from a base station, one or more messages comprising one or more configuration parameters (e.g., RRC configuration parameters, RRC reconfiguration parameters). The one or more configuration parameters comprise one or more cell group configuration parameters (e.g., provided by MAC-CellGroupConfig). The one or more cell group configuration parameters may comprise a TAG configuration (e.g., tag-Config). The TAG configuration may be used, by the wireless device and/or the base station, to configure parameters for a time-alignment group. The TAG configuration may indicate one or more TAGs. A maximum number of the one or more TAGS (e.g., maxNrofTAGs) may be equal to a value (e.g., 4, 5, 6, 7, 8, and the like).

The TAG configuration may indicate one or more TAG indexes/identifiers (e.g., TAG-Id) for the one or more TAGs. The TAG configuration may indicate a respective TAG index/identifier of the one or more TAG indexes/identifiers for each TAG of the one or more TAGS. Each TAG of the one or more TAGs may be identified by/with a respective TAG index (e.g., 0, 1, . . . , maxNrofTAGs-1) of the one or more TAG indexes. A TAG index of a TAG of the one or more TAGs may indicate the TAG of a cell (e.g., SpCell, SCell). A TAG index of a TAG of the one or more TAGS may indicate the TAG within the scope of a cell group (e.g., MCG, SCG). The one or more TAG indexes may comprise the TAG index.

The TAG configuration may indicate one or more time alignment timers (e.g., TimeAlignmentTimer) for the one or more TAGS. The TAG configuration may indicate a respective time alignment timer (TAT) of the one or more time alignment timers for each TAG of the one or more TAGS. Each TAG of the one or more TAGS may be associated with (or correspond to) a respective time alignment timer of the one or more time alignment timers. Value of a time alignment timer of the one or more time alignment timers may be in ms (e.g., 500 ms, 750 ms, . . . , 5120 ms, 10240 ms, or infinity). A time alignment timer of a TAG may indicate/control how long cell(s) in (or belonging to or associated with or corresponding to) the TAG are uplink time aligned. The one or more time alignment timers may comprise the time alignment timer. The one or more TAGS may comprise the TAG.

The one or more configuration parameters may indicate, for a cell, a TAG index of the one or more TAG indexes. The TAG index may indicate/identify a TAG of the one or more TAGS. The one or more configuration parameters may comprise one or more serving cell configuration parameters (e.g., ServingCellConfig) of the cell. The one or more serving cell configuration parameters of the cell may comprise/indicate the TAG index indicating/identifying the TAG. The cell may belong to (or may be associated with or may correspond to) the TAG, for example, based on the one or more configuration parameters indicating, for the cell, the TAG index indicating/identifying the TAG. The TAG may comprise (or may be associated with or may correspond to) the cell, for example, based on the one or more configuration parameters indicating, for the cell, the TAG index indicating/identifying the TAG.

A wireless device may be capable of handling a relative transmission timing difference between subframe timing boundary of E-UTRA PCell and the closest slot timing boundary of PSCell to be aggregated for EN-DC operation.

A wireless device may be capable of handling a relative transmission timing difference among the closest slot timing boundaries of different carriers to be aggregated in NR carrier aggregation.

A wireless device may be capable of handling a relative transmission timing difference between slot timing boundary of PCell and subframe timing boundary of E-UTRA PSCell to be aggregated for NE-DC operation.

A wireless device may be capable of handling a relative transmission timing difference between slot timing boundaries of PCell and the closest slot timing boundary of PSCell to be aggregated in NR DC operation.

A wireless device may be capable of handling at least a relative transmission timing difference between slot timing of all pairs of TAGs (or all pairs of the one or more TAGS). The wireless device may be capable of handling at least a relative transmission timing difference between slot timing of all pairs of the TAGs, for example, based on the one or more configuration parameters indicating a primary TAG (pTAG) and a secondary TAG (sTAG) for inter-band NR carrier aggregation in standalone (SA) or NR-DC mode. The wireless device may be capable of handling at least a relative transmission timing difference between slot timing of all pairs of the TAGs, for example, based on the one or more configuration parameters indicating more than one sTAG for inter-band NR carrier aggregation in EN-DC or NE-DC mode.

The one or more TAGS may comprise a first TAG and a second TAG.

The first TAG may be/operate in FR1. The second TAG may be/operate in FR1. A maximum uplink transmission timing difference between the first TAG and the second TAG may be 34.6 microseconds (/mu).

The first TAG may be/operate in FR2. The second TAG may be/operate in FR2. A maximum uplink transmission timing difference between the first TAG and the second TAG may be 8.5 microseconds (/mu). The wireless device may be capable of independent beam management for FR2 inter-band carrier aggregation.

In an example, the first TAG may be/operate in FR1 and the second TAG may be/operate in FR2. In an example, the first TAG may be/operate in FR2 and the second TAG may be/operate in FR1. A maximum uplink transmission timing difference between the first TAG and the second TAG may be 26.1 microseconds (/mu).

In RRC_CONNECTED, a base station may maintain the timing advance to keep a layer 1 (L1) of a wireless device synchronized. Serving cells having/with uplink to which the same timing advance applies and using the same timing reference cell may be grouped, by the bases station, in a TAG of one or more TAGS. Each TAG of the one or more TAGs may contain/comprise at least one serving cell configured with uplink. The mapping of each serving cell to a (respective) TAG may be configured/indicated by RRC configuration parameters (e.g., tag-Id).

For a primary TAG (pTAG), the wireless device may use the PCell as timing reference, except with shared spectrum channel access where an SCell can also be used in certain cases. In a secondary TAG (sTAG), the wireless device may use any of the activated SCells of this TAG (or the sTAG) as a timing reference cell.

Timing advance updates may be signaled/indicated by the base station to the wireless device via MAC CE commands. Based on receiving the MAC CE commands, the wireless device may start or restart a TAG-specific timer (e.g., time alignment timer). The TAG-specific timer may indicate whether the L1 of the wireless device is synchronized or not. For example, when the TAG-specific timer is running, the L1 may be (considered) synchronized. When the TAG-specific timer is not running, the L1 may be (considered) non-synchronized. When the L1 is non-synchronized, the wireless device may transmit/perform an uplink transmission through/via MSG1/MSGA. When the L1 is non-synchronized, the wireless device may not transmit/perform an uplink transmission through/via PUSCH/PUCCH/SRS.

A wireless device may transmit/report, to a base station, a user-equipment (UE) capability message (e.g., UE capability information). The wireless device may transmit/report, to the base station, the UE capability message, for example, based on receiving, from the base station, a UE capability enquiry/request. The base station may request, via/by the UE capability enquiry/request, from the wireless device to send/transmit the UE capability message. The UE capability message (or the UE capability information) may be an RRC message that the wireless device transmits/sends/reports to the base station. The wireless device may transmit the UE capability message, for example, during initial registration process.

The UE capability message may indicate a supported number of TAGs (supportedNumberTAG). The UE capability message may comprise carrier aggregation (CA) parameters indicating/comprising the supported number of TAGs by the wireless device. The supported number of TAGs may be applied, by the wireless device and/or the base station, to NR CA, NR-DC, (NG)EN-DC/NE-DC and DAPS handover.

For (NG)EN-DC/NE-DC, the supported number of TAGs may indicate a number of TAGs for NR CG. A number of TAGs for the LTE MCG may be signaled/indicated, from the base station to the wireless device, by LTE TAG capability signaling. For NR CA/NR-DC band combination, if the band combination comprises more than one band entry (i.e., inter-band or intra-band non-contiguous band combination), the supported number of TAGs may indicate that different timing advances on different band entries are supported. The supported number of TAGs may be more than one for NR-DC. It may be mandatory for the wireless device to support more than one TAG for NR-DC.

The supported number of TAGs may be two for inter-frequency DAPS. It may be mandatory for the wireless device to support 2 TAGS for inter-frequency DAPS. For the mixed inter-band and intra-band NR CA/NR-DC band combination, if the base station configures, e.g., by one or more configuration parameters, more non-contiguous uplink serving cells than the supported number of TAGs, the one or more configuration parameters indicate the same TAG (or the same TAG Id/index) for one or more uplink serving cells of the same frequency band.

The UE capability message may not indicate/comprise a supported number of TAGs (supportedNumberTAG). A supported number of TAGs may be absent in the UE capability message. The wireless device may support a single TAG (or only one TAG) based on the supported number of TAGs being absent in the UE capability message. The wireless device may support the single TAG for NR.

The maximum number of the one or more TAGS (e.g., maxNrofTAGs) indicated by the one or more configuration parameters (or the TAG configuration) may be equal to or less than the supported number of TAGs. The maximum number of the one or more TAGS (e.g., maxNrofTAGs) indicated by the one or more configuration parameters (or the TAG configuration) may not be greater than the supported number of TAGs.

A TAG may comprise a group of cells (e.g., serving cells). The one or more configuration parameters may indicate, for the group of cells, the TAG. The one or more TAGS comprise the TAG. The one or more configuration parameters may indicate uplink (e.g., PUCCH, PUSCH, PRACH, SRS, and the like) for the group of cells (or for each cell of the group of cells). The wireless device may use the same timing reference cell for the group of cells (or for each cell of the group of cells). The wireless device may use the same timing advance for the group of cells (or for each cell of the group of cells). The wireless device may transmit, via a first cell of the group of cells, a first uplink signal/transmission (e.g., PUCCH/PUSCH/SRS/PRACH transmission) based on a timing reference cell. The wireless device may transmit, via a second cell of the group of cells, a second uplink signal/transmission (e.g., PUCCH/PUSCH/SRS/PRACH transmission) based on the (same) timing reference cell. The wireless device may transmit, via the first cell of the group of cells, the first uplink signal/transmission based on a timing advance value. The wireless device may transmit, via the second cell of the group of cells, the second uplink signal/transmission based on the (same) timing advance value.

A TAG that comprises/contains the SpCell of a MAC entity of the wireless device may be referred to as a Primary Timing Advance Group (PTAG). A TAG that does not comprise/contain the SpCell of a MAC entity of the wireless device may be referred to as a Secondary Timing Advance Group (STAG).

For Dual Connectivity operation, a Special Cell (SpCell) may refer to a primary cell (PCell) of the MCG or a primary secondary cell (PSCell) of the SCG depending on if a MAC entity of the wireless device is associated to the MCG or the SCG, respectively. Otherwise the SpCell may refer to the PCell. A SpCell may support PUCCH transmission and contention-based Random Access. A SpCell may be activated. A SpCell may not be deactivated (e.g., always active).

The one or more configuration parameters may indicate, for a cell, a TAG of the one or more TAGS. The one or more configuration parameters may indicate, for the cell, a first uplink carrier (e.g., NUL) and a second uplink carrier (e.g., SUL). The one or more configuration parameters may comprise a supplementary uplink parameter (e.g., supplementaryUplink) indicating the second uplink carrier. The first uplink carrier of the cell and the second uplink carrier of the cell may belong the (same) TAG. The cell configured with the second uplink carrier (or the supplementaryUplink) may belong to a single TAG. The cell configured with the second uplink carrier (or the supplementaryUplink) may not belong to a second TAG, of the one or more TAGS, different from the TAG.

The one or more TAGS may comprise a PTAG. The PTAG may comprise a SpCell (e.g., PCell).

The one or more configuration parameters may indicate, for the one or more TAGS, one or more time alignment timers (e.g., timeAlignmentTimer). The one or more configuration parameters may indicate, for each TAG of the one or more TAGS, a respective time alignment timer of the one or more time alignment timers. The one or more configuration parameters may indicate the one or more time alignment timers, for example, for maintenance of uplink time alignment. For example, the one or more configuration parameters may indicate, for a first TAG of the one or more TAGs, a first time alignment timer of the one or more time alignment timers. The one or more configuration parameters may indicate, for a second TAG of the one or more TAGS, a second time alignment timer of the one or more time alignment timers. For example, a time alignment timer of the one or more time alignment timers may be per TAG. For example, each time alignment timer of the one or more time alignment timers may be per TAG.

The one or more configuration parameters may indicate, for a TAG of the one or more TAGS, a time alignment timer of the one or more time alignment timers. The TAG may comprise at least one cell. The at least one cell may belong to (or be associated with) the TAG. The one or more configuration parameters may indicate, for the at least one cell, the TAG. The one or more configuration parameters may indicate, for each cell of the at least one cell, the TAG. The time alignment timer may control how long a MAC entity of the wireless device considers the at least one cell (e.g., at least one serving cell) belonging to the TAG to be uplink time aligned.

The wireless device may receive a timing advance command MAC CE. The timing advance command MAC CE may indicate a TAG of the one or more TAGS. The timing advance command MAC CE may indicate/comprise a timing advance command. The wireless device may maintain a timing advance (or a timing advance value or NTA) for the indicated TAG. The wireless device may apply, for the indicated TAG, the timing advance command. The wireless device may start or restart a time alignment timer associated with the indicated TAG. The one or more configuration parameters may indicate, for the indicated TAG, the time alignment timer of the one or more time alignment timers.

The wireless device may transmit, for a random-access procedure, a random-access preamble. The wireless device may receive a random-access response (or a random access response message) of/for a cell (e.g., a serving cell). The random-access response may be corresponding to (or be associated with) the random-access preamble. The random-access response may comprise a timing advance command. The cell may belong to a TAG of the one or more TAGs. The one or more configuration parameters may indicate, for the cell, the TAG. The one or more configuration parameters may indicate, for the TAG, a time alignment timer of the one or more time alignment timers.

The random-access procedure may be, for example, a four-step random-access procedure. The random-access procedure may be, for example, a two-step random-access procedure. The random-access response may be a MsgB of the two-step random-access procedure. The cell may be, for example, a SpCell when the random-access procedure is the two-step random-access procedure.

For example, the wireless device (or a MAC entity of the wireless device) may not select the random-access preamble among one or more random-access preambles used/configured for contention-based random-access procedure. The random-access procedure may be, for example, a contention-free random-access procedure (e.g., PDCCH order, handover, beam failure recovery, and the like). The wireless device may apply, for the TAG comprising the cell, the timing advance command in the random-access response. The wireless device may start or restart the time alignment timer associated with the TAG comprising the cell.

For example, the wireless device (or a MAC entity of the wireless device) may select the random-access preamble among one or more random-access preambles used/configured for contention-based random-access procedure. The random-access procedure may be, for example, a contention-based random-access procedure. The time alignment timer of the TAG comprising the cell may not be running. The wireless device may apply, for the TAG comprising the cell, the timing advance command in the random-access response. The wireless device may start the time alignment timer associated with the TAG comprising the cell. The wireless device may start the time alignment timer, for example, based on receiving the random-access response.

The wireless device may stop the time alignment timer associated with the TAG comprising the cell. The wireless device may stop the time alignment timer, for example, based on a contention resolution of the random-access procedure (or the contention-based random-access procedure) being unsuccessful (or not being successful).

The wireless device may stop the time alignment timer associated with the TAG comprising the cell. The wireless device may stop the time alignment timer, for example, based on transmitting a HARQ feedback for MAC PDU including/comprising UE Contention Resolution Identity MAC CE. A contention resolution of the random-access procedure (or the contention-based random-access procedure) may be successful. The wireless device may initiate the random-access procedure (or transmit the random-access preamble) for system information (SI) request.

For example, the wireless device (or a MAC entity of the wireless device) may select the random-access preamble among one or more random-access preambles used/configured for contention-based random-access procedure. The random-access procedure may be, for example, a contention-based random-access procedure. The time alignment timer of the TAG comprising the cell may be running. The wireless device may ignore the timing advance command in the random-access response.

The wireless device may transmit, for a two-step random-access procedure, a MSGA transmission (e.g., random-access preamble plus PUSCH transmission). The MSGA transmission may comprise/include C-RNTI MAC CE. The wireless device may receive an absolute timing advance command MAC CE. The wireless device may receive the absolute timing advance command MAC CE, for example, based on the MSGA transmission comprising/including the C-RNTI MAC CE. The absolute timing advance command MAC CE may indicate/comprise a timing advance command. The wireless device may apply, for the PTAG, the timing advance command. The one or more configuration parameters may indicate, for the PTAG, a time alignment timer of the one or more time alignment timers. The wireless device may start the time alignment timer associated with the PTAG, for example, based on receiving the absolute timing advance command MAC CE.

The one or more configuration parameters may indicate, for a TAG of the one or more TAGS, a time alignment timer of the one or more time alignment timers. The time alignment timer may expire.

The TAG may be the PTAG. The time alignment timer may be associated with the PTAG. Based on the time alignment timer expiring, the wireless device may perform at least one of:
  flush all HARQ buffers for all Serving Cells;
  notify RRC to release PUCCH for all Serving Cells, if configured;
  notify RRC to release SRS for all Serving Cells, if configured;
  clear any configured downlink assignments and configured uplink grants;
  clear any PUSCH resource for semi-persistent CSI reporting;
  consider all running timeAlignmentTimers (e.g., the one or more time alignment timers) as expired; and/or
  maintain timing advance values (e.g., NTA) of all TAGS (or the one or more TAGS).

The TAG may be a STAG. The time alignment timer may be associated with the STAG. Based on the time alignment timer expiring, the wireless device may perform at least one of:
  flush all HARQ buffers;
  notify RRC to release PUCCH, if configured;
  notify RRC to release SRS, if configured;
  clear any configured downlink assignments and configured uplink grants;
  clear any PUSCH resource for semi-persistent CSI reporting; and/or
  maintain a timing advance value (e.g., NTA) of the STAG.

In an example, a maximum uplink transmission timing difference between a first TAG and a second TAG may be exceeded. The one or more TAGS may comprise the first TAG and the second TAG. The wireless device (or a MAC entity of the wireless device) may stop/abort uplink transmissions via/for a cell (e.g., SCell). The wireless device (or a MAC entity of the wireless device) may stop/abort uplink transmissions via/for the cell, for example, based on the maximum uplink transmission timing difference between the first TAG and the second TAG being exceeded. A TAG of the one or more TAGS may comprise the cell. For example, the TAG may be different from the first TAG. The TAG may be different from the second TAG. For example, the TAG may be the first TAG. For example, the TAG may be the second TAG. The one or more configuration parameters may indicate, for the TAG of the one or more TAGS, a time alignment timer of the one or more time alignment timers. The wireless device may determine/assume/consider the time alignment timer of the TAG associated with the cell as expired. The wireless device may determine/assume/consider the time alignment timer of the TAG associated with the cell as expired, for example, based on the maximum uplink transmission timing difference between the first TAG and the second TAG being exceeded.

The one or more configuration parameters may indicate, for a TAG of the one or more TAGS, a time alignment timer of the one or more time alignment timers. The TAG may comprise at least one cell. The one or more configuration parameters may indicate, for the at least one cell (or for each cell of the at least one cell), the TAG. The time alignment timer may expire (or may not be running).

The wireless device may not transmit uplink transmissions via/on the at least one cell in the TAG, for example, based on the time alignment timer expiring (or not running). The wireless device may stop uplink transmissions via the at least one cell (or via each cell of the at least one cell), for example, based on the time alignment timer expiring (or not running). The wireless device may not perform uplink transmissions via the at least one cell (or via each cell of the at least one cell), for example, based on the time alignment timer expiring (or not running). The wireless device may not perform uplink transmissions via a cell of the at least one cell, for example, based on the time alignment timer expiring (or not running). The uplink transmissions may comprise PUSCH/PUCCH/SRS transmissions. The uplink transmissions may not comprise PRACH transmissions (e.g., random-access preamble and MSGA transmission).

In an example, the TAG may be the PTAG. The wireless device may not transmit uplink transmissions via/on the one or more cells in the one or more TAGS, for example, based on the time alignment timer associated with the PTAG expiring (or not running). The wireless device may not transmit uplink transmissions via/on each cell in the one or more TAGS, for example, based on the time alignment timer associated with the PTAG expiring (or not running). The wireless device may stop uplink transmissions via the one or more cells (or via each cell of the one or more cells in the one or more TAGS), for example, based on the time alignment timer associated with the PTAG expiring (or not running). The wireless device may not perform uplink transmissions via the one or more cells (or via each cell of the one or more cells in the one or more TAGS), for example, based on the time alignment timer associated with the PTAG expiring (or not running). The wireless device may not perform uplink transmissions via a cell of one or more cells in the one or more TAGS, for example, based on the time alignment timer associated with the PTAG expiring (or not running). The uplink transmissions may comprise PUSCH/PUCCH/SRS transmissions. The uplink transmissions may not comprise PRACH transmissions (e.g., random-access preamble and MSGA transmission) on a SpCell (e.g., PCell).

A timing advance command MAC CE may be identified by MAC subheader with LCID (e.g., 61). The timing advance command MAC CE may have a fixed size. The timing advance command MAC CE may comprise a single octet.

The timing advance command MAC CE may comprise one or more fields.

A field of the one or more fields may comprise a TAG identity (TAG ID). The field may indicate/comprise the TAG identity of a TAG. The one or more TAGS may comprise the TAG. The TAG containing/comprising the SpCell may have the TAG identity that is equal to 0. The length of the field may be 2 bits.

A field of the one or more fields may comprise a timing advance command, The field may indicate an index value (e.g., TA=0, 1, 2 ... 63) used to control the amount of timing adjustment that a wireless device or (or a MAC entity of a wireless device) has to apply. The length of the field may be 6 bits.

An absolute timing advance command MAC CE may be identified by MAC subheader with LCID. The absolute timing advance command MAC CE may have a fixed size. The absolute timing advance command MAC CE may comprise two octets.

The absolute timing advance command MAC CE may comprise one or more fields.

A field of the one or more fields may comprise a timing advance command, The field may indicate an index value (e.g., TA) used to control the amount of timing adjustment that a wireless device or (or a MAC entity of a wireless device) has to apply. The length of the field may be 12 bits.

In an example, a wireless device may transmit a random-access preamble (e.g., MSGA preamble) for a two-step random-access procedure. The wireless device may transmit a MSGA transmission for the two-step random-access procedure. The MSGA transmission may comprise transmission of the random-access preamble and a PUSCH transmission. The wireless device may start a response window (e.g., msgB-ResponseWindow), for example, based on transmitting the random-access preamble. The PUSCH transmission may comprise/indicate a C-RNTI MAC CE indicating a C-RNTI of the wireless device. The wireless device may monitor, for a DCI scheduling a random-access response corresponding to (or associated with) the random-access preamble, downlink control channels on/via a SpCell. The wireless device may monitor, for the DCI scheduling the random-access response, the downlink control channels during/while the response window is running. A CRC of the DCI may be scrambled by the C-RNTI. The wireless device may receive the DCI scheduling the random-access response. The two-step random-access procedure may not be initiated, by the wireless device, for a beam failure recovery. The wireless device may not transmit the random-access preamble for a beam failure recovery. A time alignment timer associated with a PTAG may be running. The one or more configuration parameters may indicate, for the PTAG, the time alignment timer. The one or more TAGs may comprise the PTAG. The one or more time alignment timers may comprise the time alignment timer. The DCI (or the random-access response) may comprise/indicate an uplink grant. The uplink grant may be for a new uplink transmission. Based on the time alignment timer associated with the PTAG running, the wireless device may determine/consider reception of the random-access response successful. Based on the time alignment timer associated with the PTAG running, the wireless device may stop the response window. Based on the time alignment timer associated with the PTAG running, the wireless device may determine/consider the two-step random-access procedure successful.

The wireless device may receive a DCI. The wireless device may receive the DCI in/via a PDCCH monitoring occasion (or a PDCCH occasion). The wireless device may monitor, for the DCI, downlink control channels in the PDCCH monitoring occasion.

For example, the DCI may comprise/indicate a downlink assignment.

A CRC of the DCI may scrambled by, for example, C-RNTI. A CRC of the DCI may scrambled by, for example, CS-RNTI. A CRC of the DCI may scrambled by, for example, temporary C-RNTI.

The one or more configuration parameters may indicate a configured downlink assignment (e.g., SPS PDSCH configuration). The wireless device may receive one or more SPS PDSCHs (or one or more SPS PDSCH receptions) for the configured downlink assignment.

In an example, the DCI may indicate SPS deactivation/release. The DCI may comprise a new data indicator (NDI) field. A value of the NDI field may be, for example, equal to zero. The DCI may comprise one or more fields (e.g., RV, HARQ, TDRA, FDRA) set to predefined values that indicate the SPS deactivation. The wireless device may clear the configured downlink assignment, for example, based on receiving the DCI indicating the SPS deactivation. The wireless device may not receive one or more SPS PDSCHs (or one or more SPS PDSCH receptions) for the configured downlink assignment, for example, based on clearing the configured downlink assignment. The DCI may or may not schedule a PDSCH reception.

The wireless device may transmit (or determine to transmit) a HARQ-ACK information feedback/bit for the SPS deactivation. The wireless device may transmit the HARQ-ACK information feedback/bit, for example, for confirmation of reception of the DCI indicating the SPS deactivation.

In an example, the DCI may schedule a PDSCH reception (or a transport block). The wireless device may transmit (or determine to transmit) a HARQ-ACK information feedback/bit for the PDSCH reception (or for reception of the transport block).

In an example, the DCI may indicate SCell dormancy for one or more cells. The wireless device may transmit (or determine to transmit) a HARQ-ACK information feedback/bit for the SCell dormancy. The wireless device may transmit the HARQ-ACK information feedback/bit, for example, for confirmation of reception of the DCI indicating the SCell dormancy. The DCI may or may not schedule a PDSCH reception.

In an example, the DCI may indicate TCI state update (e.g., unified TCI state) for one or more cells. The wireless device may transmit (or determine to transmit) a HARQ-ACK information feedback/bit for the TCI state update. The wireless device may transmit the HARQ-ACK information feedback/bit, for example, for confirmation of reception of the DCI indicating the TCI state update. The DCI may or may not schedule a PDSCH reception.

The wireless device may transmit, via a cell, the HARQ-ACK information feedback/bit. The one or more configuration parameters may indicate, for the cell, a TAG of the one or more TAGS. The TAG may comprise the cell. The cell may belong to the TAG. The one or more configuration parameters may indicate, for the TAG comprising the cell, a time alignment timer of the one or more time alignment timers.

In an example, the time alignment timer may be running.

The wireless device (or a MAC layer of the wireless device) may indicate, to a physical layer of the wireless device, a positive acknowledgement. The wireless device (or the MAC layer of the wireless device) may indicate, to the physical layer of the wireless device, the positive acknowledgement, for example, based on the time alignment timer being running. The wireless device (or the physical layer of the wireless device) may transmit, via the cell, the positive acknowledgement, for example, based on the time alignment timer being running. The wireless device (or the physical layer of the wireless device) may transmit, via the cell, the HARQ-ACK information feedback/bit that is set to (or that indicates) the positive acknowledgement, for example, based on the time alignment timer being running.

The positive acknowledgement may be, for example, for the SPS deactivation. The positive acknowledgement may be, for example, for the PDSCH reception scheduled by the DCI. The positive acknowledgement may be, for example, for the SCell dormancy. The positive acknowledgement may be, for example, for the TCI state update.

In an example, the time alignment timer may not be running (or may be stopped or may be expired).

The wireless device (or a MAC layer of the wireless device) may not instruct a physical layer of the wireless device to generate an acknowledgment (e.g., positive acknowledgment or negative acknowledgment). The wireless device (or a MAC layer of the wireless device) may not instruct the physical layer of the wireless device to generate the acknowledgment, for example, based on the time alignment timer not running. The wireless device (or the physical layer of the wireless device) may not transmit, via the cell, an acknowledgement, for example, based on the time alignment timer being running. The wireless device (or the physical layer of the wireless device) may not transmit, via the cell, the HARQ-ACK information feedback/bit, for example, based on the time alignment timer being running.

The wireless device (or a MAC layer of the wireless device) may not instruct the physical layer of the wireless device to generate the acknowledgment for the SPS deactivation, for example, based on the time alignment timer not running (or being stopped or being expired). The wireless device (or a MAC layer of the wireless device) may not instruct the physical layer of the wireless device to generate the acknowledgment for the PDSCH reception scheduled by the DCI, for example, based on the time alignment timer not running (or being stopped or being expired). The wireless device (or a MAC layer of the wireless device) may not instruct the physical layer of the wireless device to generate the acknowledgment for the SCell dormancy, for example, based on the time alignment timer not running (or being stopped or being expired). The wireless device (or a MAC layer of the wireless device) may not instruct the physical layer of the wireless device to generate the acknowledgment for the TCI state update, for example, based on the time alignment timer not running (or being stopped or being expired).

The HARQ-ACK information feedback/bit may be, for example, for the SPS deactivation. The HARQ-ACK information feedback/bit may be, for example, for the PDSCH reception scheduled by the DCI. The HARQ-ACK information feedback/bit may be, for example, for the SCell dormancy. The HARQ-ACK information feedback/bit may be, for example, for the TCI state update.

In an example, the one or more configuration parameters may comprise one or more sidelink PUCCH configuration parameters (e.g., sl-PUCCH-Config).

In existing technologies, a wireless device may determine one or more TAs (or one or more TA values) associated with one or more candidate/target cells. Each TA of the one or more TAs may be associated with a respective candidate/target cell of the one or more candidate/target cells. The wireless device may determine the one or more TAs, for example, based on a timing advance command (TAC) (or a TA value, TA indication, TA, and the like) of/associated with a source/serving cell. The wireless device may determine the one or more TAs, for example, based on a timing difference between one or more first DL signals (e.g., reference signals) of/from/associated with the source/serving cell and one or more second DL signals (e.g., reference signals) of/from/associated with a candidate/target cell of the one or more candidate/target cells. In the implementation of existing technologies, the wireless device may start/restart a time alignment timer (TAT) associated with a TAG comprising a serving cell when the wireless device receives a TAC from/via/of/associated with the serving cell.

When the wireless device determines one or more TAs for/of/associated with the one or more candidate/target cells (e.g., without receiving one or more TACs for/of/associated with the one or more candidate/target cells), in the implementation of the existing technologies, the wireless device may not know when to start one or more TATs of/for/associated with one or more TAGS of/for/associated with/comprising the one or more candidate/target cells.

In some implementations of the existing technologies, the wireless device may receive a TAC from/of/via/associated with the source cell (e.g., a TAG comprising the source cell). The wireless device may determine one or more TAs of/for/associated with the one or more candidate/target cells based on the TAC. The wireless device may restart the one or more TATs based on determining the one or more TAs. Since the wireless device determines the one or more TAs without receiving one or more TACs for/of/associated with the one or more candidate/target cells, the base station (e.g., serving base station, candidate/target DU, source base station, and the like) may not know when the wireless device started/starts the one or more TATs. Based on not knowing when the wireless device started/starts the one or more TATs, there may be misalignment between the base station (e.g., candidate/target DU) and the wireless device about status(es) (e.g., whether running or not) of the one or more TATs. For example, the base station (e.g., candidate/target DU) may not know when the one or more TATs may expire. The base station (e.g., candidate/target DU) may not know when to transmit/send a TAC MAC CE to start/restart the one or more TATs. Misalignment between the wireless device and the base station (e.g., candidate/target DU) may lead to one or more undesirable consequences. An undesirable consequence of the one or more undesirable consequences may be that the one or more TATs may unnecessarily expire, for example, even though the wireless device may be uplink time aligned with the base station (e.g., candidate/target DU). This may lead to signaling overhead, increase in power consumption, increase in latency, reduction in throughput, and/or reduction in battery life of the wireless device. Another undesirable consequence of the one or more undesirable consequences may be that the base station (e.g., candidate/target DU) may unnecessarily transmit a TAC MAC CE to the wireless device despite the wireless device having an accurate TA (or TA value)/valid uplink time alignment of/for/with the candidate/target cell (e.g., served by the base station and/or the candidate/target DU). This may lead to signaling overhead, increase in power consumption, increase in latency, reduction in throughput, and/or reduction in battery life of the wireless device.

In light of the existing technologies, there is a need to improve handling one or more TATs when a wireless device determines one or more TAs of one or more cells (e.g., candidate/target cells), for example, in/for/during an LTM procedure.

According to example embodiments in the present disclosure, a wireless device may start/restart TAT(s) of/for/associated with TAG(s) comprising candidate/target cell(s), of one or more candidate/target cells, in response to receiving (or a gap after receiving) a control command (e.g., cell switch command, cell switch MAC CE, cell switch trigger MAC CE, and the like) that initiates/indicates/triggers an LTM cell switch to a candidate/target cell of the one or more candidate/target cells. For example, the control command may not comprise a TAC. For example, each TAT of the TAT(s) may be associated with a respective TAG of the TAG(s). The TAG(s) may comprise the candidate/target cell. Based on starting/restarting the TAT(s) in response to receiving the control command (or a gap after receiving the control command), a base station (e.g., source DU, target/candidate DU, and the like) and the wireless device may be aware/know/aligned about when to start/restart the TAT(s). The base station and the wireless device may know when the TAT(s) may expire. In another example embodiment, the wireless device may start/restart the one or more TATs when transmitting one or more UL signals/messages to/via/for the candidate/target cell (e.g., LTM completion in FIG. 17). Based on starting/restarting the TAT(s) when transmitting the one or more UL messages/signals to/via/for the candidate/target cell, the base station (e.g., candidate/target DU) may be aware/know/aligned about when to start/restart the TAT(s). The base station and the wireless device may know when the TAT(s) may expire.

Based on the base station and the wireless device being aligned on when the TAT(s) are started/restarted, the one or more undesirable consequences may be reduced. Based on using some example embodiments of the present disclosure, signaling overhead may be reduced (e.g., the base station may not unnecessarily send TAC MAC CEs based on knowing when the one or more TATs were started/restarted by the wireless device), battery life of the wireless device may be improved (e.g., based on receiving fewer unnecessary TAC MAC CEs, and/or based on reducing instances of losing uplink time alignment with the base station), power consumption may be reduced at the base station and the wireless device, and latency may be reduced.

According to example embodiments as per the present disclosure, a wireless device may receive one or more messages. In an example, the wireless device may receive the one or more messages from the base station. The base station may transmit the one or more messages. The one or more messages may comprise one or more configuration parameters. In an example, the one or more configuration parameters may be/comprise one or more RRC configuration parameters. In an example, the one or more configuration parameters may be/comprise one or more RRC reconfiguration parameter(s). In an example, the one or more configuration parameters may be/comprise one or more RRC release parameters. In an example, the one or more configuration parameters may be/comprise one or more system information parameters (e.g., system information block (SIB), MIB, and like).

In an example, the one or more configuration parameters may be for one or more cells.

The one or more cells may comprise a cell. In an example, at least one configuration parameter of the one or more configuration parameters may be for the cell. In an example, the cell may be a primary cell (PCell). In an example, the cell may be a secondary cell (SCell). In an example, the cell may be a Special Cell (SpCell). The cell may be a secondary cell configured with PUCCH (e.g., PUCCH SCell). In an example, the cell may be an unlicensed cell, e.g., operating in an unlicensed band (shared spectrum channel access). In an example, the cell may be a licensed cell, e.g., operating in a licensed band. In an example, the cell may operate in a first frequency range (FR1). The FR1 may, for example, comprise frequency bands below 6 GHZ. In an example, the cell may operate in a second frequency range (FR2). The FR2 may, for example, comprise frequency bands from 24 GHz to 52.6 GHZ. In an example, the cell may operate in a third frequency range (FR3). The FR3 may, for example, comprise frequency bands from 52.6 GHz to 71 GHz. The FR3 may, for example, comprise frequency bands starting from 52.6 GHZ. The cell may be, for example, a non-terrestrial network (NTN) cell. The cell may be, for example, part of a master cell group (MCG). The cell may be, for example, part of a secondary cell group (SCG). The base station may, for example, serve the cell. The base station may, for example, transmit the one or more messages to a plurality of wireless devices in the cell. The cell may be a serving cell, e.g., of/for the wireless device. The cell may be a non-serving cell, e.g., of/for the wireless device.

In an example, the wireless device may perform uplink transmissions (e.g., PRACH, PUSCH, PUCCH, SRS, and the like) via the cell in a first time and in a first frequency. The wireless device may perform downlink receptions (e.g., PDCCH, PDSCH) via the cell in a second time and in a second frequency. In an example, the cell may operate in a time-division duplex (TDD) mode. In the TDD mode, the first frequency and the second frequency may be the same. In the TDD mode, the first time and the second time may be different. In an example, the cell may operate in a frequency-division duplex (FDD) mode. In the FDD mode, the first frequency and the second frequency may be different. In the FDD mode, the first time and the second time may be the same.

In an example, the wireless device may be in an RRC connected mode. In an example, the wireless device may be in an RRC idle mode. In an example, the wireless device may be in an RRC inactive mode.

In an example, the cell may comprise a plurality of bandwidth parts (BWPs). The plurality of BWPs may comprise one or more uplink BWPs comprising an uplink BWP of the cell. The plurality of BWPs may comprise one or more downlink BWPs comprising a downlink BWP of the cell.

In an example, a BWP of the plurality of BWPs may be in one of an active state and an inactive state. In an example, in the active state of a downlink BWP of the one or more downlink BWPs, the wireless device may monitor a downlink channel/signal (e.g., PDCCH, DCI, CSI-RS, PDSCH) on/for/via the downlink BWP. In an example, in the active state of a downlink BWP of the one or more downlink BWPs, the wireless device may receive a PDSCH on/via/for the downlink BWP. In an example, in the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In an example, in the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In an example, the cell may be a serving cell of the wireless device. In an example, the cell may be a source cell (e.g., Cell 0 in FIG. 17).

In an example embodiment, a wireless device may transmit, to a base station and to/from/towards/via a source/serving cell, (e.g., layer-3 or L3) measurement report(s) as shown in FIG. 17. The base station may prepare, e.g., based on the measurement report(s), one or more candidate/target cells for LTM. In an example, the wireless device may request the base station for one or more candidate/target (LTM cell) configuration(s). In another example, the base station may determine to transmit the one or more candidate/target (LTM cell) configuration(s) (e.g., without a request from the wireless device).

Based on preparing the one or more candidate/target cells, the base station may transmit to the wireless device one or more candidate/target (LTM cell) configurations. In an example, the one or more messages may indicate the one or more candidate/target cells for LTM. The wireless device may receive one or more candidate/target (LTM cell) configurations from the base station via/from/of a source/serving cell (e.g., Cell 0 in FIG. 17). Each candidate/target (LTM cell) configuration of the one or more candidate/target (LTM cell) configurations may be for/of/associated with a respective candidate/target cell of the one or more candidate/target cells.

Figure 18:
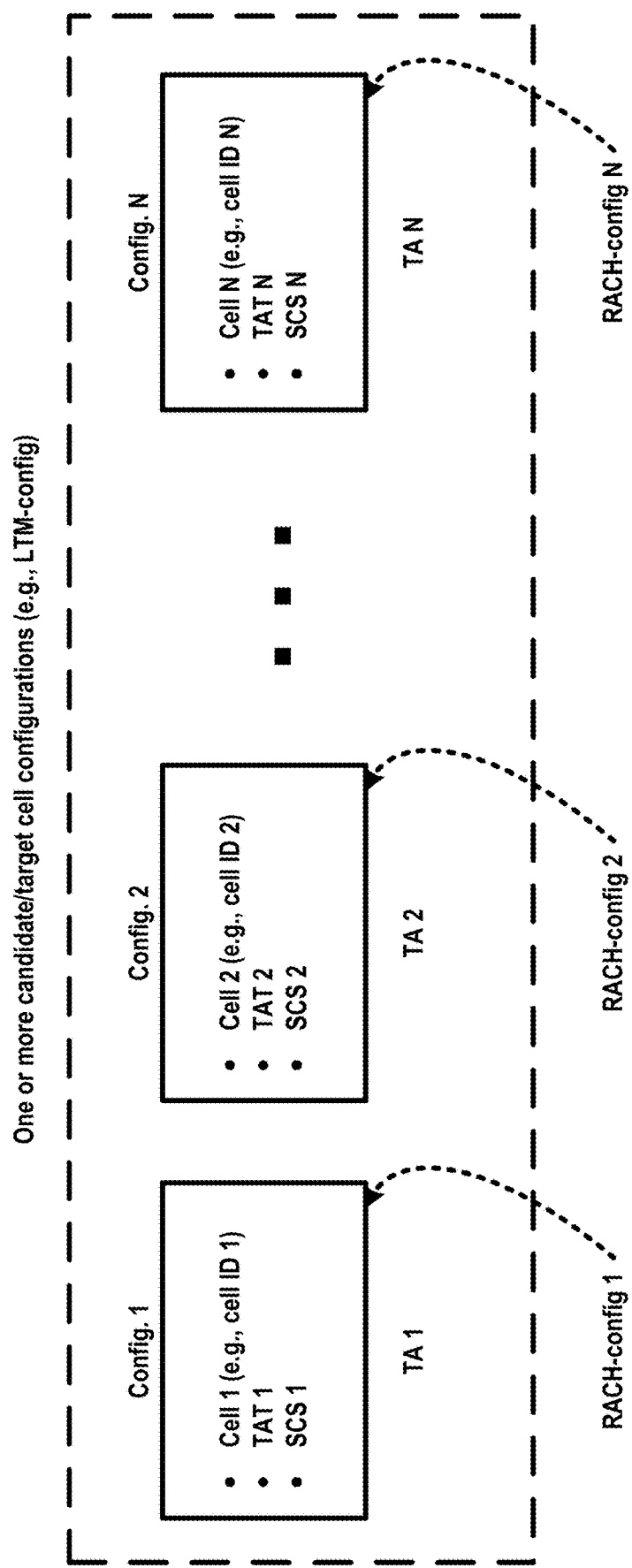
FIG. 18 shows an example of the one or more candidate/target (LTM cell) configurations.

FIG. 18 shows an example of the one or more candidate/target (LTM cell) configurations. In the example of FIG. 18, the one or more candidate/target (LTM cell) configurations may comprise N candidate/target (LTM cell) configurations (where N=1, 2, 3, 4, 8, 10, 20 and the like). N may be, for example, a number of candidate/target cells the base station prepared for LTM. N may be, for example, a number of candidate/target cells the wireless device may switch to in/after/during LTM. The wireless device may switch (e.g., cell switch) to a first candidate/target cell, of the N candidate/target cells, at/in/after/during LTM. The wireless device may switch (e.g., cell switch) to a second candidate/target cell, of the N candidate/target cells, at/in/after/during subsequent LTM.

In the example of FIG. 18, the one or more candidate/target (LTM cell) configurations may comprise Config. 1, Config. 2, . . . , Config. N. Each candidate/target (LTM cell) configuration of the one or more candidate/target (LTM cell) configurations may comprise a cell identity (e.g., cell index, cell-ID, physical cell ID, cell identifier, and the like). Each candidate/target (LTM cell) configuration of the one or more candidate/target (LTM cell) configurations may comprise a configuration index (e.g., candidate/target (LTM cell) configuration index, cell index, cell-ID, physical cell ID, cell identifier, and the like), e.g., that identifies the candidate/target (LTM cell) configuration. Each candidate/target (LTM cell) configuration of the one or more candidate/target (LTM cell) configurations may be associated with a respective candidate/target cell of the one or more candidate/target cells, for example, based on the cell identity. Each candidate/target (LTM cell) configuration of the one or more candidate/target (LTM cell) configurations may be associated with a configuration index/identity/identifier. For example, Config. 1 in FIG. 18 may be associated with an index/identity/identifier 1. For example, Config. 2 in FIG. 18 may be associated with an index/identity/identifier 2. For example, Config. N in FIG. 18 may be associated with an index/identity/identifier N.

In an example, the wireless device/network/gNB may perform early synchronization with candidate/target cell(s) of the one or more candidate/target cells (e.g., as shown in FIG. 17). Early synchronization may comprise, for example, downlink (DL) synchronization with the candidate/target cell(s) of the one or more candidate/target cells. Early synchronization may comprise, for example, uplink (UL) synchronization with the candidate/target cell(s) of the one or more candidate/target cells.

UL synchronization with a candidate/target cell may comprise determining a timing advance (TA) for/of/associated with the candidate/target cell.

In an example, the wireless device may determine the TA for/of/associated with the candidate/target cell, for example, based on transmitting an UL signal (e.g., PRACH, RACH, RA preamble, SRS, and the like) toward/to/via the candidate/target cell. In the example of FIG. 17, the wireless device may receive, from/via a source/serving cell (e.g., Cell 0), a PDCCH order triggering/initiating an RA procedure (e.g., UL signal transmission, PRACH transmission, RACH transmission, RA preamble transmission, SRS transmission, and the like) toward/to/for/via the candidate/target cell (e.g., Cell 1 or Cell 2 in FIG. 17). The wireless device may transmit the UL signal to/via/toward the candidate/target cell. The base station may determine the TA for/of/associated with the candidate/target cell, for example, based on receiving the UL signal from/via the candidate/target cell. The base station may indicate to the wireless device, for example, via the source/serving cell (e.g., Cell 0 in FIG. 17) and/or via the candidate/target cell (e.g., Cell 1 in FIG. 17), the TA. Determining/acquiring the TA for/of/associated with the candidate/target cell using (or based on transmitting/performing) an RA procedure/the UL signal may be referred to as RACH/RA-based early synchronization (or early TA acquisition).

In another example, the wireless device may determine/acquire the TA for/of/associated with a candidate/target cell of the one or more candidate/target cells, for example, without an RA procedure in/via/to/for the candidate/target cell (e.g., without transmitting an RA preamble/PRACH transmission/RACH transmission in/via/to/for the candidate/target cell). For example, the wireless device may determine the TA for/of/associated with the candidate/target cell based on: a second TA for/of/associated with the serving/source cell (e.g., Cell 0 in FIG. 17) and/or a (reception) timing difference (of one or more DL/reference signals) between the serving/source cell (e.g., Cell 0 in FIG. 17) and the candidate/target cell (e.g., Cell 1 in FIG. 17).

Figure 19:
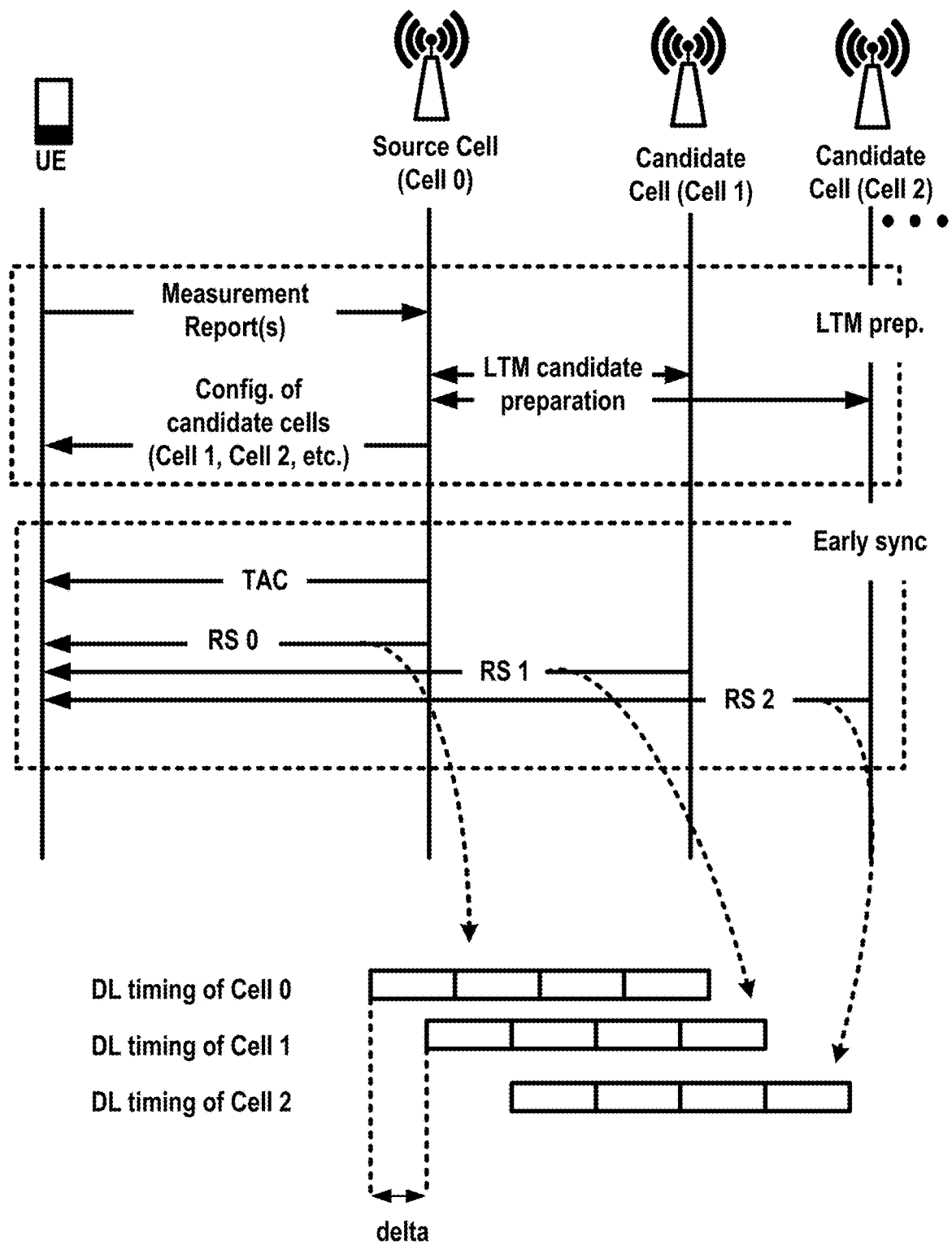
FIG. 19 shows a timing diagram as per an aspect of an embodiment of the present disclosure.

FIG. 19 shows a timing diagram as per an aspect of an embodiment of the present disclosure. The LTM prep. (procedures, signaling, etc.) step in FIG. 19 may be the same as the LTM prep. step as shown in FIG. 17. The early synchronization (early sync.) in FIG. 17 may be based on RACH-based UL/early synchronization (e.g., based on the wireless device transmitting the UL signal toward/to/via the candidate/target cell to determine a TA of the candidate/target cell). In the example of FIG. 19, early sync. (e.g., for the UL synchronization) may not comprise transmitting an UL signal (e.g., RA preamble, RACH transmission, PRACH transmission, SRS transmission, and the like) to/via/toward a candidate/target cell (e.g., Cell 1 and/or Cell 2 in FIG. 19) of the one or more candidate/target cells.

In the example of FIG. 19, the wireless device may determine TA(s) of candidate/target cell(s) (e.g., Cell 1 and/or Cell 2), of the one or more candidate/target cells, (or TA(s) of TAG(s) comprising the candidate/target cell(s)) based on a TA of/associated with the serving/source cell (e.g., source cell, Cell 0 in FIG. 19, and the like) or a TAG comprising the serving cell. For example, the wireless device may determine the TA based on receiving a TAC from/via/of the serving cell (e.g., Cell 0 in FIG. 19). For example, determining the TA may comprise determining $T_{TA}$ as described above, for/of/associated with the serving cell (or a timing advance group (TAG) comprising the serving cell).

The wireless device may determine a first downlink (DL) timing of/for/associated with the serving/source cell (e.g., Cell 0 in FIG. 19) as shown in FIG. 19 (shown as DL timing of Cell 0). The wireless device may determine the first DL timing based on receiving a DL signal/message from/via the serving cell (e.g., RS, MAC CE, DCI, PDSCH, PDCCH, and the like). The wireless device may determine a second DL timing of/for/associated with a candidate/target cell (e.g., Cell 1 in FIG. 19), of the one or more candidate/target cells, as shown in FIG. 19 (shown as DL timing of Cell 1). The wireless device may determine a timing difference between the first DL timing and the second DL timing. In the example of FIG. 19, the timing difference may be referred to as delta. The wireless device may determine the TA(s) of/for associated with TAG(s) comprising the candidate/target cell (e.g., Cell 1 of FIG. 19) based on the TA and the delta. For example, the wireless device may determine the TA(s) as, TA(s)=$T_{TA}$±delta.

A similar procedure as described above may be performed by the wireless device for any/all candidate/target cell(s) (or second TAG(s) comprising the any/all candidate/target cell(s) of the one or more candidate/target cells.

Determining (e.g., estimating, calculating, computing, acquiring, and the like) the TA(s) of/for/associated with (TAG(s) comprising) candidate/target cell(s), of the one or more candidate/target cells, without (e.g., an RA procedure) transmitting an UL signal/message (e.g., PRACH, RACH, RA preamble, SRS, and the like) and/or without receiving a TAC associated with (the TAG(s) comprising) the candidate/target cell(s), as shown in FIG. 19, may be referred to as UE-based TA measurement. The wireless device may be referred to as UE (e.g., as in FIG. 19). Determining (e.g., estimating, calculating, computing, acquiring, and the like) TA(s) of candidate/target cell(s), of the one or more candidate/target cells, based on (an RA procedure) transmitting the UL signal/message (e.g., PRACH, RACH, RA preamble, SRS, and the like) and/or receiving a TAC (or TA indication) for/of/associated with (the TAG(s) comprising) the candidate/target cell(s), as shown in FIG. 17, may be referred to as RACH-based TA acquisition.

In an example, the wireless device may receive one or more configuration parameters (e.g., one or more candidate/target (LTM cell) configurations, RRC messages, and the like) indicating one or more reference TAGs. In the example of FIG. 19, the one or more reference TAGs may comprise TAG 0 (e.g., TAG comprising the source/serving cell (Cell 0 in FIG. 19). The wireless device may use a DL timing (e.g., DL timing of Cell 0 as shown in FIG. 19) of the source/serving cell (e.g., Cell 0 in FIG. 19), for example, based on the one or more configuration parameters indicating the one or more reference TAGs (e.g., TAG 0 in FIG. 19).

Figure 20:
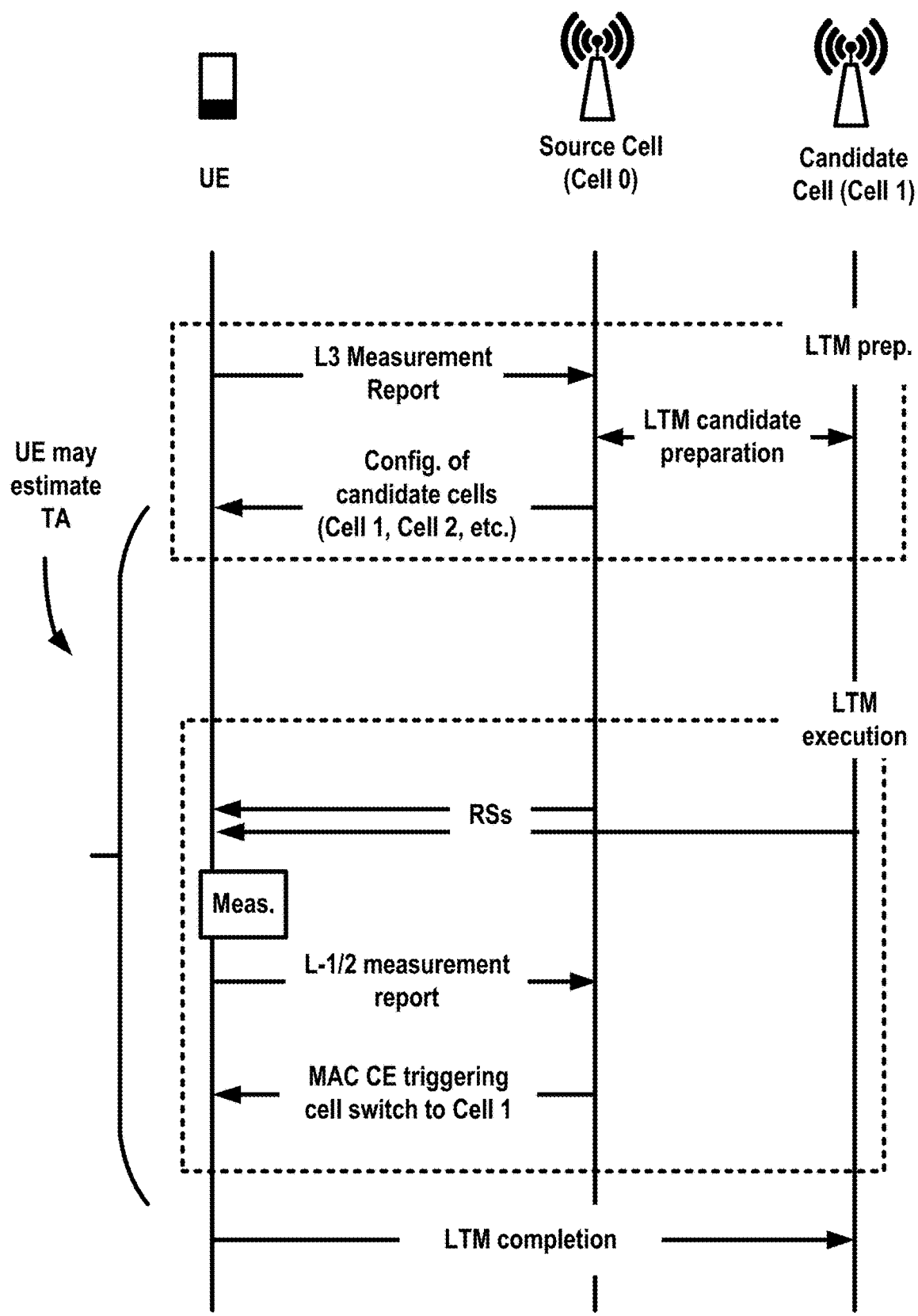
FIG. 20 shows an example timing diagram as per an aspect of an embodiment of the present disclosure.

FIG. 20 shows an example timing diagram as per an aspect of an embodiment of the present disclosure. The LTM prep. (procedures, signaling, etc.) step in FIG. 20 may be the same as the LTM prep. step as shown in FIG. 17 and/or FIG. 19. After receiving one or more candidate/target (LTM cell) configurations associated with/for/of one or more candidate/target cells, the wireless device may determine TA(s) for/of/associated with TAG(s) comprising candidate/target cell(s), of the one or more candidate/target cells, e.g., before receiving a control command indicating an LTM cell switch to a candidate/target cell of the one or more candidate/target cells. In the example of FIG. 20, the wireless device may determine the TA(s) (anytime) before LTM completion (LTM competition in/of FIG. 20 may be the same as the LTM completion as described in/for/of FIG. 17). The wireless device may determine the TA(s) (anytime) during the LTM execution (LTM execution in/of FIG. 20 may be the same as the LTM execution as described in/for/of FIG. 17).

Figure 21:
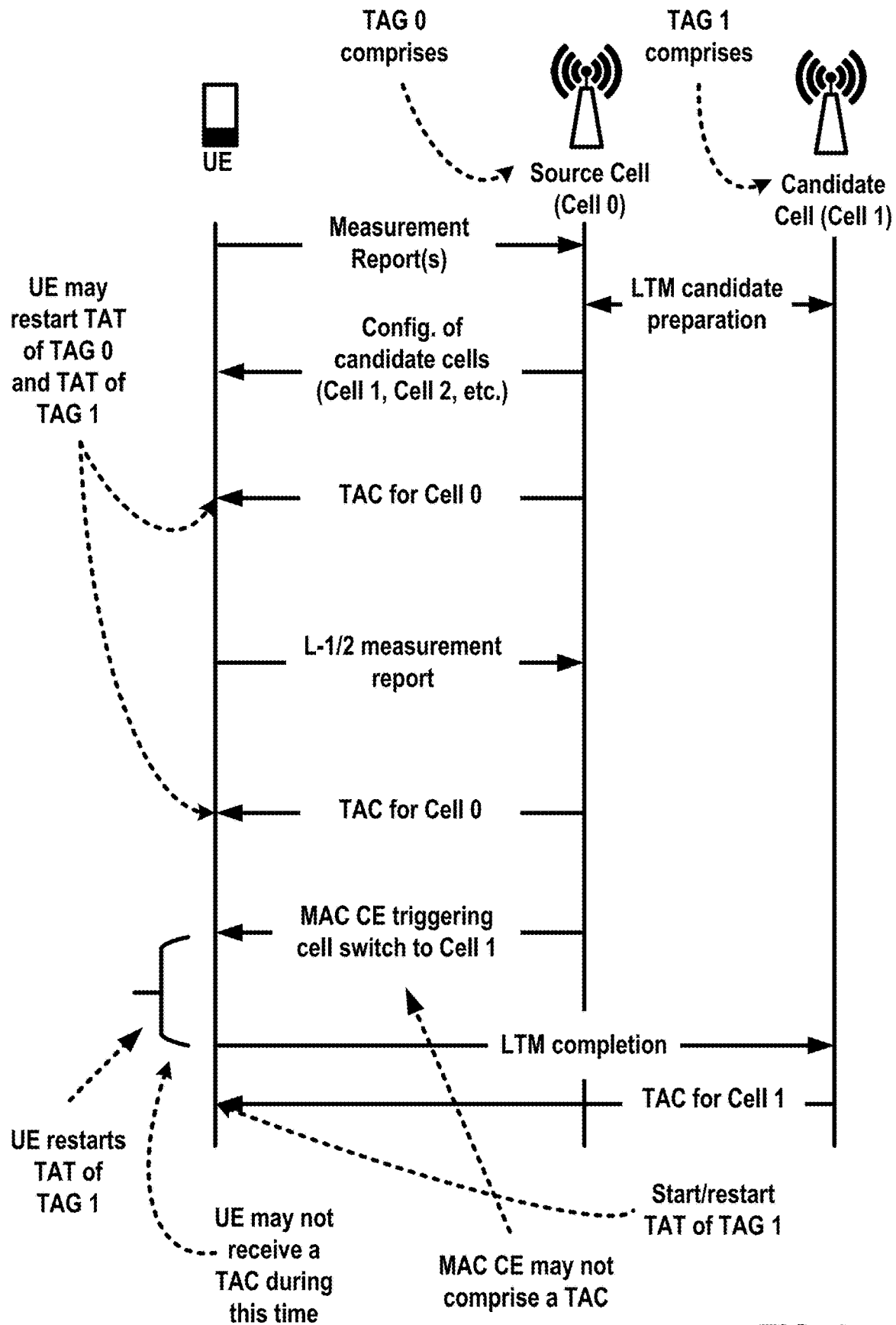
FIG. 21 shows an example timing diagram as per an aspect of an embodiment of the present disclosure.

FIG. 21 shows an example timing diagram as per an aspect of an embodiment of the present disclosure. In the example of FIG. 21, a wireless device may transmit (L3) measurement report(s) to a base station, e.g., via a serving/source cell (e.g., Cell 0 in FIG. 21). In the example of FIG. 21, the serving/source cell may be Cell 0. A first TAG (e.g., TAG 0 in FIG. 21) may comprise the serving/source cell.

Based on receiving the measurement report(s), the base station may perform LTM candidate preparation (e.g., as in example embodiments of FIG. 17). For example, the base station may prepare one or more candidate/target cells for LTM (e.g., an LTM procedure, one or more LTM procedures). The wireless device may receive, from the base station and/or via the source/serving cell (e.g., Cell 0 in FIG. 21), one or more candidate/target (LTM cell) configurations associated with the one or more candidate/target cells, for LTM. Each candidate/target (LTM cell) configuration of the one or more candidate/target (LTM cell) configurations may be for/associated with a candidate/target cell of the one or more candidate/target cells. The wireless device may receive, from the base station and/or via the source/serving cell (e.g., Cell 0 in FIG. 21), one or more messages indicating/comprising the one or more candidate/target cells.

In the example of FIG. 21, a second TAG (e.g., TAG 1 in FIG. 21) may comprise candidate/target cell(s) (e.g., Cell 1) of the one or more candidate/target cells. In the example of FIG. 21, the one or more candidate/target cells may comprise Cell 1.

After receiving the one or more candidate/target (LTM cell) configurations, the wireless device may perform early sync and/or LTM execution (e.g., as shown in FIG. 17, but not entirely (e.g., all steps involved) shown in FIG. 21). In an example, the wireless device may receive, from the base station and/or via/from/of the source/serving cell, TAC(s) for/from/associated with (TAG(s) (e.g., TAG 0 in FIG. 21) comprising the) the serving/source cell (e.g., Cell 0 in FIG. 21). The wireless device may determine a TA for/of/associated with the serving/source cell (e.g., Cell 0 in FIG. 21) and/or the first TAG (e.g., TAG 0 in FIG. 21) comprising the serving/source cell, for example, based on the TAC(s). The wireless device may determine TA(s) for/associated with candidate/target cell(s) (e.g., Cell 1 in FIG. 21), of the one or more candidate/target cells, and/or TAG(s) (e.g., TAG 1 in FIG. 21) comprising the candidate/target cell(s) (e.g., Cell 1 in FIG. 21) of the one or more candidate/target cells. The wireless device may determine the TA(s), for example, as (shown) in FIG. 19 (e.g., UE-based TA measurement) and/or as (shown) in FIG. 17 (e.g., RACH-based TA acquisition).

The wireless device may restart/start a first time alignment timer (TAT) associated with the first TAG (e.g., TAG 0 in FIG. 21), for example, based on receiving the TAC(s) for/associated with the serving/source cell (e.g., Cell 0 in FIG. 21), and/or determining the TA for/associated with the serving/source cell (e.g., Cell 0 in FIG. 21) and/or the first TAG (e.g., TAG 0 in FIG. 21) comprising the serving/source cell. The wireless device may restart/start TAT(s) associated with the TAG(s) (e.g., TAG 1 in FIG. 21), for example, based on determining the TA(s) for/associated with the candidate/target cell(s) (e.g., Cell 1 in FIG. 21), of the one or more candidate/target cells, and/or for/of/associated with the TAG(s) (e.g., TAG 0 in FIG. 21) comprising the candidate/target cell(s).

The wireless device may receive a control command. The control command may be, for example, a L-1/2 command/message/signal. The control command may be, for example, an activation command. In an example, the control command may be a MAC CE. The control command may be, for example, a DCI, PDCCH, and the like. The control command may be, for example, a cell switch MAC CE (e.g., cell switch command MAC CE, cell switch trigger MAC CE, and the like). The control command may, for example, convey, to the wireless device, (LTM) cell switch trigger information. The control command (e.g., cell switch MAC CE) may comprise at least one configuration index. The at least one configuration index may indicate/identify a candidate/target (LTM cell) configuration of the one or more candidate/target (LTM cell) configurations (that is/are received by the wireless device as shown in FIG. 21). The at least one configuration index may indicate/identify a candidate/target cell of the one or more candidate/target cells.

The control command (e.g., cell switch MAC CE) may indicate a candidate/target cell, of the one or more candidate/target cells, for example, for LTM (e.g., for the wireless device to switch to, for a cell switch of the wireless device, for LTM cell switch, and the like). The candidate/target cell may be a non-serving cell of/for the wireless device. The candidate/target cell may be a deactivated SCell.

The control command (e.g., cell switch MAC CE) may indicate the candidate/target cell, of the one or more candidate/target cells, for example, based on the configuration index. For example, the configuration index may be one. The control command (e.g., cell switch MAC CE) may indicate Cell 1 (e.g., Cell 1 in FIG. 21, Cell 1 in FIG. 18) based on the configuration index indicating Config. 1 (as shown in FIG. 18) that is associated with/for/of Cell 1. In another example, the configuration index may be two. The control command (e.g., cell switch MAC CE) may indicate Cell 2 (e.g., Cell 2 in FIG. 18) based on the configuration index indicating Config. 2 (as shown in FIG. 18) that is associated with/for/of Cell 2.

The control command (e.g., cell switch MAC CE) may indicate TCI state(s) for the wireless device to use in UL and/or DL communications with the candidate/target cell, of the one or more candidate/target cells, identified/indicated in the control command (e.g., MAC CE).

The control command (e.g., cell switch MAC CE) may indicate a TAG of/comprising/associated with the candidate/target cell, of the one or more candidate/target cells, for example, based on the TCI state(s). For example, the TCI state(s) may comprise/be associated with the TAG of/comprising/associated with the candidate/target cell. In another example, the one or more candidate/target (LTM cell) configurations may indicate the TAG of/comprising/associated with the candidate/target cell. In an example, reference signal(s) e.g., synchronization signal block (SSB), synchronization signal/physical broadcast channel (PBCH) block, channel state information-reference signal, tracking reference signal, and the like) associated with (e.g., transmitted by/via/from) the candidate/target cell may indicate the TAG of/comprising/associated with the candidate/target cell.

The control command (e.g., cell switch MAC CE) may activate or deactivate an SCell (e.g., a candidate/target cell of the one or more candidate/target cells), for example, simultaneously with triggering LTM cell switch.

In an example, the control command (e.g., cell switch MAC CE) may comprise/indicate random access (RA) resources (e.g., RACH resources, RA resources, and the like) for an RA procedure (e.g., contention based RA procedure, contention free RA procedure, four-step/Type-1 RA procedure, two-step/Type-2 RA procedure, and the like).

In an example, the control command (e.g., cell switch MAC CE) may not comprise a TAC. For example, the control command (e.g., cell switch MAC CE) may not comprise a TAC based on the wireless device determining TA(s) for the candidate/target cell (e.g., using UE-based TA measurement as shown in FIG. 19). The control command (e.g., cell switch MAC CE) may not comprise a TAC for/associated with/of (any) TAG comprising the serving/source cell and/or the one or more candidate/target cells.

Each candidate/target (LTM cell) configuration of the one or more candidate/target (LTM cell) configurations may comprise cell-specific configuration(s) for/of/associated with a candidate/target cell of the one or more candidate/target cells. Each candidate/target (LTM cell) configuration of the one or more candidate/target (LTM cell) configurations may comprise radio bearer information/configuration(s) for/of/associated with a candidate/target cell of the one or more candidate/target cells. Each candidate/target (LTM cell) configuration of the one or more candidate/target (LTM cell) configurations may comprise measurement configuration(s) for/of/associated with a candidate/target cell of the one or more candidate/target cells.

In an example embodiment, the wireless device may start/restart a TAT associated with a TAG comprising the candidate/target cell (e.g., the candidate/target cell indicated in/by the control command), of the one or more candidate/target cells. In the example of FIG. 21, the wireless device may start/restart the TAT associated with TAG 1 that comprises the candidate/target cell (e.g., Cell 1). The candidate/target cell (e.g., Cell 1) may, for example, be indicated in/by the control command (e.g., cell switch MAC CE).

The wireless device may start/restart the TAT associated with TAG 1 that comprises the candidate/target cell (e.g., Cell 1), for example, based on (or upon, or in response to) receiving the control command (e.g., cell switch MAC CE). In an example, the wireless device may not start/restart TAT(s) associated with TAG(s) that do not comprise the candidate/target cell (e.g., Cell 1 in FIG. 21) based on receiving the control command.

In an example, the wireless device may start/restart TAT(s) (e.g., all TATs maintained by the wireless device, all TATs that are not running, all TATs that are running, and the like) based on (in response to or upon) receiving the control command (e.g., cell switch MAC CE).

In an example, the wireless device may start/restart the TAT associated with TAG 1 that comprises the candidate/target cell (e.g., Cell 1 in FIG. 21), for example, based on (or upon, or in response to) receiving the control command (e.g., cell switch MAC CE) if (or in response to) the TAT is not running (e.g., stopped, expired, paused, and the like).

The wireless device may not start/restart the TAT associated with TAG 1 that comprises the candidate/target cell (e.g., Cell 1 in FIG. 21), for example, based on (or upon, or in response to) receiving the control command (e.g., cell switch MAC CE) if (or in response to) the TAT is running (e.g., not stopped, not expired, not paused, and the like).

The wireless device may start/restart the TAT associated with TAG 1 that comprises the candidate/target cell (e.g., Cell 1 in FIG. 21), for example, based on (or after) a gap after receiving the control command (e.g., cell switch MAC CE). The gap may be, for example, indicated in/by the control command (e.g., cell switch MAC CE). The gap may be, for example, indicated in the one or more candidate/target (LTM cell) configurations. The gap may be, for example, preconfigured. The gap may be a time duration between receiving the control command (e.g., a last symbol of the control command) and an application time of the control command. The gap may be a time duration between receiving the control command (e.g., a last symbol of the control command) and one or more UL transmission(s) to/for/via the candidate/target cell of the one or more candidate/target cells.

In an example, the wireless device may start/restart TAT(s) (e.g., all TATs maintained by the wireless device) based on (or after) the gap after receiving the control command (e.g., cell switch MAC CE).

In an example, the wireless device may start/restart the TAT associated with TAG 1 that comprises the candidate/target cell (e.g., Cell 1 in FIG. 21), for example, based on (or after) a gap after receiving the control command (e.g., cell switch MAC CE) in response to (or if) the TAT is not running (e.g., stopped, expired, paused, and the like).

In an example, the wireless device may not start/restart the TAT associated with TAG 1 that comprises the candidate/target cell (e.g., Cell 1 in FIG. 21), for example, based on (or after) a gap after receiving the control command (e.g., cell switch MAC CE) in response to (or if) the TAT is running (e.g., not stopped, not expired, not paused, and the like).

In an example, the wireless device may start/restart TAT(s) (e.g., all TATs maintained by the wireless device, all TATs that are not running, all TATs that are running, and the like) based on (in response to or upon) the gap after receiving the control command (e.g., cell switch MAC CE).

In an example, the wireless device may transmit one or more UL messages via/to/toward/for the candidate/target cell (e.g., Cell 1 in FIG. 21). The wireless device may transmit the one or more UL messages, for example, as part of the LTM competition procedure/step as shown in FIG. 21. The wireless device may start/restart the TAT associated with TAG 1 that comprises the candidate/target cell (e.g., Cell 1 in FIG. 21), for example, based on (or upon, or in response to, or after) transmitting the one or more UL messages. For example, the wireless device may start/restart the TAT associated with TAG 1 that comprises the candidate/target cell (e.g., Cell 1 in FIG. 21) before/at/around (e.g., immediately before, immediately preceding, between receiving the control command and transmitting the one or more UL messages, and the like) transmitting the one or more UL messages.

The wireless device may start/restart the TAT associated with TAG 1 that comprises the candidate/target cell (e.g., Cell 1 in FIG. 21), for example, based on (e.g., upon, in response to, at, around, before, immediately before, immediately preceding, and the like) transmitting the one or more UL messages if (or in response to) the TAT is not running. The wireless device may not start/restart the TAT associated with TAG 1 that comprises the candidate/target cell (e.g., Cell 1 in FIG. 21), for example, based on (e.g., upon, in response to, at, around, before, immediately before, immediately preceding, and the like) transmitting the one or more UL messages if (or in response to) the TAT is running.

In an example, the wireless device may start/restart TAT(s) (e.g., all TATs maintained by the wireless device, all TATs that are not running, all TATs that are running, and the like) based on (e.g., upon, in response to, at, around, before, immediately before, immediately preceding, and the like) transmitting the one or more UL messages.

The one or more UL messages may not comprise/be, for example, one or more PRACH signals/messages/transmissions (e.g., RA preamble, RACH transmissions, and the like). The one or more UL messages may not comprise/be, for example, one or more SRS signals/messages/transmissions.

In an example, the wireless device may receive, e.g., via/from the candidate/target cell (e.g., Cell in FIG. 21), a second TAC (e.g., TAC for Cell 1 as shown in FIG. 21) for/of/associated with TAG 1 that comprises the candidate/target cell (e.g., Cell 1 in FIG. 21). The wireless device may restart/start the TAT of/associated with TAG 1 that comprises the candidate/target cell (e.g., Cell 1 in FIG. 21), for example, based on receiving the second TAC for/of/associated with TAG 1 that comprises the candidate/target cell (e.g., Cell 1 in FIG. 21).

In an example, the wireless device may determine TA(s) of candidate/target cell(s), of the one or more candidate/target cell(s), for example, based on UE-based TA measurement (e.g., as shown in FIG. 19).

In an example, a MAC entity (e.g., of the wireless device) may, when the control command (e.g., cell switch MAC CE) is received, restart the TAT associated with the TAG (e.g., TAG 1 in FIG. 21) of/comprising the cell indicated in the control command (e.g., candidate/target cell, Cell 1 in FIG. 21).

Figure 22:
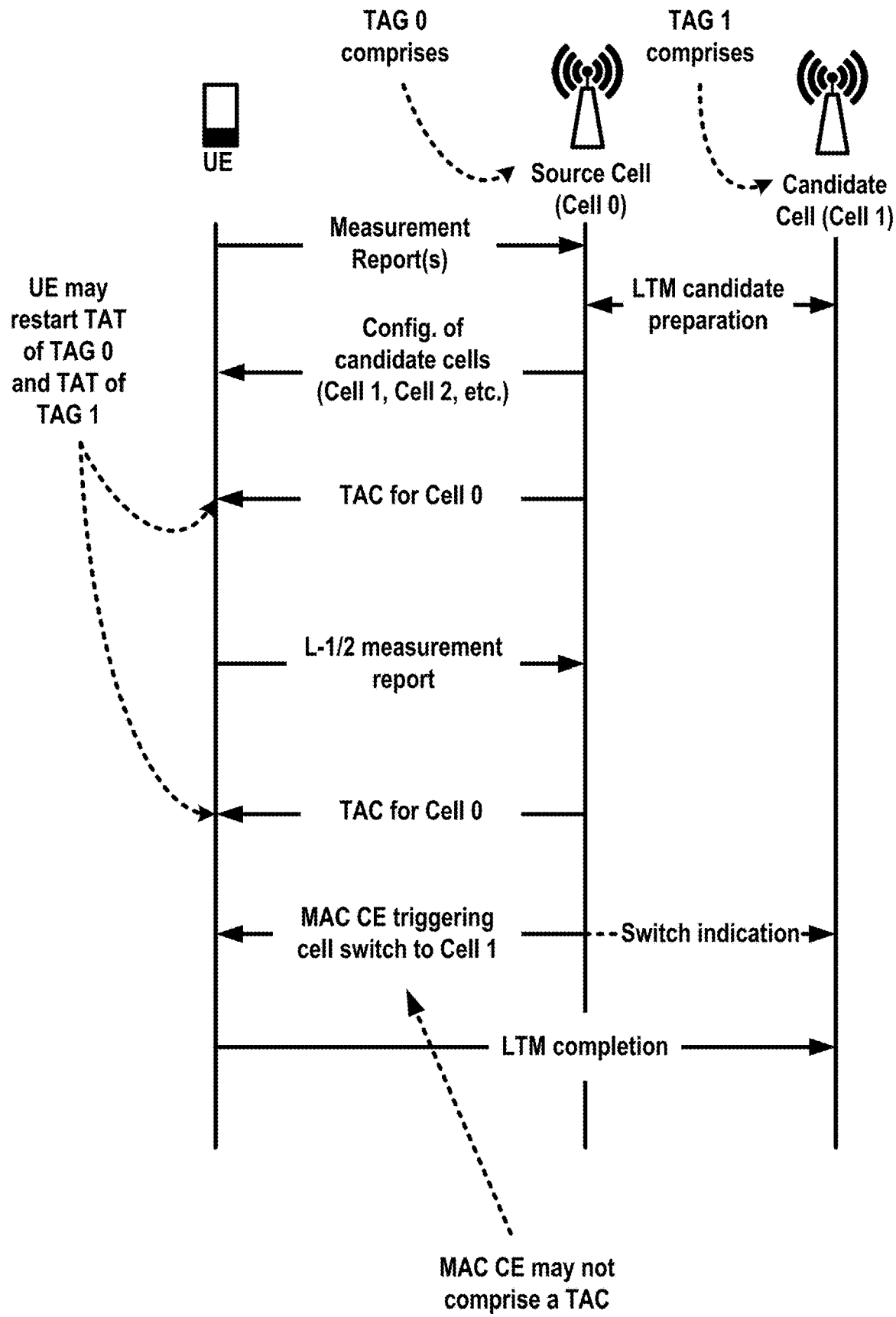
FIG. 22 shows an example timing diagram as per an aspect of an embodiment of the present disclosure.

FIG. 22 shows an example timing diagram as per an aspect of an embodiment of the present disclosure. In the example of FIG. 22, a wireless device may receive, from the base station and via/from a source/serving cell (e.g., Cell 0 in FIG. 22), one or more candidate/target (LTM cell) configurations (as in example embodiments of FIG. 17, FIG. 19, FIG. 20, and/or FIG. 21). The wireless device may start/restart TAT(s) associated with TAG(s) comprising candidate/target cell(s), of the one or more candidate/target cells, for example, in response to receiving a TAC associated with/for a TAG (e.g., TAG 0 in FIG. 22) comprising the source/serving cell from/via the source/serving cell (e.g., Cell 0 in FIG. 22).

In the example of FIG. 22, a first DU (e.g., a source DU) may serve the source/serving cell (e.g., Cell 0 in FIG. 22). A second DU (e.g., a candidate/target DU) may serve the one or more candidate/target cells (e.g., comprising Cell 1 in FIG. 22). The first DU may, for example, coordinate with the second DU during/for LTM candidate preparation. In the example embodiment of FIG. 22, the first DU may transmit, to the second DU, a switch indication, for example, based on transmitting a control command (e.g., control command in FIG. 21, FIG. 20, FIG. 17, and the like) indicating an LTM cell switch from the source/serving cell (e.g., Cell 0 in FIG. 22) to the candidate/target cell (e.g., Cell 1 in FIG. 22). The switch indication may comprise a time at which the source DU (e.g., the base station) transmits/transmitted the control command to the wireless device. The switch indication may comprise a second time at which the wireless device received/receives the control command. The switch indication may indicate a value (or status, e.g., whether running or not running/expired/stopped/paused) of a TAT associated with a TAG comprising the candidate/target cell (e.g., Cell 1 in FIG. 22) of the one or more candidate/target cells. Based on receiving the switch indication, the candidate/target DU (e.g., the base station) may start/restart/set the TAT (e.g., as indicated in the switch indication). Based on starting/restarting/setting the TAT (e.g., as indicated in the switch indication), the candidate/target DU (e.g., base station) and the wireless device may be aligned about the uplink time alignment of the wireless device in/with/via/for/of the candidate/target cell (e.g., status/value of the TAT).

In the existing technologies, the TA(s) (e.g., of/for/associated with (TAG(s) comprising) candidate/target cell(s) of the one or more candidate/target cells) may be indicated by a base station, for example, via/using TAC(s). When the wireless device determines the TA(s) using/based on UE-based TA measurement (e.g., as shown in FIG. 19) without receiving a TAC, the base station may not know the TA(s) determined/estimated by the wireless device. The base station may need to know that TA(s), for example, for scheduling UL/DL transmission(s)/reception(s) between the wireless device and the base station. In the implementation of the existing technologies, the wireless device may transmit a TA report indicating a TA used by the wireless device. In the implementation of the existing technologies, the TA report may be used (only) by wireless devices that are in a non-terrestrial network (NTN). For example, the wireless device may transmit the TA report when NTN-specific configuration parameters (e.g., system information parameters, SIB19, SIB 31, and the like) indicate/request the TA report. Using the existing technologies for transmitting and/or triggering a transmission of the TA report may lead to the base station not knowing the TA(s) determined by the wireless device in an LTM scenario (e.g., since LTM may (also) occur in non-NTNs). This may lead to interference, resource underutilization, increase in power consumption, and/or reduction in battery life.

In light of the existing technologies, there is a need to improve triggering conditions for transmitting a TA report in an LTM procedure/scenario/condition.

According to example embodiments of the present disclosure, the wireless device may transmit TA report(s) indicating TA(s) determined by the wireless device (e.g., using UE-based TA measurement as shown in FIG. 19) in response to (or upon) receiving a control command (e.g., cell switch MAC CE). The TA report(s) may comprise/indicate the TA(s) determined by the wireless device. The TA(s) may be for/of/associated with one or more candidate/target cells. In an example, the wireless device may transmit the TA report(s) indicating TA(s) determined by the wireless device (e.g., using UE-based TA measurement as shown in FIG. 19) in response to (e.g., upon, based on, after, at, with) one or more UL messages transmitted to/for/via a candidate/target cell (e.g., indicated by/in the control command), of the one or more candidate/target cells, as part of the LTM competition procedure.

Based on transmitting the TA report(s) during the LTM execution and/or LTM completion procedure, the wireless device may inform the base station of the TA(s) determined by the wireless device, e.g., using the UE-based TA measurement as shown in FIG. 19. The candidate/target DU/base station/cell may know the TA(s) determined by the wireless device. The base station may use the TA(s) reported by the wireless device to schedule one or more UL/DL transmissions to the wireless device. This may reduce resource underutilization, reduce power consumption, improve battery life of the wireless device, and/or reduce interference.

Figure 23:
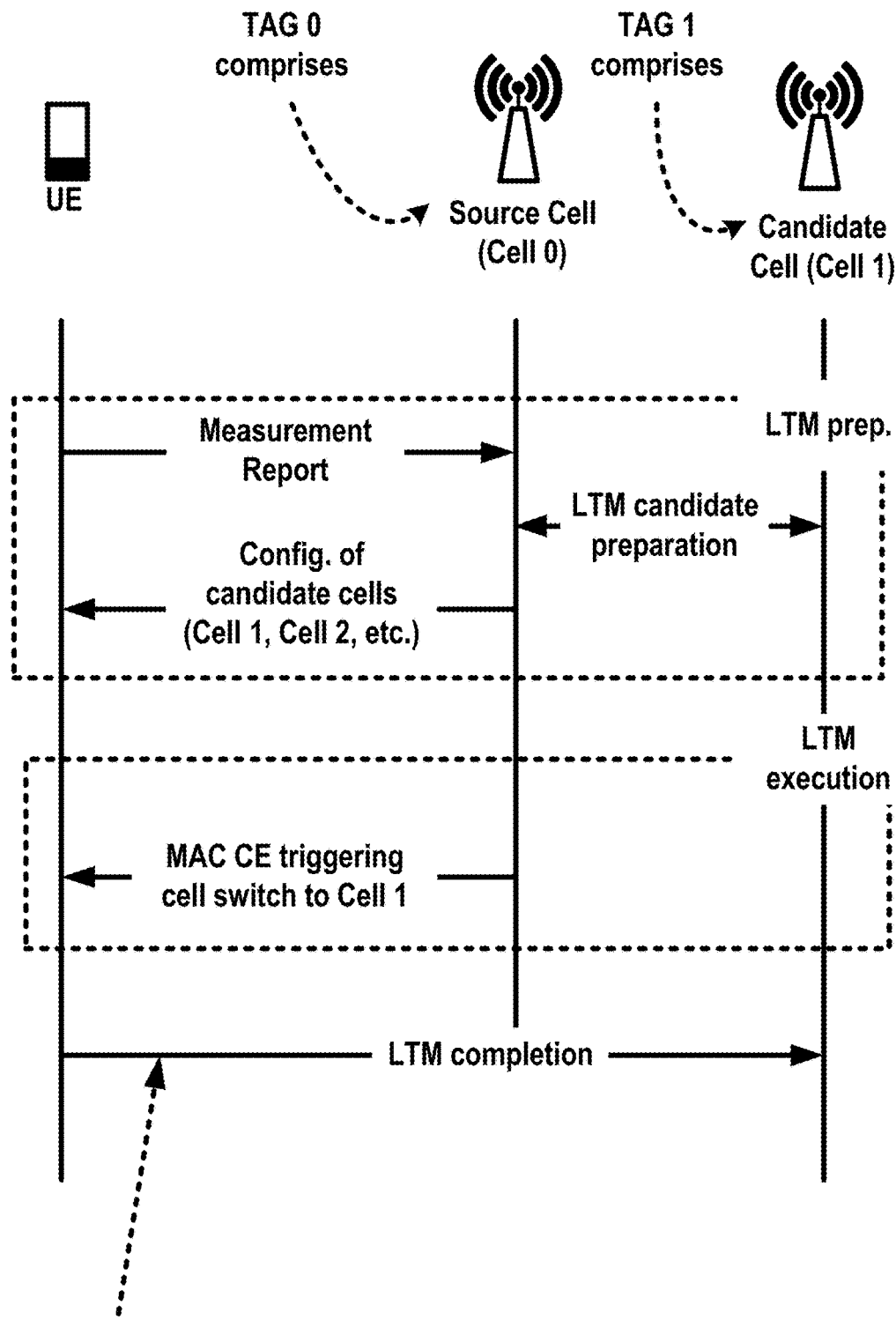
FIG. 23 shows an example timing diagram as per an aspect of an embodiment of the present disclosure.

FIG. 23 shows an example timing diagram as per an aspect of an embodiment of the present disclosure. According to the example of FIG. 23, a wireless device may transmit to a base station (e.g., via a source/serving cell) measurement report(s). The wireless device may receive, from the base station (e.g., via the source/serving cell), one or more candidate/target (LTM cell) configurations. The one or more candidate/target (LTM cell) configurations may be for an LTM procedure. The one or more candidate/target (LTM cell) configurations may be for/of/associated with one or more candidate/target cells. Each candidate/target (LTM cell) configuration of the one or more candidate/target (LTM cell) configurations may be associated with/for/of a respective candidate/target cell of the one or more candidate/target cells. The one or more candidate/target cells may comprise one or more non-serving cells.

The wireless device may receive, from the base station and via the source/serving cell (e.g., Cell 0 in FIG. 23), a control command (e.g., cell switch MAC CE) indicating a cell switch from the source/serving cell (e.g., Cell 0 in FIG. 23) to a candidate/target cell (e.g., Cell 1 in FIG. 23) of the one or more candidate/target cells.

The wireless device may transmit one or more UL signals/messages to the base station, e.g., via the candidate/target cell (e.g., Cell 1 in FIG. 23), for example, as part of LTM completion procedure. The LTM completion procedure shown in FIG. 23 may be, for example, same as the LTM completion procedure in FIG. 17, FIG. 19, FIG. 21, and/or FIG. 22.

In response to receiving the control command (e.g., cell switch MAC CE) indicating a cell switch from the source/serving cell (e.g., Cell 0 in FIG. 23) to a candidate/target cell (e.g., Cell 1 in FIG. 23) of the one or more candidate/target cells, the wireless device may transmit, for example, in/via the one or more UL messages/signals, TA report(s). The TA report(s) may comprise TA(s) associated with/of/for at least the candidate/target cell (e.g., Cell 1 in FIG. 23). The TA(s) may be for/associated with/of TAG(s) (e.g., TAG 1 in FIG. 23). The TAG(s) (e.g., TAG 1 in FIG. 23) may comprise the candidate/target cell (e.g., Cell 1 in FIG. 23).

The wireless device may determine the TA(s), for example, using UE-based TA measurement (e.g., as shown and/or described in FIG. 19). The wireless device may transmit one or more UL MAC CEs (e.g., TA report MAC CEs) indicating/comprising the TA(s).

In an example, the control command may indicate the wireless device to transmit the TA report(s). For example, the control command may comprise a field (e.g., ta-report, ta-report-enabled, TA report for LTM, TA reporting activation, and the like) that indicates the wireless device to transmit the TA report(s). In response to the control command indicating the wireless device to transmit the TA report(s) (or in response to the field), the wireless device may transmit for example, in/via the one or more UL messages/signals and/or toward/via the candidate/target cell (e.g., Cell 1 in FIG. 23), TA report(s).

A TA reporting procedure may comprise transmitting the TA report(s), e.g., via/in the one or more UL messages/signals. The TA reporting procedure may be used to inform/transmit/provide the base station/gNB/network with an estimate of the TA(s) determined/used by the wireless device.

The TA reporting procedure may be used in/for/during LTM to provide the candidate/target cell/base station/gNB with an estimate of the TA(s), for example, before receiving a TAC from/via the candidate/target cell. The TA reporting procedure and or the TA report(s) may be triggered if any of the following events occur: upon receiving the control command (e.g., cell switch MAC CE); upon/during/while/together with/along with transmitting an LTM competition message (e.g., the one or more UL messages/signals) via/to the candidate/target cell; upon receiving the control command (e.g., cell switch MAC CE) indicating/requesting/informing the TA report(s).

In the existing technologies, a wireless device may transmit an RA preamble (e.g., RACH transmission, PRACH transmission, preamble transmission, and the like), for example, as part of early sync as shown in FIG. 17. In the implementation of existing technologies, when the wireless device receives a PDCCH order triggering an RA preamble transmission, the wireless device may transmit the RA preamble with a transmit/transmission power that is determined based on an equation. The equation may comprise a pathloss determined based measured a pathloss RS. The equation may comprise a target received power indicated by one or more configuration parameters transmitted by a base station to the wireless device. The RA preamble transmission may, for example, fail. For example, the transmit/transmission power used by the wireless device to transmit the RA preamble may not be sufficient for (or to compensate for) the propagation channel conditions (e.g., pathloss, multipath effects, shadowing, and the like). The base station may not, for example, receive/decode the RA preamble. In the implementation of the existing technologies, the wireless device may retransmit the RA preamble (e.g., the same RA preamble or a different RA preamble) in response to the RA preamble transmission failing (e.g., in response to not receiving a response to the RA preamble transmission). The wireless device may increase the transmit/transmission power for the RA preamble retransmission. In an example, the RA preamble retransmission may (also) fail. The wireless device may perform a second RA preamble retransmission. In the implementation of the existing technologies, the wireless device may perform one or more (such) RA preamble retransmissions. For each RA preamble (re) transmission after an RA preamble transmission failure, the wireless device may retransmit an RA preamble with a higher transmit/transmission power from/compared to the previous RA preamble (re) transmission until reaching a maximum transmit/transmission power (e.g., PCmax). At every retransmission attempt, the wireless device may ramp up the transmission power using a power ramping counter and a power ramping step.

Incrementally ramping up transmit/transmission power during each RA preamble (re) transmission (attempt) may be acceptable under some conditions/RA procedures (e.g., RA procedure for initial access, RA procedure for SI request, RA procedure for RRC connection reestablishment, RA procedure for beam failure recovery, delay-tolerant traffic, video streaming, and the like). For LTM (e.g., when a wireless device is mobile or a cell change/switch is fast), incrementally ramping up transmit/transmission power during each RA preamble (re) transmission (attempt) may lead to undesirable consequences (e.g., increase in interruption time, increase in latency, increase in power consumption, reduction in battery life, LTM failure, and the like).

In light of the existing technologies, there is a need to improve determining transmit/transmission power of transmitting an RA preamble (e.g., PRACH transmission) in LTM.

According to example embodiments of the present disclosure, a wireless device may determine a transmit/transmission power to transmit an RA preamble (e.g., PRACH transmission) that is triggered by a PDCCH order that is received via a first cell based on whether the PDCCH order indicates a PRACH transmission toward the first cell or a second cell (e.g., for LTM). In an example, the wireless device may receive a PDCCH order via/from a first cell. The PDCCH order may indicate a PRACH transmission (e.g., RA preamble transmission) towards/to/via the first cell. According to some example embodiments of the present disclosure, the wireless device may determine a transmit/transmission power for the PRACH transmission using an equation based on the PDCCH order indicating the PRACH transmission towards/to/via the first cell. The equation may comprise a pathloss of an RS, target received power, power ramping counter, and/or power ramping step. In another example, the PDCCH order may indicate a PRACH transmission (e.g., RA preamble transmission) towards/to/via a second cell (e.g., for LTM). The wireless device may use a maximum/high (e.g., higher than a transmit power determined when the PDCCH order would indicate PRACH transmission toward/via the first cell) transmit/transmission power (e.g., PCmax, or determine a transmit/transmission power based on a maximum/high value of a power ramping counter, and the like) for the PRACH transmission based on the PDCCH order indicating the PRACH transmission (e.g., RA preamble transmission) towards/to/via a second cell.

Based on using a maximum/high transmit/transmission power based on the PDCCH order received via/from the first cell indicating the PRACH transmission toward/via the second cell (e.g., during/for (early) sync/TA acquisition for LTM), the wireless device may reduce a number of PRACH failures. By using a maximum/high transmit/transmission power, the PRACH transmission may overcome pathloss, multipath effects, shadowing, Doppler effects, and/or other unfavorable channel propagation conditions. This may lead to reduction in interruption time, reduction in latency, reduction in power consumption, increase in battery life, reduction in LTM failure, and the like.

According to an example embodiment of the present disclosure, the wireless device may receive one or more messages via a first cell. In an example, the wireless device may receive the one or more messages from the base station. The base station may transmit the one or more messages. The one or more messages may comprise one or more configuration parameters. In an example, the one or more configuration parameters may be/comprise one or more RRC configuration parameters. In an example, the one or more configuration parameters may be/comprise one or more RRC reconfiguration parameter(s). In an example, the one or more configuration parameters may be/comprise one or more RRC release parameters. In an example, the one or more configuration parameters may be/comprise one or more system information parameters (e.g., system information block (SIB), MIB, and like).

In an example, the one or more configuration parameters may be for one or more cells.

The one or more cells may comprise a cell. In an example, at least one configuration parameter of the one or more configuration parameters may be for the cell. In an example, the cell may be a primary cell (PCell). In an example, the cell may be a secondary cell (SCell). In an example, the cell may be a Special Cell (SpCell). The cell may be a secondary cell configured with PUCCH (e.g., PUCCH SCell). In an example, the cell may be an unlicensed cell, e.g., operating in an unlicensed band (shared spectrum channel access). In an example, the cell may be a licensed cell, e.g., operating in a licensed band. In an example, the cell may operate in a first frequency range (FR1). The FR1 may, for example, comprise frequency bands below 6 GHZ. In an example, the cell may operate in a second frequency range (FR2). The FR2 may, for example, comprise frequency bands from 24 GHz to 52.6 GHZ. In an example, the cell may operate in a third frequency range (FR3). The FR3 may, for example, comprise frequency bands from 52.6 GHz to 71 GHz. The FR3 may, for example, comprise frequency bands starting from 52.6 GHZ. The cell may be, for example, a non-terrestrial network (NTN) cell. The cell may be, for example, part of a master cell group (MCG). The cell may be, for example, part of a secondary cell group (SCG). The base station may, for example, serve the cell. The base station may, for example, transmit the one or more messages to a plurality of wireless devices in the cell. The cell may be a serving cell, e.g., of/for the wireless device. The cell may be a non-serving cell, e.g., of/for the wireless device.

In an example, the wireless device may perform uplink transmissions (e.g., PRACH, PUSCH, PUCCH, SRS, and the like) via the cell in a first time and in a first frequency. The wireless device may perform downlink receptions (e.g., PDCCH, PDSCH) via the cell in a second time and in a second frequency. In an example, the cell may operate in a time-division duplex (TDD) mode. In the TDD mode, the first frequency and the second frequency may be the same. In the TDD mode, the first time and the second time may be different. In an example, the cell may operate in a frequency-division duplex (FDD) mode. In the FDD mode, the first frequency and the second frequency may be different. In the FDD mode, the first time and the second time may be the same.

In an example, the wireless device may be in an RRC connected mode. In an example, the wireless device may be in an RRC idle mode. In an example, the wireless device may be in an RRC inactive mode.

In an example, the cell may comprise a plurality of bandwidth parts (BWPs). The plurality of BWPs may comprise one or more uplink BWPs comprising an uplink BWP of the cell. The plurality of BWPs may comprise one or more downlink BWPs comprising a downlink BWP of the cell.

In an example, a BWP of the plurality of BWPs may be in one of an active state and an inactive state. In an example, in the active state of a downlink BWP of the one or more downlink BWPs, the wireless device may monitor a downlink channel/signal (e.g., PDCCH, DCI, CSI-RS, PDSCH) on/for/via the downlink BWP. In an example, in the active state of a downlink BWP of the one or more downlink BWPs, the wireless device may receive a PDSCH on/via/for the downlink BWP. In an example, in the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In an example, in the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

The one or more configuration parameters (e.g., RACH-ConfigGeneric) may indicate, for an RA procedure (e.g., of/for/via the cell): one or more RA resources (e.g., PRACH configuration index, msg1-FDM, a number of PRACH transmission occasions frequency division multiplexed in one time instance, msg1-FrequencyStart, offset of lowest PRACH transmission occasion in frequency domain with respective to PRB 0,); preamble received target power (e.g., a target power that may be received by the base station); a maximum number of RA preamble transmissions performed before declaring failure (e.g., preambleTransMax); initial RA preamble transmit/transmission power (e.g., preambleReceivedTargetPower) and/or power ramping step (e.g., increment step in which the wireless device may ramp power in a retransmission attempt).

Figure 24:
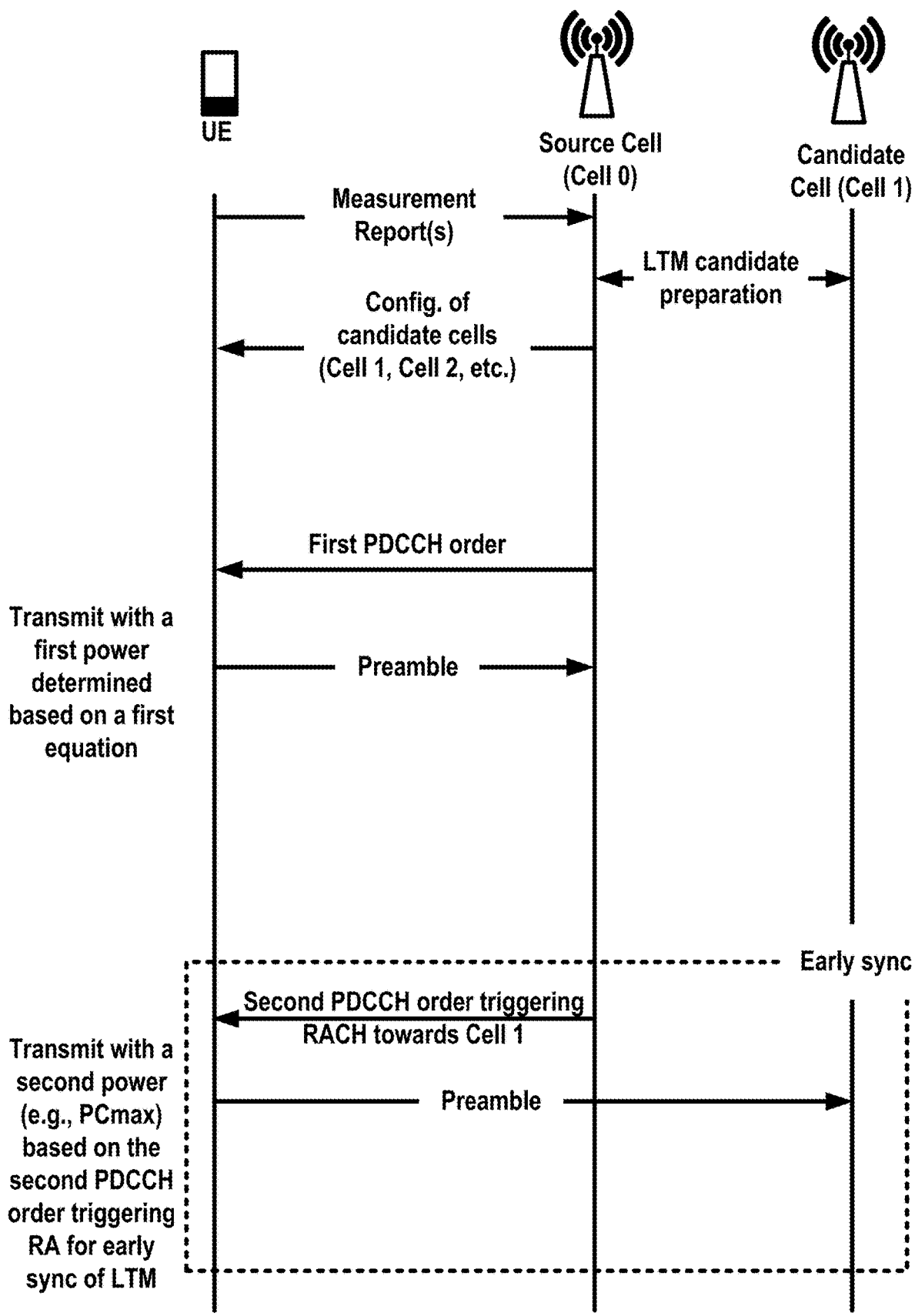
FIG. 24 shows an example timing diagram as per an aspect of an embodiment of the present disclosure.

FIG. 24 shows an example timing diagram as per an aspect of an embodiment of the present disclosure. According to the example shown in FIG. 24, the wireless device may transmit to the base station measurement report(s). Based on receiving the measurement report(s), the base station may prepare one or more candidate/target cell for LTM. The wireless device may receive, from the base station and/or via/from a first cell (e.g., Cell 0 in FIG. 24, a source cell, a serving cell, and the like), one or more candidate/target (LTM cell) configurations. The one or more candidate/target (LTM cell) configurations may be for/of/associated with the one or more candidate/target cells for LTM. Each candidate/target (LTM cell) configuration of the one or more candidate/target (LTM cell) configurations may be for/of/ associated with a respective candidate/target cell of the one or more candidate/target cells.

The wireless device may receive a first PDCCH order, e.g., from the base station and/or via the first cell (e.g., Cell 0 in FIG. 24, the source cell, the serving cell, and the like). The first PDCCH order may trigger/initiate a first RA procedure. The first RA procedure may be for/of/associated with the first cell (e.g., Cell 0 in FIG. 24, the source cell, the serving cell, and the like). The first cell may not be one of the one or more candidate/target cells. For example, the one or more candidate/target cells may not comprise the first cell. The wireless device may transmit, for the first RA procedure and via the first cell, a first RA preamble (e.g., a first PRACH transmission). The wireless device may transmit the first RA preamble (e.g., the first PRACH transmission) with/using a first transmit/transmission power. The wireless device may determine the first transmit/transmission power, for example, based on a first equation. The first equation may comprise a wireless device configured maximum output power (e.g., $P_{CMAX,f,c}$). The first equation may comprise a PRACH target reception power. The first equation may comprise a pathloss (e.g., of a reference signal).

The wireless device may determine the maximum output power (e.g., $P_{CMAX,f,c}$), for example, based on the one or more configuration parameters. The maximum output power may be a maximum among a plurality of output powers (for/of the wireless device).

For example, $P_{CMAX\_L,f,c} \leq P_{CMAX,f,c} \leq P_{CMAX\_H,f,c}$, $P_{CMAX\_f,c}$=MIN $\{P_{EMAX,c} - \Delta T_{C,c}, (P_{PowerClass} - \Delta P_{PowerClass})$ − MAX(MAX(MPR$_c$+$\Delta$MPR$_c$, A−MPR$_c$)+ $\Delta T_{IB,c}$+$\Delta T_{C,c}$+$\Delta T_{RxSRS}$, P-MPR$_c$)$\}$, $P_{CMAX\_H,f,c}$=MIN$\{P_{EMAX,c}, P_{PowerClass}-\Delta P_{PowerClass}\}$, wherein $P_{EMAX,c}$ is a value given by either the p-Max IE (in the one or more configuration parameters) or the field additionalPmax of the NR-NS-PmaxList IE, (in the one or more configuration parameters); $P_{PowerClass}$ is the maximum power for a power class of the wireless device;

When an information element (e.g., within the one or more configuration parameters) powerBoostPi2BPSK is set to 1, $P_{EMAX,c}$ may be increased by +3 dB for a power class 3 capable wireless device operating in TDD bands n40, n41, n77, n78, and n79 with PI/2 BPSK modulation and the wireless device indicates support for wireless device capability powerBoosting-pi2BPSK and 40% or less symbols in certain evaluation period are used for UL transmission when $P_{EMAX,c} \geq 20$ dBm (The exact evaluation period is no less than one radio frame).

When the IE powerBoostPi2BPSK (e.g., within the one or more configuration parameters) is set to 1, $\Delta P_{PowerClass}$=−3 dB for a power class 3 capable wireless device operating in TDD bands n40, n41, n77, n78, and n79 with Pi/2 BPSK modulation and the wireless device indicates support for UE capability powerBoosting-pi2BPSK and 40% or less slots in radio frame are used for UL transmission.

$\Delta P_{PowerClass}$=3 dB for a power class 2 capable wireless device or 6 dB for a power class 1.5 wireless device when P-max of 23 dBm or lower is indicated; or when the field of UE capability maxUplinkDutyCycle-PC2-FR1 is absent and the field of UE capability maxUplinkDutyCycle-PC1dot5-MPE-FR1 is absent and the percentage of uplink symbols transmitted in a certain evaluation period is larger than 50%; or when the field of UE capability maxUplinkDutyCycle-PC2-FR1 is not absent and the percentage of uplink symbols transmitted in a certain evaluation period is larger than maxUplinkDutyCycle-PC2-FR1 (The exact evaluation period is no less than one radio frame); or when the field of UE capability maxUplinkDutyCycle-PC1dot5-MPE-FR1 is not absent and half the percentage of uplink symbols transmitted in a certain evaluation period is larger than maxUplinkDutyCycle-PC1dot5-MPE-FR1 as defined in TS 38.306 (The exact evaluation period is no less than one radio frame).

$\Delta P_{PowerClass}$=3 dB for a power class 1.5 capable wireless device when P-max of between 23 dBm and 26 dB is indicated; or when the field of UE capability maxUplinkDutyCycle-PC2-FR1 is absent and the field of UE capability maxUplinkDutyCycle-PC1dot5-MPE-FR1 is absent and the percentage of uplink symbols transmitted in a certain evaluation period is between 25% and 50%; or when the field of UE capability maxUplinkDutyCycle-PC2-FR1 is not absent and the percentage of uplink symbols transmitted in a certain evaluation period is between maxUplinkDutyCycle-PC2-FR1 and maxUplinkDutyCycle-PC2-FR1/2 (The exact evaluation period is no less than one radio frame); or when the field of UE capability maxUplinkDutyCycle-PC1dot5-MPE-FR1 is not absent and the percentage of uplink symbols transmitted in a certain evaluation period is larger than maxUplinkDutyCycle-PC1dot5-MPE-FR1 as defined in TS 38.306 (The exact evaluation period is no less than one radio frame).

$\Delta P_{PowerClass}$=3 dB when the wireless device is configured with SUL configurations;

$\Delta P_{PowerClass}$=3 dB may be applied during SRS transmission occasions with usage in SRS-ResourceSet set as 'antennaSwitching' with configured SRS resources in each SRS resource set(s) consisting of one SRS port when PC2 capable wireless device with txDiversity-r16 capability or PC1.5 capable UE further indicates SRS-TxSwitch capability 't1r2' or 't1r4' or 't1r1-t1r2' or 't1r1-t1r2-t1r4';

$\Delta P_{PowerClass}$=0 dB otherwise.

$\Delta T_{IB,c}$ may be the additional tolerance for serving cell c; $\Delta T_{IB,c}$=0 dB otherwise;

In case the wireless device supports more than one of band combinations for V2X operating bands for concurrent operation, CA, SUL or DC, and an operating band may belong to more than one band combinations then
  a) When an operating band frequency range is ≤1 GHZ, an applicable additional $\Delta T_{IB,c}$ may be the average value for all band combinations, truncated to one decimal place that apply for that operating band among supported band combinations. In case there is a harmonic relation between low band UL and high band DL, then a maximum $\Delta T_{IB,c}$ among the different supported band combinations involving such band may be applied
  b) When the operating band frequency range is >1 GHZ, the applicable additional $\Delta T_{IB,c}$ may be the maximum value for all band combinations for the applicable operating bands.

$\Delta T_{C,c}$=1.5 dB when NOTE 3 applies for a serving cell c, otherwise $\Delta T_{C,c}$=0 dB;

$MPR_c$ and $A\text{-}MPR_c$ for serving cell c may be preconfigured;

$\Delta MPR_c$ for serving cell c may be preconfigured.

$\Delta T_{RxSRS}$ may be applied during SRS transmission occasions with usage in SRS-ResourceSet set as 'antennaSwitching' when
  a) the wireless device transmits SRS on the second SRS resource in every configured SRS resource set when the SRS-TxSwitch capability is indicated as 't1r2' or 't1r1-t1r2'
  b) the wireless device transmits SRS on the second, third and fourth SRS resources of the total 4 SRS resources from all configured SRS resource set(s) consisting of one SRS port when the SRS-TxSwitch capability is indicated as 't1r4' or, 't1r4-t2r4' or 't1r1-t1r2-t1r4' or, 't1r1-t1r2-t2r2-t1r4-t2r4'
  c) the wireless device transmits SRS from the second SRS port pair on the second SRS resource in every configured SRS resource set consisting of two SRS ports when the SRS-TxSwitch capability is indicated as 't2r4' or 't1r4-t2r4', or 't1r1-t1r2-t2r2-t2r4' or 't1r1-t1r2-t2r2-t1r4-t2r4', or
  d) the wireless device transmits SRS to a DL-only carrier The value of $\Delta T_{RxSRS}$ may be 4.5 dB for bands whose $F_{UL\_high}$ is higher than the $F_{UL\_low}$ of n79 and 3 dB for bands whose $F_{UL\_high}$ is lower than the $F_{UL\_low}$ of n79 when the device is capable of power class 3 or power class 5 or power class 1.5 in the band, or when the device is capable of power class 2 in the band and $\Delta P_{PowerClass}$=3 dB, or when UE indicating txDiversity-r16.

The value of $\Delta T_{RxSRS}$ may be 7.5 dB for bands whose $F_{UL\_high}$ is higher than the $F_{UL\_low}$ of n79 and 6 dB for bands whose $F_{UL\_high}$ is lower than the $F_{UL\_low}$ of n79 during SRS transmission occasions with configured SRS resources consisting of one SRS port when the device is capable of power class 2 in the band and $\Delta P_{PowerClass}$=0 dB and not indicating txDiversity-r16.

For other SRS transmissions $\Delta T_{RxSRS}$ may be zero;

$P\text{-}MPR_c$ may be the power management maximum power reduction for
  a) ensuring compliance with applicable electromagnetic energy absorption requirements and addressing unwanted emissions/self-sense/self-detection/self-defense requirements in case of simultaneous transmissions on multiple RAT(s);
  b) ensuring compliance with applicable electromagnetic energy absorption requirements in case of proximity detection is used to address such requirements that require a lower maximum output power.

The wireless device may apply $P\text{-}MPR_c$ for serving cell c only for the above cases. For wireless device conducted conformance testing $P\text{-}MPR_c$ may be 0 dB $T_{REF}$ and $T_{eval}$ may be specified in Table 6.2.4-1. For each $T_{REF}$, the $P_{CMAX,L,c}$ for serving cell c is evaluated per $T_{eval}$ and given by the minimum value taken over the transmission(s) within the $T_{eval}$, the minimum $P_{CMAX\_L,f,c}$ over one or more $T_{eval}$ is then applied for the entire $T_{REF}$.

TABLE 6.2.4-1

Evaluation and reference periods for Pcmax

| $T_{REF}$ | $T_{eval}$ | $T_{eval}$ with frequency hopping |
|---|---|---|
| Physical channel length | Physical channel length | Min($T_{no\_hopping}$, Physical Channel Length) |

The measured configured maximum output power $P_{UMAX,f,c}$ may be within the following bounds:

$$P_{CMAX\_L,f,c} - \text{MAX}\{T_{L,c}, T(P_{CMAX\_L,f,c})\} \le$$
$$P_{UMAX,f,c} \le P_{CMAX\_H,f,c} + T(P_{CMAX\_H,f,c}).$$

where the tolerance $T(P_{CMAX,f,c})$ for applicable values of $P_{CMAX,f,c}$ is specified in Table 6.2.4-1. The tolerance $T_{L,c}$ is the absolute value of the lower tolerance.

TABLE 6.2.4-1

| $P_{CMAX,f,c}$ (dBm) | $P_{CMAX}$ tolerance Tolerance $T(P_{CMAX,f,c})$ (dB) |
|---|---|
| $23 < P_{CMAX,c} \leq 33$ | 2.0 |
| $21 \leq P_{CMAX,c} \leq 23$ | 2.0 |
| $20 \leq P_{CMAX,c} < 21$ | 2.5 |
| $19 \leq P_{CMAX,c} < 20$ | 3.5 |
| $18 \leq P_{CMAX,c} < 19$ | 4.0 |
| $13 \leq P_{CMAX,c} < 18$ | 5.0 |
| $8 \leq P_{CMAX,c} < 13$ | 6.0 |
| $-40 \leq P_{CMAX,c} < 8$ | 7.0 |

The wireless device may determine the PRACH target reception power, for example, based on a preambleReceivedTargetPower provided/transmitted by the base station in/via/by the one or more configuration parameters. The wireless device may determine the PRACH target reception power, for example, based on a preamble power ramping step. The wireless device may determine the PRACH target reception power, for example, based on a power ramping counter. For example, the wireless device may determine the PRACH target reception power as preambleReceivedTargetPower+delta preamble (e.g., determined based on an RA preamble format)+(power ramping counter−1)*preamble power ramping step.

The wireless device may determine the pathloss, for example, based on measuring an RS. For example, the first PDCCH order may indicate the RS (e.g., SSB, CSI-RS, and the like). The wireless device may determine the pathloss, for example, based on a radio link quality (e.g., reference signal received power, reference signal received quality, received signal strength indication, received signal strength, signal to noise ratio, block error rate, target block error rate, bit error rate, estimated block error rate, and the like) of the RS.

In an example, the first equation may be, for example, the first transmit/transmission power=min {wireless device configured maximum output power (e.g., $P_{CMAX,f,c}$), the PRACH target reception power+the pathloss}.

In an example, the wireless device may receive a second PDCCH order. The second PDCCH order may trigger/initiate a second RA procedure. The wireless device may receive the second PDCCH order from/via the first cell (e.g., Cell 0 in FIG. 24, the source cell, the serving cell, and the like). The second PDCCH order may initiate the second RA procedure of/for a second cell. The second cell may be, for example, a candidate/target cell of the one or more candidate/target cells. In the example of FIG. 24, the second cell may be Cell 1.

The second PDCCH order may be, for example, an LTM PDCCH order (e.g., for early sync as part of LTM/an LTM procedure). The second PDCCH order may, for example, trigger/initiate an RA procedure for early synchronization/early TA acquisition/RACH-based TA acquisition (e.g., as shown in FIG. 17). The second PDCCH order may comprise a configuration index. For example, the configuration index may identify/indicate a candidate/target (LTM cell) configuration of the one or more candidate/target (LTM cell) configurations. The second PDCCH order may indicate a candidate/target cell index. The candidate/target cell index may indicate/identify the candidate/target cell (e.g., Cell 1 in FIG. 24) of the one or more candidate/target cells. The second PDCCH order may initiate/trigger an RA procedure (e.g., the second RA procedure) to/for/via/of/toward the candidate/target cell of the one or more candidate/target cells.

In response to receiving the second PDCCH order triggering/initiating the second RA procedure for/of/via the candidate/target cell (e.g., Cell 1 in FIG. 24) of the one or more candidate/target cells, the wireless device may transmit a second RA preamble via/to the candidate/target cell (e.g., Cell 1 in FIG. 24) of the one or more candidate/target cells. The wireless device may transmit the second RA preamble (e.g., second PRACH transmission, second RACH transmission, and the like) with/using a second transmit/transmission power.

The wireless device may determine the second transmit/transmission power, for example, based on/using a second equation. The second equation may be, for example, the second transmit/transmission power=the wireless device configured maximum output power (e.g., $P_{CMAX,f,c}$).

The wireless device may determine the second transmit/transmission power based on/using the second equation, for example, in response to the second PDCCH order triggering/initiating the second RA procedure for/of/via the candidate/target cell (e.g., Cell 1 in FIG. 24) of the one or more candidate/target cells. The wireless device may determine the second transmit/transmission power based on/using the second equation, for example, in response to the second PDCCH order being an LTM PDCCH order (e.g., for early sync as part of LTM/an LTM procedure). The wireless device may determine the second transmit/transmission power based on/using the second equation, for example, in response to the second PDCCH order triggering/initiating an RA procedure (e.g., the second RA procedure) for early synchronization/early TA acquisition/RACH-based TA acquisition (e.g., as shown in FIG. 17). The wireless device may determine the second transmit/transmission power based on/using the second equation, for example, in response to the second PDCCH order comprising a configuration index. The wireless device may determine the second transmit/transmission power based on/using the second equation, for example, in response to the second PDCCH order indicating the candidate/target cell (e.g., Cell 1 in FIG. 24) of the one or more candidate/target cells. The wireless device may determine the second transmit/transmission power based on/using the second equation, for example, in response to the second PDCCH order initiating/triggering an RA procedure (e.g., the second RA procedure) to/for/via/of/toward the candidate/target cell of the one or more candidate/target cells (in/for LTM).

The wireless device may determine (e.g., set, assign, and the like) a value of the power ramping counter to a first value, for example, based on the second PDCCH order triggering/initiating the second RA procedure for/of/via the candidate/target cell (e.g., Cell 1 in FIG. 24) of the one or more candidate/target cells. The wireless device may determine (e.g., set, assign, and the like) a value of the power ramping counter to the first value, for example, based on/in response to the second PDCCH order being an LTM PDCCH order (e.g., for early sync as part of LTM/an LTM procedure). The wireless device may determine (e.g., set, assign, and the like) a value of the power ramping counter to the first value, for example, based on/in response to the second PDCCH order triggering/initiating an RA procedure (e.g., the second RA procedure) for early synchronization/early TA acquisition/RACH-based TA acquisition (e.g., as shown in FIG. 17). The wireless device may determine (e.g., set, assign, and the like) a value of the power ramping counter to the first value, for example, based on/in response to the second PDCCH order comprising the configuration index (e.g., as shown in FIG. 18). The wireless device may determine (e.g., set, assign, and the like) a value of the power ramping counter to the first value, for example, based on/in response to the second PDCCH order indicating the candidate/target cell (e.g., Cell 1 in FIG. 24) of the one or more candidate/target cells. The wireless device may determine (e.g., set, assign, and the like) a value of the power ramping counter to the first value, for example, based on/in response to the second PDCCH order initiating/triggering an RA procedure (e.g., the second RA procedure) to/for/via/of/toward the candidate/target cell of the one or more candidate/target cells (e.g., in/for LTM).

In an example, the first value may be a maximum value of the power ramping counter among a plurality of values of the power ramping counter. The plurality of values of the power ramping counter may be, for example, {1, 2, 3, . . . , preambleTransMax (e.g., a maximum number of RA Preamble transmissions)}. The maximum value may be, for example, preambleTransMax.

In an example, the second PDCCH order may comprise/indicate a second value of the power ramping counter. The wireless device may determine/set the value of the power ramping counter to the second value, for example, based on the second PDCCH order comprising/indicating the second value for the power ramping counter.

In an example, the second PDCCH order may comprise/indicate a value for/of the PRACH target received power. The wireless device may determine, e.g., for the first equation, the PRACH target received power based on the value for/of the PRACH target received power.

In some existing technologies, the PDCCH order may comprise a power control field (e.g., transmit power control field). The wireless device may not be able to determine (the second) transmit/transmission power for (the second) RA preamble transmission (e.g., PRACH transmission) based on the power control field (e.g., because the power control field may be (only) used to determine transmit/transmission power for PUSCH/PUCCH/SRS transmission(s) and/or not PRACH transmission(s).) In some existing technologies, the PDCCH order may indicate whether to perform power ramping. Based on receiving the PDCCH order indicating whether to perform power ramping, the wireless device may not know what values to use for the parameters in the first and/or the second equation to determine (the second) transmit/transmission power for (the second) RA preamble transmission (e.g., PRACH transmission). Using example embodiments of the present disclosure (as described/disclosed above (previous paragraphs) and in the following) may solve the problems in the existing technologies and/or enabled a wireless device to determine a transmit/transmission power for a PRACH transmission (e.g., RA preamble transmission).

The wireless device may determine the second transmit/transmission power based on/using the first equation, for example, with/using a value of/for the power ramping counter as the second value. The wireless device may determine the second transmit/transmission power based on/using the first equation, for example, with/using the value for/of the PRACH target received power.

In an example, the wireless device may determine the second transmit/transmission power based on/using the first equation. The second PDCCH order may indicate, for example, one or more parameters of the first equation (e.g., delta preamble, the PRACH target received power, the preamble power ramping step, power ramping counter, and the like).

The wireless device may transmit the second RA preamble (e.g., second PRACH transmission, second RACH transmission, and the like) with the second transmit/transmission power may be an initial RA preamble transmission (e.g., PRACH/RACH transmission) of/for the second RA procedure. For example, the wireless device may set/initialize a value of a preamble transmission counter to one. The wireless device may transmit the second RA preamble (e.g., second PRACH transmission, second RACH transmission, and the like) with the second transmit/transmission power when the value of the preamble transmission counter is one.

In an example, the first transmit/transmission power may be less (e.g., lower, weaker, smaller, below, and the like) than the second transmit/transmission power.

In an example, the wireless device may change a spatial domain transmission filter from/between the first RA procedure to/and the second RA procedure (e.g., from the first RA preamble transmission to the second RA preamble transmission). The wireless device may (determine to) suspend of the power ramping counter based on changing the spatial domain transmission filter from the first RA procedure to the second RA procedure (e.g., from the first RA preamble transmission to the second RA preamble transmission).

In an example, due to power allocation to PUSCH/PUCCH/PRACH/SRS transmissions, due to power allocation in EN-DC or NE-DC or NR-DC operation, due to slot format determination, due to the PUSCH/PUCCH/PRACH/SRS transmission occasions are in the same slot or the gap between a PRACH transmission and PUSCH/PUCCH/SRS transmission is small, and/or due to HD-UE operation in paired spectrum, the wireless device may not transmit the first RA preamble (e.g., the first PRACH transmission). The wireless device may (determine to) suspend the power ramping counter, for example, based on not transmitting the first RA preamble (e.g., the first PRACH transmission).

In an example, due to power allocation to PUSCH/PUCCH/PRACH/SRS transmissions, due to power allocation in EN-DC or NE-DC or NR-DC operation, the wireless device may transmit the first RA preamble (e.g., the first PRACH transmission) with reduced power in a transmission occasion. The wireless device may (determine to) suspend the power ramping counter, for example, based on transmitting the first RA preamble (e.g., the first PRACH transmission) with reduced power in a transmission occasion.

In an example, the PDCCH order may indicate the first value of/for the power ramping counter. The wireless device may not determine/set the power ramping counter to the first value indicated in the PDCCH order (e.g., may ignore the first value of/for the power ramping counter indicated in the PDCCH order), for example, based on suspending the power ramping counter. The wireless device may determine/set the power ramping counter to the first value indicated in the PDCCH order, for example, based on not suspending the power ramping counter.

In an example, the PDCCH order may indicate a power ramping for a PRACH transmission. The wireless device may ramp the power as indicated in the PDCCH order (e.g., may ignore the power ramping indication in the PDCCH order), for example, based on suspending the power ramping counter. The wireless device may perform power ramping as indicated in the PDCCH order, for example, based on not suspending the power ramping counter.

Figure 25:
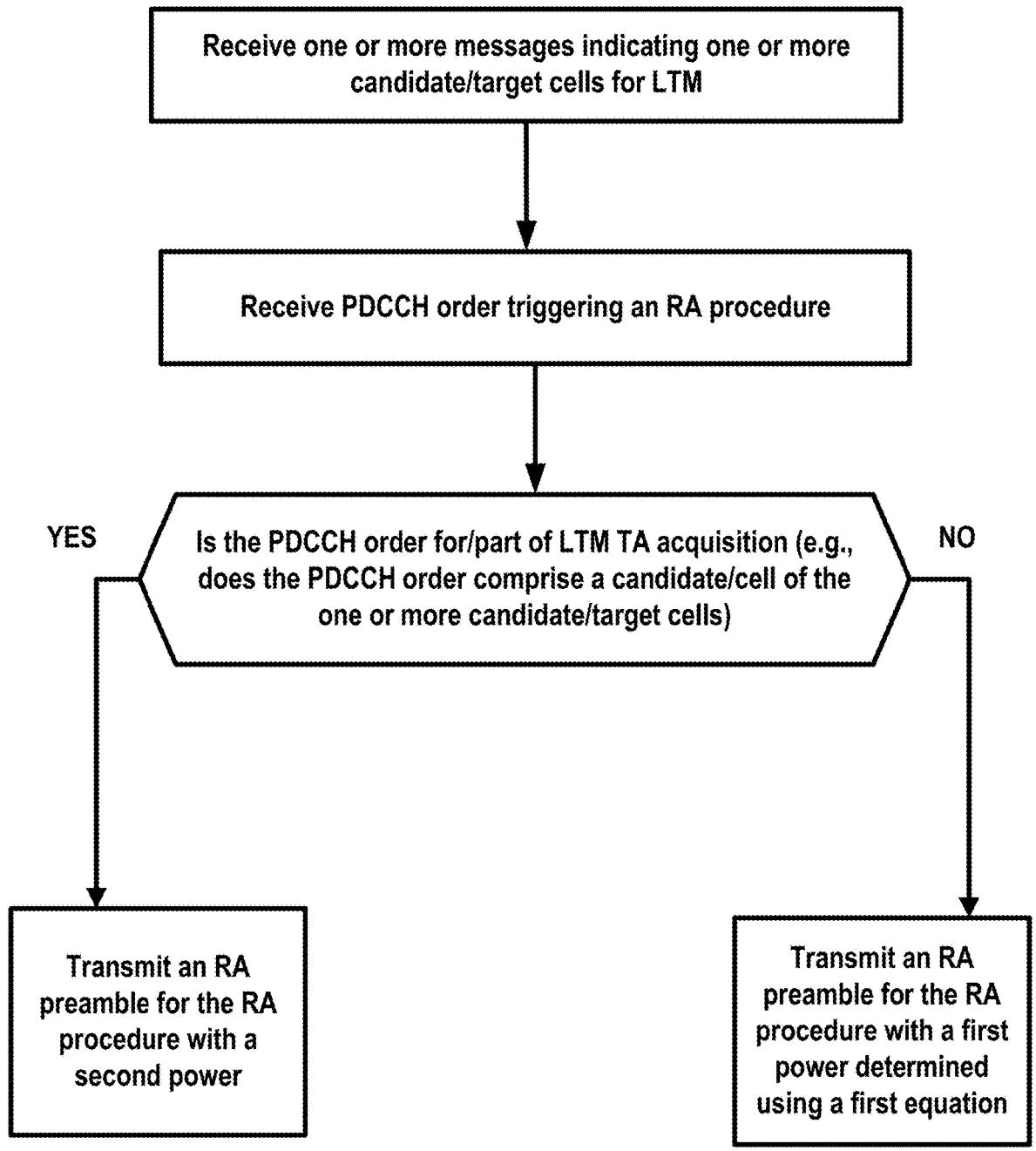
FIG. 25 shows an example flow diagram as per an aspect of an embodiment of the present disclosure.

FIG. 25 shows an example flow diagram as per an aspect of an embodiment of the present disclosure. According to the example of FIG. 25, a wireless device may receive, from a base station and via/from a first/source/serving cell, one or more message(s) (e.g., one or more RRC messages, one or more RRC reconfiguration messages, and the like). The one or more messages may comprise/indicate one or more candidate/target cells for LTM. The one or more messages may comprise/indicate one or more candidate/target (LTM cell) configurations for/of/associated with the one or more candidate/target cells. Each candidate/target (LTM cell) configuration of the one or more candidate/target (LTM cell) configurations may be for/of/associated with a respective candidate/target cell of the one or more candidate/target cells.

The wireless device may receive, e.g., via/from a first/source/serving cell, a PDCCH order. In an example, the PDCCH order may trigger/initiate an RA procedure for/of/via/to/toward a first cell. The first cell may not be a candidate/target cell of the one or more candidate/target cells. The first cell may not be comprised in the one or more candidate/target cells. The wireless device may determine a first transmit/transmission power to transmit an RA preamble (e.g., PRACH transmission, RACH transmission, and the like) for/of the RA procedure. The wireless device may determine the first transmit/transmission power, for example, based on the first equation (e.g., the first equation used in the example embodiment of FIG. 24), for example, based on the PDCCH order may triggering/initiating an RA procedure for/of/via/to/toward the first cell that is not comprised in the one or more candidate/target cells.

In another example, the PDCCH order may trigger/initiate an RA procedure for/of/via/to/toward a second cell (e.g., a candidate/target cell of the one or more candidate/target cells). The second cell may be one of the one or more candidate/target cells. For example, the one or more candidate/target cells may comprise the second cell. The wireless device may determine a second transmit/transmission power to transmit an RA preamble (e.g., PRACH transmission, RACH transmission, and the like) for/of the RA procedure. In an example, the wireless device may determine the second transmit/transmission power using/based on the second equation (e.g., the second equation used in the example embodiment of FIG. 24), for example, based on the PDCCH order triggering/initiating an RA procedure for/of/via/to/toward the second cell that is part of/comprised in the one or more candidate/target cells.

In an example, the first transmit/transmission power may be lower than the second transmit/transmission power.

A wireless device may receive a PDCCH order initiating/triggering an RA procedure for/via/of/toward a candidate/target cell of one or more candidate/target cells for LTM. The wireless device may use a RA response (RAR) window associated with the candidate/target cell, of the one or more candidate/target cells, for the RA procedure. In the implementation of existing technologies, there may be a single RAR window configured/associated with a cell (e.g., the candidate/target cell of the one or more candidate/target cells). In an example, the RAR window may be an extended time window, for example, to handle inter-DU communication (delay/latency) in LTM (e.g., a candidate/target DU receiving an RA preamble from a wireless device, the candidate/target DU determining a TA based on the RA preamble, the candidate/target DU transmitting the TA to a source DU, and/or the source DU transmitting the TA, e.g., RAR, to the wireless device). Using the RAR window (e.g., the extended time window) may result in waste of resources/time and/or additional power consumption in the wireless device for monitoring a PDCCH/DCI during the RAR window (e.g., the extended time window) for a second RA procedure that is not initiated/triggered for LTM (e.g., for initial cell, beam failure recovery, SI request, SR failure, and the like).

In light of the existing technologies, there is a need to improve monitoring for a RAR for/of an RA procedure in/via/for a cell that is (also) configured for LTM.

According to example embodiments of the present disclosure, the wireless device may receive one or more candidate/target (LTM cell) configurations for/of/associated with/comprising one or more candidate/target cells for LTM, wherein the each candidate/target (LTM cell) configuration of the one or more candidate/target (LTM cell) configurations is for/of/associated with/comprising a respective candidate/target cell of the one or more candidate/target cells. Each candidate/target (LTM cell) configuration may indicate at least two RAR window values/configurations. The at least two RAR window values/configurations may comprise a first RAR window value/configuration and a second RAR window value/configuration. The wireless device may receive a PDCCH order triggering/initiating an RA procedure. In an example, the PDCCH order may trigger/initiate an RA procedure for LTM (e.g., early sync, early TA acquisition, RACH-based (early) TA acquisition, and the like). The wireless device may use the first RAR window value/configuration for the RA procedure, for example, in response to (or based on) the PDCCH order may triggering/initiating the RA procedure for LTM. In another example, the PDCCH order may trigger/initiate a second RA procedure that is not for/associated with LTM (e.g., for timing synchronization with a cell via which the wireless device receives the PDCCH order). The wireless device may use the second RAR window value/configuration for the RA procedure, for example, in response to (or based on) the PDCCH order may triggering/initiating the RA procedure that is not for/associated with LTM.

Based on using an RAR window configuration/value depending on whether an RA procedure is initiated/triggered for LTM or not, the wireless device may not unnecessarily monitor for PDCCH/DCI when the wireless device is not expected to receive a PDCCH/DCI. This may result in reduction of power consumption at the wireless device and/or improvement in battery life of the wireless device.

Figure 26:
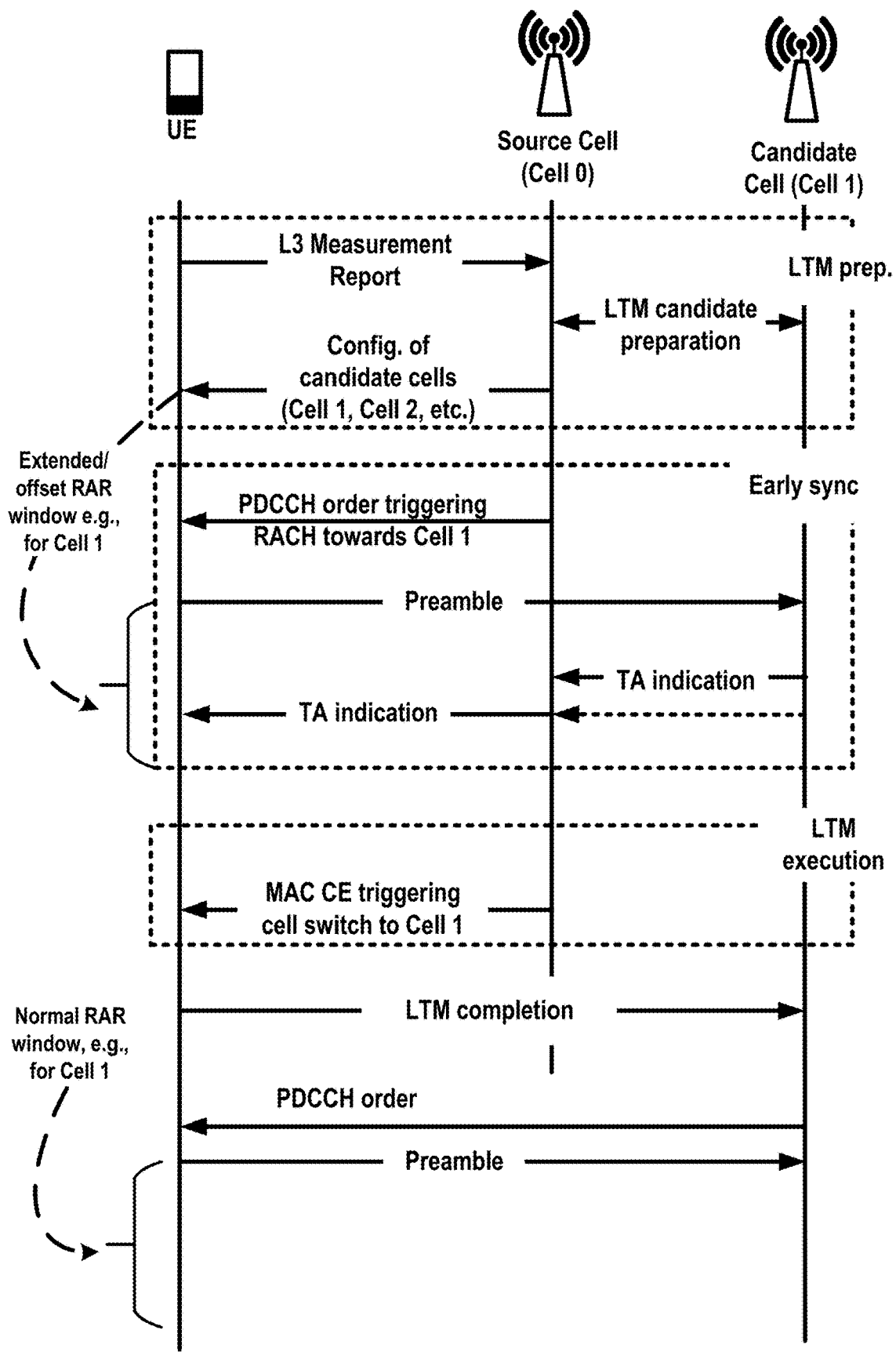
FIG. 26 shows an example timing diagram as per an aspect of an embodiment of the present disclosure.

FIG. 26 shows an example timing diagram as per an aspect of an embodiment of the present disclosure. According to the example embodiment in FIG. 26, the wireless device may receive one or more candidate/target (LTM cell) configurations from a base station (e.g., via a source/serving cell/Cell 0 in FIG. 26). The wireless device may receive one or more messages comprising the one or more candidate/target (LTM cell) configurations. The one or more candidate/target (LTM cell) configurations may comprise/be for/associated with/of one or more candidate/target cells for LTM. Each candidate/target (LTM cell) configuration of the one or more candidate/target (LTM cell) configurations may be for/comprise/of/associated with a respective candidate/target cell of the one or more candidate/target cells. The one or more messages may indicate the one or more candidate/target cells.

In an example, the wireless device may receive one or more RA configurations (e.g., RACH-config, RACH-ConfigGeneric, RACH-ConfigCommon, RACH-ConfigDedicated, and the like). Each RA configuration of the one or more RA configurations may be for/of/associated with a respective candidate/target cell of the one or more candidate/target cells, for example, as shown in FIG. 18. In an example, the one or more candidate/target (LTM cell) configurations may comprise the one or more RA configurations. In another example, the one or more RA configurations may be transmitted by the base station to the wireless device, for example, outside/independent of/separately from the one or more candidate/target (LTM cell) configurations.

Each RA configuration of the one or more RA configurations may indicate, for a respective candidate/target cell of the one or more candidate/target cells, at least two RAR window value/configurations. For example, the at least two RAR window value/configurations may comprise a first RAR window value/configuration. The at least two RAR window value/configurations may comprise a second RAR window value/configurations. In an example, the first RAR window value/configuration may be associated with/for LTM (e.g., RACH-based TA acquisition, RA procedure associated with/for early synchronization, and the like). The second RAR window value/configuration may be/for/comprise/associated with an RA procedure that is not for/ associated with LTM (e.g., early sync for LTM, TA acquisition for LTM, RACH-based TA acquisition for LTM, and the like).

FIG. 27A shows an example information element (IE) as per an aspect of an embodiment of the present disclosure. A part of an RA configuration of the one or more RA configurations is shown in FIG. 27A as the example IE. In the example IE, ra-responsewindowLTM may indicate/comprise the first RAR window value/configuration. In the example IE, ra-responseWindow may indicate/comprise the second RAR window value/configuration. The first RAR window value/configuration may be, for example, larger (e.g., longer, more, lengthier, higher, and the like) than the second RAR window value/configuration.

FIG. 27B shows an example information element (IE) as per an aspect of an embodiment of the present disclosure. A part of an RA configuration of the one or more RA configurations is shown in FIG. 27B as the example IE. In the example IE, ra-responseWindow-offsetLTM may comprise the first RAR window value/configuration. In the example IE, ra-responseWindow may indicate/comprise the second RAR window value/configuration. The first RAR window value/configuration may indicate/comprise to the wireless device to start the RAR window after an offset indicated/comprised by/in the first RAR window value/configuration (e.g., ra-responseWindow-offsetLTM).

In the example of FIG. 26, the wireless device may receive a PDCCH order via a source/serving cell (e.g., Cell 0 in FIG. 26). The PDCCH order may trigger/initiate a first RA procedure (e.g., for LTM) for/via/toward/to/of a candidate/target cell (e.g., Cell 1 in FIG. 26) of the one or more candidate/target cells. In response to the PDCCH order triggering/initiating the first RA procedure (e.g., for LTM) for/via/toward/to/of a candidate/target cell (e.g., Cell 1 in FIG. 26) of the one or more candidate/target cells, the wireless device may use the first RAR window value/configuration for the first RA procedure. Using the first RAR window value/configuration may comprise the following: For example, the wireless device may transmit a first RA preamble (e.g., first PRACH transmission) via/to/for the candidate/target cell of the one or more candidate/target cells. The wireless device may start a time window (e.g., RAR window) based on the first RAR window value/configuration. For example, the first RAR window value/configuration may indicate/comprise an extended RAR window (e.g., longer RAR window than an RAR window indicated/comprised in/by the second RAR window value/configuration). For example, the first RAR window value/configuration may indicate an offset between transmission of a PRACH/RA preamble and start of an RAR window. Based on using the first RAR window value/configuration, the wireless device may, for example, start the time window with a value indicated in the first RAR window value/configuration. Based on using the first RAR window value/configuration, the wireless device may, for example, start the time window after an offset after the transmitting the first RA preamble (e.g., first PRACH transmission).

The wireless device may, for example, receive, e.g., via the source/serving cell (e.g., Cell 0 in FIG. 26), a control command (e.g., cell switch MAC CE). The control command may indicate a (LTM) cell switch from the source/serving cell (e.g., Cell 0 in FIG. 26) to the candidate/target cell (e.g., Cell 1 in FIG. 26) of the one or more candidate/target cells. The wireless device may perform LTM competition via/with/to/for/of/toward the candidate/target cell of the one or more candidate/target cells.

The wireless device may receive, for example, via the candidate/target cell (e.g., Cell 1 in FIG. 26) a second PDCCH order. The second PDCCH order may trigger/initiate a second RA procedure. The second RA procedure may be for/of/via/associated with the candidate/target cell (e.g., the same as via which the PDCCH order was received by the wireless device). The wireless device may transmit a second RA preamble (e.g., second PRACH transmission) for/of/associated with the second RA procedure. The second RA procedure may not be associated with/for LTM (e.g., early synchronization for LTM, TA acquisition for LTM, and the like).

In response to the second PDCCH order triggering/initiating the second RA procedure for/via/toward/to/of a candidate/target cell (e.g., Cell 1 in FIG. 26) of the one or more candidate/target cells, the wireless device may use the second RAR window value/configuration for the second RA procedure. Using the second RAR window value/configuration may comprise the following: For example, the wireless device may transmit the second RA preamble (e.g., second PRACH transmission) via/to/for the candidate/target cell. The wireless device may start a time window (e.g., RAR window) based on the second RAR window value/configuration. For example, the second RAR window value/configuration may indicate/comprise a normal (e.g., not extended) RAR window (e.g., shorter (e.g., smaller, less, and the like) RAR window than an RAR window indicated/comprised in/by the first RAR window value/configuration). For example, the second RAR window value/configuration may not indicate an offset between transmission of a PRACH/RA preamble and start of an RAR window. Based on using the first RAR window value/configuration, the wireless device may, for example, start the time window with a value indicated in the second RAR window value/configuration.

The wireless device may transmit the first/second PRACH transmission for a first/second RA procedure. In response to the first/second PRACH transmission, the wireless device may attempt to detect a DCI format 1_0 with CRC scrambled by a RA-RNTI (associated with the first/second PRACH transmission) during a time window. The time window may start at the first symbol of the earliest CORESET the wireless device is configured to receive PDCCH for Type1-PDCCH CSS set that is at least one symbol, after the last symbol of a PRACH occasion corresponding to the first/second PRACH transmission (or a last PRACH transmission). The length of the time window in number of slots, based on the SCS for Type1-PDCCH CSS set, may be provided by ra-ResponseWindow (e.g., via the one or more configuration parameters by a base station, via the one or more RA configurations).

Once the first/second RA Preamble is transmitted and regardless of the possible occurrence of a measurement gap, the wireless device may monitor PDCCH of the SpCell for RAR(s) identified by the RA-RNTI while the ra-Response Window is running.

Figure 28:
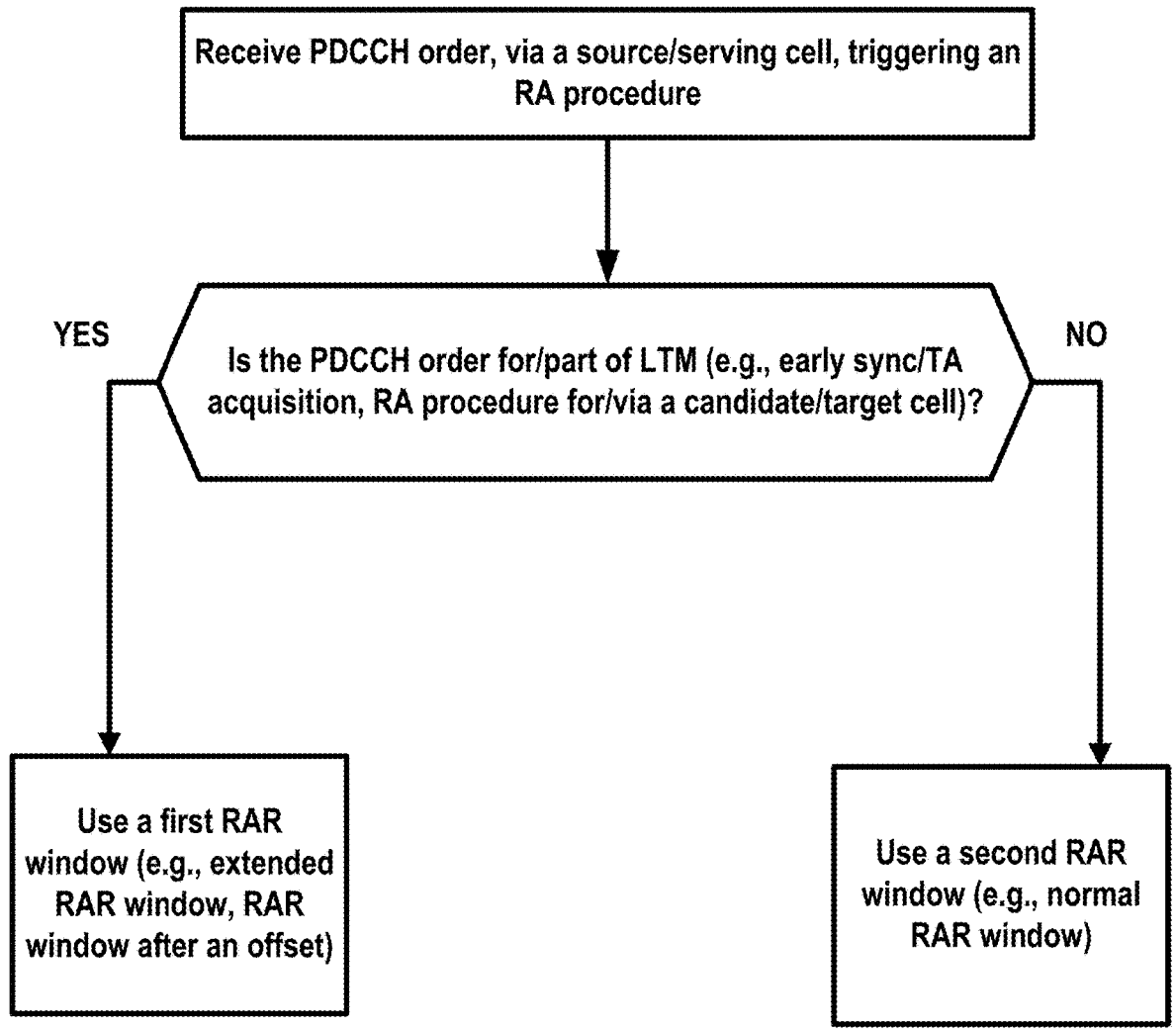
FIG. 28 shows an example flow diagram as per an aspect of an embodiment of the present disclosure.

FIG. 28 shows an example flow diagram as per an aspect of an embodiment of the present disclosure. According to the example of FIG. 28, the wireless device may receive a PDCCH order. The wireless device may receive a PDCCH order via/from a first/source/serving cell. The PDCCH order may trigger/initiate an RA procedure.

The wireless device may transmit an RA preamble (e.g., PRACH transmission) for/of the RA procedure. The wireless device may start a time window (e.g., RAR window) after transmitting the RA preamble. The wireless device may attempt to detect a DCI format 1_0 with CRC scrambled by a RA-RNTI (associated with the PRACH transmission) during the time window.

The wireless device may determine when to start the time window, for example, based on the PDCCH order. In an example, the PDCCH order may trigger/initiate an RA procedure for LTM (e.g., early sync for LTM, early TA acquisition for LTM, RACH-based TA acquisition for LTM, RA procedure to/for/via a candidate/target cell of one or more candidate/target cells, and the like). The wireless device may start the time window after an offset (after the first PDCCH) from the end of the RA Preamble transmission, for example, based on the PDCCH order triggering/initiating the RA procedure for LTM (e.g., early sync for LTM, early TA acquisition for LTM, RACH-based TA acquisition for LTM, RA procedure to/for/via a candidate/target cell of one or more candidate/target cells, and the like). The one or more configuration parameters and/or the one or more RA configurations (and/or the first RAR window value/configuration) may indicate/comprise the offset. The wireless device may determine a length of the time window to be a first length (e.g., indicated in the first RAR window value/configuration, extended RAR window, LTM RAR window, and the like), for example, based on the PDCCH order triggering/initiating the RA procedure for LTM (e.g., early sync for LTM, early TA acquisition for LTM, RACH-based TA acquisition for LTM, RA procedure to/for/via a candidate/target cell of one or more candidate/target cells, and the like).

In another example, the PDCCH order may trigger/initiate an RA procedure for the source/serving cell (e.g., same cell in which the PDCCH order was received by the wireless device). The PDCCH order and/or the RA procedure may not be for LTM (e.g., early sync for LTM, early TA acquisition for LTM, RACH-based TA acquisition for LTM, RA procedure to/for/via a candidate/target cell of one or more candidate/target cells, and the like). The wireless device may start the time window (e.g., at the first PDCCH occasion) from the end of the RA Preamble transmission (e.g., without an offset), for example, based on the PDCCH order triggering/initiating the RA procedure for the source/serving cell (e.g., same cell in which the PDCCH order was received by the wireless device) and/or the PDCCH order and/or the RA procedure not being for LTM (e.g., early sync for LTM, early TA acquisition for LTM, RACH-based TA acquisition for LTM, RA procedure to/for/via a candidate/target cell of one or more candidate/target cells, and the like). The wireless device may determine a length of the time window to be a second length (e.g., a normal/legacy RAR window, not an extended RAR window, indicated in RACH-ConfigGeneric, indicated outside LTM-specific configuration parameters shown in FIG. 18, and the like), for example, based on the PDCCH order triggering/initiating the RA procedure for the source/serving cell (e.g., same cell in which the PDCCH order was received by the wireless device) and/or the PDCCH order and/or the RA procedure not being for LTM (e.g., early sync for LTM, early TA acquisition for LTM, RACH-based TA acquisition for LTM, RA procedure to/for/via a candidate/target cell of one or more candidate/target cells, and the like). The first length may be, for example, longer (e.g., greater, higher, larger, more, and the like) than the second length.

Figure 29:
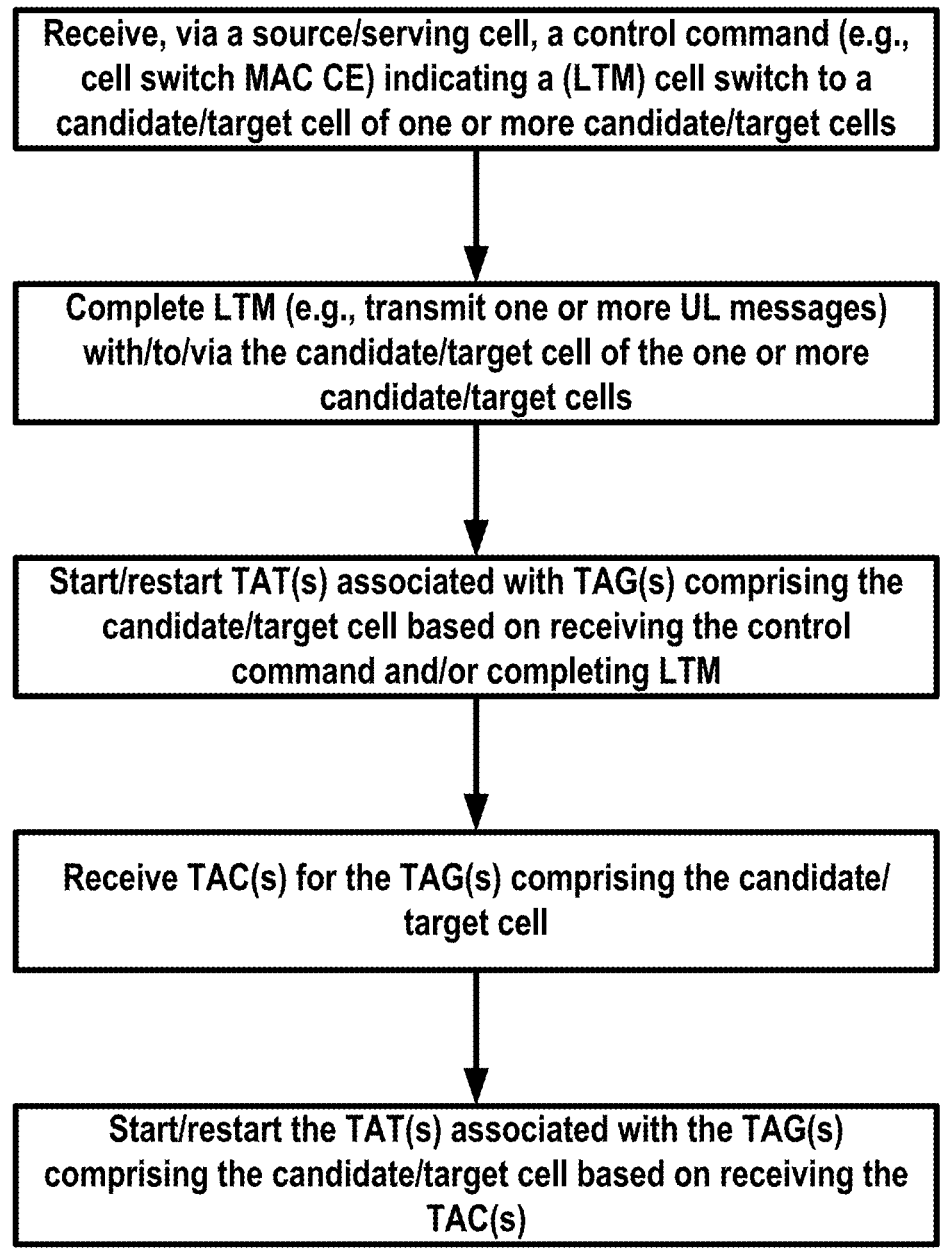
FIG. 29 shows an example flow diagram as per an aspect of an embodiment of the present disclosure.

FIG. 29 shows an example flow diagram as per an aspect of an embodiment of the present disclosure. According to the example of FIG. 29, the wireless device may receive one or more messages from a base station (e.g., via a source/serving cell). The one or more messages may comprise/indicate one or more candidate/target cells for LTM. The one or more messages may comprise/indicate one or more candidate/target (LTM cell) configurations associated with/for/of the one or more candidate/target cells. Each candidate/target (LTM cell) configuration of the one or more candidate/target (LTM cell) configurations may be associated with/for/of a respective candidate/target cell of the one or more candidate/target cells.

The wireless device may receive, via the source/serving cell, a control command (e.g., cell switch MAC CE). The control command may indicate a (LTM) cell switch from the source/serving cell to a candidate/target cell of the one or more candidate/target cells. The wireless device may complete LTM (e.g., LTM completion) with/to/for/via the candidate/target cell of the one or more candidate/target cells. The wireless device may transmit one or more UL messages/signals to/toward/with/via/of the candidate/target cell, of the one or more candidate/target cells, based on (or as part of) completing LTM (e.g., LTM completion).

The wireless device may start/restart TAT(s) associated with TAG(s) comprising the candidate/target cell, of the one or more candidate/target cells, for example, based on (or upon) receiving the control command. The wireless device may start/restart TAT(s) associated with TAG(s) comprising the candidate/target cell, of the one or more candidate/target cells, for example, based on (or after a gap after) receiving the control command. The wireless device may start/restart the TAT(s) associated with the TAG(s) comprising the candidate/target cell, of the one or more candidate/target cells, for example, based on completing LTM. The wireless device may start/restart the TAT(s) associated with the TAG(s) comprising the candidate/target cell, of the one or more candidate/target cells, for example, based on transmitting the one or more UL messages.

The wireless device may receive TAC(s) associated with/for/of the TAG(s) comprising the candidate/target cell of the one or more candidate/target cells. The wireless device may start/restart the TAT(s) associated with the TAG(s) comprising the candidate/target cell, of the one or more candidate/target cells, for example, based on receiving the TAC(s) associated with/for/of the TAG(s) comprising the candidate/target cell of the one or more candidate/target cells.

In the above figures, UE may be analogous to the wireless device.

In some embodiments, a candidate/target cell may be referred to as candidate/target LTM cell. In some embodiments, candidate/target (LTM cell) configuration(s) may be referred to as candidate/target cell configuration(s), candidate/target configuration(s), candidate/target LTM configuration(s), and/or a combination thereof.

In some embodiments, one or more candidate/target cells (e.g., configured/indicated for LTM) may comprise one or more non-serving cells. In some embodiments, one or more candidate/target cells (e.g., configured/indicated for LTM)

may comprise one or more secondary cells. In some embodiments, one or more candidate/target cells (e.g., configured/indicated for LTM) may comprise one or more secondary cell group (SCG) cells. In some embodiments, one or more candidate/target cells (e.g., configured/indicated for LTM) may comprise one or more master cell group (MCG) cells. In some embodiments, one or more candidate/target cells (e.g., configured/indicated for LTM) may comprise one or more deactivated cells.

In some embodiments, the wireless device may receive beam indication(s) (e.g., TCI state(s), spatial relation(s), reference signal(s), spatial filter(s), quasi colocation assumption(s)/information, and the like) for UL/DL transmission(s) via/with/to/from/for a candidate/target cell, of one or more candidate/target cells, before receiving a control command (e.g., cell switch MAC CE) indicating/triggering/initiating a (LTM) cell switch to the candidate/target cell. In some embodiments, the wireless device may receive the beam indication(s) (e.g., TCI state(s), spatial relation(s), reference signal(s), spatial filter(s), quasi colocation assumption(s)/information, and the like) for UL/DL transmission(s) via/with/to/from/for the candidate/target cell, of one or more candidate/target cells, together with the control command (e.g., cell switch MAC CE) indicating/triggering/initiating a (LTM) cell switch to the candidate/target cell. In some embodiments, the wireless device may receive the beam indication(s) (e.g., TCI state(s), spatial relation(s), reference signal(s), spatial filter(s), quasi colocation assumption(s)/information, and the like) for UL/DL transmission(s) via/with/to/from/for the candidate/target cell, of one or more candidate/target cells, after receiving the control command (e.g., cell switch MAC CE) indicating/triggering/initiating a (LTM) cell switch to the candidate/target cell (and/or before LTM completion as shown in FIG. 17).

In some embodiments, a PDCCH order triggering/initiating an RA procedure (e.g., for LTM) may be referred to as a DCI, MAC CE, trigger, and the like.

In some embodiments, a PDCCH order triggering/initiating an RA procedure (e.g., for LTM, RA for TA acquisition for LTM, RA for early sync for LTM, and the like) may indicate candidate/target cell, of one or more candidate/target cells, toward/to/via/of/for the RA procedure. In some embodiments, the PDCCH order triggering/initiating the RA procedure (e.g., for LTM, RA for TA acquisition for LTM, RA for early sync for LTM, and the like) may indicate RACH occasions(s) of the candidate/target cell in a DCI.

In some embodiments (e.g., FIG. 26), the wireless device may receive a TA indication (e.g., TAC) associated with/for/of a candidate/target cell, of one or more candidate/target cells, from a source/serving cell. In some embodiments (e.g., FIG. 26), the wireless device may receive a TA indication (e.g., TAC) associated with/for/of a candidate/target cell, of one or more candidate/target cells, from the candidate/target cell of the one or more candidate/target cells.

In some embodiments, a PDCCH order may trigger/initiate an RA procedure (e.g., for LTM, RA for TA acquisition for LTM, RA for early sync for LTM, and the like). The RA procedure may be, for example, a contention free RA procedure. The RA procedure may be, for example, a contention based RA procedure.

An example method comprising: receiving, by a wireless device, a medium access control (MAC) control element (CE) indicating/initiating a cell switch from a first cell to a second cell, wherein the MAC CE does not comprise a timing advance command; in response to the receiving, restarting a time alignment timer (TAT) associated with a timing advance group comprising the second cell; and transmitting, via the second cell, an uplink signal based on the TAT running.

The above example method, wherein the MAC CE is a cell switch MAC CE.

One or more of the above example methods, further comprising determining a timing advance associated with the timing advance group.

One or more of the above example methods, wherein the determining is based on a timing advance command associated with a second timing advance group.

One or more of the above example methods, wherein the second timing advance group comprises the first cell.

One or more of the above example methods, wherein the determining is based on a timing difference between at least two reference signals.

One or more of the above example methods, wherein the at least two reference signals comprise a first reference signal and a second reference signal.

One or more of the above example methods, wherein: the first reference signal is associated with the first cell; and the second reference signal is associated with the second cell.

One or more of the above example methods, wherein the determining is based on a timing difference between at least two downlink timings.

One or more of the above example methods, wherein the at least two downlink timings comprise a first downlink timing and a second downlink timing.

One or more of the above example methods, wherein: the first downlink timing is associated with the first cell; and the second downlink timing is associated with the second cell.

One or more of the above example methods, wherein the determining is based on a second timing advance of the first cell.

One or more of the above example methods, wherein the timing advance is a sum of the second timing advance and the timing difference.

One or more of the above example methods, wherein the timing advance is a difference between the second timing advance and the timing difference.

One or more of the above example methods, wherein the restarting is before receiving a second timing advance command for/associated with the timing advance group.

One or more of the above example methods, wherein the uplink signal is not a random access preamble.

One or more of the above example methods, wherein the uplink signal is not a random access channel transmission.

One or more of the above example methods, further comprising receiving a second timing command for/associated with the timing advance group.

One or more of the above example methods, further comprising receiving a second timing command via the second cell.

One or more of the above example methods, further comprising restarting the TAT based on receiving the second timing advance command.

A method comprising: transmitting, by a base station, a medium access control (MAC) control element (CE) indicating/initiating a cell switch from a first cell to a second cell, wherein the MAC CE does not comprise a timing advance command; in response to the transmitting, restarting a time alignment timer (TAT) associated with a timing advance group comprising the second cell; and receiving, via the second cell, an uplink signal based on the TAT running.

A method comprising: determining, by a wireless device, a maximum output power among a plurality of output powers for uplink transmissions of the wireless device; and in response to receiving a physical downlink control channel (PDCCH) order initiating a random access procedure for a cell of one or more candidate cells for a lower layer triggered mobility procedure, transmitting an initial transmission of a preamble via the cell with the maximum output power for the random access procedure.

A method comprising: receiving, by a wireless device, one or more radio resource control (RRC) indicating one or more candidate cells for a lower layer triggered mobility (LTM) procedure; receiving a physical downlink control channel (PDCCH) order initiating a random access procedure for a cell among the one or more candidate cells; and in response to receiving the PDCCH order for the cell among the one or more candidate cells of the LTM procedure, transmitting an initial transmission of a preamble via the cell with a maximum output power among a plurality of output powers for uplink transmissions of the wireless device.

A method comprising: receiving, by a wireless device, one or more radio resource control (RRC) indicating one or more candidate cells for a lower layer triggered mobility (LTM) procedure; receiving a physical downlink control channel (PDCCH) order initiating a random access procedure for a cell among the one or more candidate cells; and in response to receiving the PDCCH order for the cell among the one or more candidate cells of the LTM procedure, transmitting an initial transmission of a preamble via the cell with a maximum output power among a plurality of output powers for uplink transmissions of the wireless device.

A method comprising: receiving, by a wireless device, one or more radio resource control (RRC) indicating one or more candidate cells for a lower layer triggered mobility (LTM) procedure; receiving a physical downlink control channel (PDCCH) order initiating a random access procedure for a cell among the one or more candidate cells; and in response to receiving the PDCCH order for the cell among the one or more candidate cells of the LTM procedure, transmitting an initial transmission of a preamble via the cell with a maximum output power among a plurality of output powers for uplink transmissions of the wireless device.

One or more of the above example methods, further comprising: receiving a second PDCCH order initiating a second random access procedure for a second cell not among the one or more candidate cells; and transmitting an initial transmission of a second preamble via the second cell with a first output power that is less than the maximum output power.

A method comprising: receiving, by a wireless device, one or more radio resource control (RRC) messages indicating one or more candidate cells for a lower layer triggered mobility (LTM) procedure; receiving a physical downlink control channel (PDCCH) order initiating a random access procedure for a cell; and in response to the cell, indicated by the PDCCH, being among the one or more candidate cells of the LTM procedure, transmitting an initial transmission of a preamble via the cell with a maximum output power among a plurality of output powers for uplink transmissions of the wireless device.

One or more of the above example methods, further comprising setting a power ramping counter (e.g., PREAMBLE_POWER_RAMPING_COUNTER) to a maximum value (e.g., preambleTransMax) among values for the power ramping counter in response to the cell, indicated by the PDCCH order, being among the one or more candidate cells of the LTM procedure.

A method comprising: in response to receiving a physical downlink control channel (PDCCH) order initiating a random access procedure for a candidate cell of a lower layer triggered mobility (LTM) procedure, transmitting an initial transmission of a preamble via the cell with a maximum output power among a plurality of output powers for uplink transmissions of the wireless device.

According to an example embodiment of clause 1, a method may include, in response to receiving an LTM cell switch command with no timing adjustment value, starting a time alignment timer associated with a PTAG after measuring a timing advance of a cell.

In an example embodiment of clause 2, the method of clause 1 may further include receiving, by a wireless device, an LTM cell switch command.

In an example embodiment of clause 3, the method of clause 1 or clause 2 may be further limited such that the LTM cell switch command comprises a configuration index indicating a cell for an LTM procedure.

In an example embodiment of clause 4, the method of any one of clauses 1 to 3 may be further limited such that the LTM cell switch command does not comprise a timing adjustment value for the PTAG of the cell.

These embodiments of clauses 1 to 4 may be implemented alone or in combination with one another. Additionally, these embodiments may be combined with the other embodiments disclosed herein.

According to an example embodiment, a base station may be configured to provide the LTM cell switch command as described above, and to start a time alignment timer accordingly. This example embodiment may likewise be used with the other embodiments described herein.

What is claimed is:

1. A wireless device comprising:
   one or more processors; and
   memory storing instructions that, when executed by the one or more processors, cause the wireless device to:
      receive a layer 1 or layer 2 triggered mobility (LTM) cell switch command, wherein the LTM cell switch command:
         comprises a configuration index indicating a cell for an LTM procedure; and
         does not comprise a timing advance command with a timing adjustment value for a primary timing advance group (PTAG) of the cell; and
      in response to receiving the LTM cell switch command not comprising the timing advance command with the timing adjustment value for the PTAG, start a time alignment timer associated with the PTAG after measuring a timing advance of the cell.

2. The wireless device of claim 1, wherein:
   the instructions further cause the wireless device to receive one or more radio resource control (RRC) messages comprising configuration parameters of one or more candidate cells for an LTM procedure; and
   the cell is a candidate cell among the one or more candidate cells.

3. The wireless device of claim 2, wherein:
   the one or more RRC messages further comprise one or more LTM candidate configurations;
   each LTM candidate configuration, of the one or more LTM candidate configurations, is for a respective cell of the one or more cells; and
   the configuration index indicates an LTM candidate configuration of the one or more LTM candidate configurations.

4. The wireless device of claim 1, wherein the instructions further cause the wireless device to transmit, via the cell, an uplink signal based on the time alignment timer running.

5. The wireless device of claim 1, wherein the instructions further cause the wireless device to receive a second timing advance command for the PTAG.

6. The wireless device of claim 5, wherein the instructions further cause the wireless device to restart the time alignment timer in response to reception of the second timing advance command.

7. The wireless device of claim 1, wherein the timing advance is measured based on a user equipment (UE)-based timing advance measurement procedure.

8. A base station comprising:
one or more processors; and
memory storing instructions that, when executed by the one or more processors, cause the base station to:
transmit, to a wireless device, a layer 1 or layer 2 triggered mobility (LTM) cell switch command, wherein the LTM cell switch command:
comprises a configuration index indicating a cell for an LTM procedure; and
does not comprise a timing advance command with a timing adjustment value for a primary timing advance group (PTAG) of the cell; and
in response to transmitting the LTM cell switch command not comprising the timing advance command with the timing adjustment value for the PTAG, start a time alignment timer associated with the PTAG after measuring a timing advance of the cell.

9. The base station of claim 8, wherein:
the instructions further cause the base station to transmit, to the wireless device, one or more radio resource control (RRC) messages comprising configuration parameters of one or more candidate cells for an LTM procedure; and
the cell is a candidate cell among the one or more candidate cells.

10. The base station of claim 9, wherein:
the one or more RRC messages further comprise one or more LTM candidate configurations;
each LTM candidate configuration, of the one or more LTM candidate configurations, is for a respective cell of the one or more cells; and
the configuration index indicates an LTM candidate configuration of the one or more LTM candidate configurations.

11. The base station of claim 8, wherein the instructions further cause the base station to receive, from the wireless device via the cell, an uplink signal based on the time alignment timer running.

12. The base station of claim 8, wherein the instructions further cause the base station to transmit, to the wireless device, a second timing advance command for the PTAG.

13. The base station of claim 12, wherein the instructions further cause the base station to restart the time alignment timer in response to transmission of the second timing advance command.

14. A non-transitory computer-readable medium comprising instructions that, when executed by one or more processors of a wireless device, cause the wireless device to:
receive a layer 1 or layer 2 triggered mobility (LTM) cell switch command, wherein the LTM cell switch command:
comprises a configuration index indicating a cell for an LTM procedure; and
does not comprise a timing advance command with a timing adjustment value for a primary timing advance group (PTAG) of the cell; and
in response to receiving the LTM cell switch command not comprising the timing advance command with the timing adjustment value for the PTAG, start a time alignment timer associated with the PTAG after measuring a timing advance of the cell.

15. The non-transitory computer-readable medium of claim 14, wherein:
the instructions further cause the wireless device to receive one or more radio resource control (RRC) messages comprising configuration parameters of one or more candidate cells for an LTM procedure; and
the cell is a candidate cell among the one or more candidate cells.

16. The non-transitory computer-readable medium of claim 15, wherein:
the one or more RRC messages further comprise one or more LTM candidate configurations;
each LTM candidate configuration, of the one or more LTM candidate configurations, is for a respective cell of the one or more cells; and
the configuration index indicates an LTM candidate configuration of the one or more LTM candidate configurations.

17. The non-transitory computer-readable medium of claim 14, wherein the instructions further cause the wireless device to transmit, via the cell, an uplink signal based on the time alignment timer running.

18. The non-transitory computer-readable medium of claim 14, wherein the instructions further cause the wireless device to receive a second timing advance command for the PTAG.

19. The non-transitory computer-readable medium of claim 18, wherein the instructions further cause the wireless device to restart the time alignment timer in response to reception of the second timing advance command.

20. The non-transitory computer-readable medium of claim 14, wherein the timing advance is measured based on a user equipment (UE)-based timing advance measurement procedure.

* * * * *